(12) United States Patent
Moore et al.

(10) Patent No.: US 7,349,915 B1
(45) Date of Patent: Mar. 25, 2008

(54) PERSISTENT ARCHIVES

(75) Inventors: Reagan W. Moore, San Diego, CA (US); Arcot Rajasekar, Del Mar, CA (US); Chaitanya K. Baru, San Diego, CA (US); Bertram Ludaescher, San Diego, CA (US); Amarnath Gupta, San Diego, CA (US); Richard J. Marciano, San Diego, CA (US)

(73) Assignees: General Atomics, San Diego, CA (US); Regents of the University of California, Oakland, CA (US)

( * ) Notice: Subject to any disclaimer, the term of this patent is extended or adjusted under 35 U.S.C. 154(b) by 395 days.

(21) Appl. No.: 11/010,202

(22) Filed: Dec. 9, 2004

Related U.S. Application Data

(63) Continuation of application No. 09/815,447, filed on Mar. 21, 2001, now Pat. No. 6,963,875.

(60) Provisional application No. 60/273,464, filed on Mar. 5, 2001, provisional application No. 60/255,795, filed on Dec. 15, 2000, provisional application No. 60/255,794, filed on Dec. 15, 2000, provisional application No. 60/191,662, filed on Mar. 23, 2000.

(51) Int. Cl.
*G06F 17/00* (2006.01)

(52) U.S. Cl. .................. 707/101; 707/204; 707/205

(58) Field of Classification Search .............. 707/1, 707/3, 4, 10, 100–102, 104.1, 200–205; 709/201, 709/203, 221, 224, 229, 231, 236; 717/108, 717/137
See application file for complete search history.

(56) References Cited

U.S. PATENT DOCUMENTS 4,855,907 A   8/1989  Ferro et al.
5,155,678 A  10/1992  Fukumoto et al.
5,249,260 A   9/1993  Nigawara et al.
5,276,867 A   1/1994  Kenley et al.
5,276,872 A   1/1994  Lomet et al.
5,280,611 A   1/1994  Mohan et al.
5,295,256 A   3/1994  Bapat (Continued)

OTHER PUBLICATIONS

B. fraser et al., Dynamic Views of SGML Tagged Documents, 1999, ACM Press,pp. 93-98.*

(Continued)

*Primary Examiner*—Christian Chace
*Assistant Examiner*—Jacques Veillard
(74) *Attorney, Agent, or Firm*—Howrey LLP

(57) ABSTRACT

A persistent archive of a collection of data objects comprises a self-describing, infrastructure-independent representation of a logical structure for the collection and a self-describing, infrastructure-independent representation of the data objects. The archive is persistent in that it may be instantiated at an indefinite point in time in the future regardless of the state of technology at that time. A knowledge-based persistent archive of a collection of data objects comprises the foregoing two elements but also a self-describing, infrastructure-independent representation of knowledge relevant to the collection. Another embodiment of a knowledge-based persistent archive comprises at least one representation of a collection or the data objects, at least one self-describing, infrastructure-independent, or executable specification of one or more transformations relevant to the collection, and at least one self-describing, infrastructure-independent, or executable specification of one or more rules relevant to the collection.

11 Claims, 118 Drawing Sheets

```
400 {  <?xml version="1.0" standalone="yes"?>
       <!DOCTYPE CUSTOMER
       [
       <!ELEMENT CUSTOMER
          (customer_name+, email*, phone*, fax?)>
          <!ATTLIST CUSTOMER customer_id ID #REQUIRED>
          <!ATTLIST CUSTOMER city #REQUIRED>
       <!-- ? = zero or one; * = zero or more; + = one or more -->
402 {  <!ELEMENT customer_name (first+, last+)>
       <!ELEMENT first (#PCDATA)>
       <!ELEMENT last (#PCDATA)>
       <!ELEMENT email (#PCDATA)>
       <!ELEMENT phone (#PCDATA)>
       <!ELEMENT fax (#PCDATA)>
       ]>

404 {  <CUSTOMER customer_id="c1500" city="san diego">
         <customer_name>
           <first>Joe</first>
           <last>Smith</last>
         </customer_name>
         <email>joesmith@company.com</email>
         <phone>(555) 555-5555</phone>
         <fax>(555) 555-5555</fax>
       </CUSTOMER>
```

U.S. PATENT DOCUMENTS

| | | | |
|---|---|---|---|
| 5,333,315 A | 7/1994 | Saether et al. | |
| 5,390,335 A | 2/1995 | Stephan et al. | |
| 5,440,712 A | 8/1995 | Takeda | |
| 5,446,885 A | 8/1995 | Moore et al. | |
| 5,469,503 A | 11/1995 | Butensky et al. | |
| 5,485,606 A | 1/1996 | Midgdey et al. | |
| 5,574,828 A | 11/1996 | Hayward et al. | |
| 5,613,113 A | 3/1997 | Goldring | |
| 5,642,505 A | 6/1997 | Fushimi | |
| 5,644,764 A * | 7/1997 | Johnson et al. | 707/103 R |
| 5,659,724 A | 8/1997 | Borgida et al. | |
| 5,671,407 A | 9/1997 | Demers et al. | |
| 5,671,408 A | 9/1997 | McBride | |
| 5,717,922 A | 2/1998 | Hohensee et al. | |
| 5,721,916 A | 2/1998 | Pardikar | |
| 5,727,197 A | 3/1998 | Burgess et al. | |
| 5,727,203 A | 3/1998 | Hapner et al. | |
| 5,764,905 A | 6/1998 | Catozzi et al. | |
| 5,765,172 A | 6/1998 | Fox | |
| 5,774,717 A | 6/1998 | Porcaro | |
| 5,778,389 A | 7/1998 | Pruett et al. | |
| 5,778,390 A | 7/1998 | Nelson et al. | |
| 5,806,060 A | 9/1998 | Borgida et al. | |
| 5,819,296 A | 10/1998 | Anderson et al. | |
| 5,832,517 A | 11/1998 | Knutsen, II | |
| 5,862,325 A | 1/1999 | Reed et al. | |
| 5,864,848 A | 1/1999 | Horvitz et al. | |
| 5,884,327 A | 3/1999 | Cotner et al. | |
| 5,913,066 A | 6/1999 | Benzenberg et al. | |
| 5,924,101 A | 7/1999 | Bach et al. | |
| 5,930,806 A | 7/1999 | Taira et al. | |
| 5,937,413 A | 8/1999 | Hyun et al. | |
| 5,940,827 A | 8/1999 | Hapner et al. | |
| 5,960,422 A | 9/1999 | Prasad | |
| 6,016,495 A | 1/2000 | McKeehan et al. | |
| 6,018,743 A | 1/2000 | Xu | |
| 6,018,747 A | 1/2000 | Burns et al. | |
| 6,026,413 A | 2/2000 | Challenger et al. | |
| 6,067,539 A | 5/2000 | Cohen | |
| 6,108,686 A | 8/2000 | Williams, Jr. | |
| 6,108,703 A | 8/2000 | Leighton et al. | |
| 6,112,210 A | 8/2000 | Nori et al. | |
| 6,134,559 A | 10/2000 | Brumme et al. | |
| 6,134,594 A | 10/2000 | Helland et al. | |
| 6,173,439 B1 | 1/2001 | Carlson et al. | |
| 6,175,830 B1 | 1/2001 | Maynard | |
| 6,182,117 B1 | 1/2001 | Christie et al. | |
| 6,199,141 B1 | 3/2001 | Weinreb et al. | |
| 6,366,934 B1 * | 4/2002 | Cheng et al. | 715/513 |
| 6,418,448 B1 * | 7/2002 | Sarkar | 707/104.1 |
| 6,421,681 B1 | 7/2002 | Gartner et al. | |
| 6,484,247 B1 | 11/2002 | Gendron | |
| 6,513,099 B1 | 1/2003 | Smith et al. | |
| 6,539,396 B1 | 3/2003 | Bowman-Amuah | |
| 6,704,745 B2 | 3/2004 | Della-Libera et al. | |
| 6,748,374 B1 | 6/2004 | Madan et al. | |
| 6,792,606 B2 | 9/2004 | Halter et al. | |
| 6,801,919 B2 | 10/2004 | Hunt et al. | |
| 6,834,286 B2 | 12/2004 | Srinivasan et al. | |
| 6,963,875 B2 * | 11/2005 | Moore et al. | 707/101 |
| 7,117,214 B2 * | 10/2006 | Wiser et al. | 707/10 |
| 7,139,894 B1 * | 11/2006 | Mensching et al. | 711/170 |
| 2001/0056429 A1 | 12/2001 | Moore et al. | |

OTHER PUBLICATIONS

Brian Ensink et al., XML based adaption of the composite approach for database integration, 1999, ACM Press, Article No. 23, p. 1-6.*

Tommie Usdin et al., XML: not a silver bullet, but a great pipe wrench, Sep. 1998, ACM Press, vol. 6, Issue 3, pp. 125-132.*

Moore, Reagan, et al.; *Collection-Based Long-Term Preservation*; Submitted to National Archives and Records Administration, General Atomics, San Diego Supercomputer Center, San Diego, California (Jun. 1999).

Rajasekar, Arcot et al.; *Collection-Based Persistent Archives*; Information-based Access to Storage: The Foundation of Information Systems; IEEE Computer Society, The Institute of Electrical and Electronics Engineers, Inc.; pp. 176-184 (Mar. 15, 1999).

Rajasekar, Arcot, et al.; *Collection-Based Persistent Archives*, San Diego Supercomputer Center, San Diego, California; 19 pages (Mar. 17, 1999).

Moore, Reagan et al.; *Collection-Based Persistent Digital Archives—Part I*; D-Lib Magazine, Corporation for National Research Initiatives, vol. 6, No. 3, pp. 1-13 (Mar. 2000).

Deutsch, Alin et al.; *A query language for XML*; Computer Networks, vol. 31, No. 11-16, pp. 1155-1169 (May 17, 1999).

Bosworth Adam, et al.; *Serializing Graphs of Data in XML*; Submitted to Europe '00 Conference Proceedings, Proceedings of XML Europe '99, Granada, Spain (Apr. 26-30, 1999).

Mark, Leo et al; *Metadata Management*; Computer, vol. 19, No. 12, pp. 26-36 (Dec. 1, 1986).

Bertram Ludascher et al., Preservation of digital data with self-validating, self-instantianting knowledge-based, Sep. 2001, ACM SIGMOD Record, vol. 30, Issue 3, pp. 54-63.

* cited by examiner

DATABASE RECORDS:

Customer Id: c1500
First:  Joe
Last:   Smith
City:   San Diego
Email: joesmith@company.com
Phone: (555) 555-5555
Fax:    (555) 551-5555

Customer Id: c1600
First:  John
Last:   Smith
City:   San Diego
Email: johnsmith@company.com
Phone: (555) 552-5555
Fax:    (555) 553-5555

FIGURE 2

CUSTOMER.DTD

300 { <!ELEMENT CUSTOMER
    (customer_name+, email*, phone*, fax?)>

302 { <!ATTLIST CUSTOMER customer_id ID #REQUIRED>
    <!ATTLIST CUSTOMER city #REQUIRED>

<! -- ? = zero or one; * = zero or more; + = one or more --->

304 { <ELEMENT customer_name (first+, last+)>

306 { <ELEMENT first (#PCDATA)>
    <ELEMENT last (#PCDATA)>
    <ELEMENT email (#PCDATA)>
    <ELEMENT phone (#PCDATA)>
    <ELEMENT fax (#PCDATA)>

XML DOCUMENT:

308 { <?xml version="1.0" standalone="no"?>
    <!DOCTYPE CUSTOMER SYSTEM "customer.dtd">

310 { <CUSTOMER customer_id="c1500" city="san diego">

312 { <customer_name>

314 { <first>Joe</first>
    <last >Smith</last>

312 { </customer_name>

316 { <email>joesmith@company.com</email>
    <phone> (555) 555-5555</phone>
    <fax> (555) 555-5555</fax>

310 { </CUSTOMER>

FIGURE 3B

400
```
<?xml version="1.0" standalone="yes"?>
<!DOCTYPE CUSTOMER
[
```

402
```
<!ELEMENT CUSTOMER
    (customer_name+, email*, phone*, fax?)>
    <!ATTLIST CUSTOMER customer_id  ID #REQUIRED>
    <!ATTLIST CUSTOMER city #REQUIRED>
<! -- ? = zero or one; * = zero or more; + = one or more --->
<ELEMENT customer_name (first+, last+)>
<ELEMENT first (#PCDATA)>
<ELEMENT last (#PCDATA)>
<ELEMENT email (#PCDATA)>
<ELEMENT phone (#PCDATA)>
<ELEMENT fax (#PCDATA)>
]>
```

404
```
<CUSTOMER customer_id="c1500" city="san diego">
  <customer_name>
    <first>Joe</first>
    <last >Smith</last>
  </customer_name>
  <email>joesmith@company.com</email>
  <phone> (555) 555-5555</phone>
  <fax> (555) 555-5555</fax>
</CUSTOMER>
```

FIGURE 4

XML DOCUMENT (INPUT DATA):

```
<sales>

<division id="North">
        <revenue>10</revenue>
        <growth>9</growth>
        <bonus>7</bonus>
    </division>

<division id="South">
        <revenue>4</revenue>
        <growth>3</growth>
        <bonus>4</bonus>
    </division>

<division id="West">
        <revenue>6</revenue>
        <growth>-1.5</growth>
        <bonus>2</bonus>
    </division>

</sales>
```

FIGURE 5

XSL STYLE SHEET:

```xml
<html xsl:version="1.0"
      xmlns:xsl="http://www.w3.org/1999/XSL/Transform"
      lang="en">
  <head>
    <title>Sales Results By Division</title>
  </head>
  <body>
    <table border="1">
      <tr>
        <th>Division</th>
        <th>Revenue</th>
        <th>Growth</th>
        <th>Bonus</th>
      </tr>
      <xsl:for-each select="sales/division">
        <!-- order the result by revenue -->
        <xsl:sort select="revenue"
                  data-type="number"
                  order="descending"/>
        <tr>
          <td>
            <em><xsl:value-of select="@id"/></em>
          </td>
          <td>
            <xsl:value-of select="revenue"/>
          </td>
          <td>
            <!-- highlight negative growth in red -->
            <xsl:if test="growth < 0">
              <xsl:attribute name="style">
                <xsl:text>color:red</xsl:text>
              </xsl:attribute>
            </xsl:if>
            <xsl:value-of select="growth"/>
          </td>
          <td>
            <xsl:value-of select="bonus"/>
          </td>
        </tr>
      </xsl:for-each>
    </table>
  </body>
</html>
```

FIGURE 6

HTML OUTPUT:

```
<html lang="en">
<head>
<meta http-equiv="Content-Type" content="text/html; charset=iso-8859-1">
<title>Sales Results By Division</title>
</head>
<body>
<table border="1">
<tr>
<th>Division</th><th>Revenue</th><th>Growth</th><th>Bonus</th>
</tr>
<tr>
<td><em>North</em></td><td>10</td><td>9</td><td>7</td>
</tr>
<tr>
<td><em>West</em></td><td>6</td><td style="color:red">-1.5</td><td>2</td>
</tr>
<tr>
<td><em>South</em></td><td>4</td><td>3</td><td>4</td>
</tr>
</table>
</body>
</html>
```

FIGURE 7

{PRIVATE}___NARA_article_begin___:_____

Path: news.sdsc.edu!newshub.csu.net!newshub.sdsu.edu!newsfeed.berkeley.edu!
 news.cis.ohiostate.edu!news.rootsweb.com!rootsweb-gw From: Casivers@aol.com Newsgroups: soc.genealogy.hispanic Subject: Passenger Lists for Ships from Spain To Cuba Date: 22 Mar 1999 16:20:37 -0800

Organization: RootsWeb Genealogical Data Cooperative

Lines: 7

Message-ID: <2376321.36f6de03@aol.com

NNTP-Posting-Host: localhost

Mime-Version: 1.0

Content-Type: text/plain; charset=US-ASCII

Content-Transfer-Encoding: 7bit

X-Trace: bl-1.rootsweb.com 922148437 3147 127.0.0.1 (23 Mar 1999 00:20:37 GMT)

X-Complaints-To: usenet@news.rootsweb.com

NNTP-Posting-Date: 23 Mar 1999 00:20:37 GMT

Xref: news.sdsc.edu soc.genealogy.hispanic:3156

Does anyone know where I can get passengers lists for
ships that transported Spaniards to Cuba circa 1860's?
Any help would be appreciated.
Thanks,
Cheryl Sanchez-Sivers
 ___NARA_article_end___:_____

FIGURE 8

```
<!ELEMENT rfc1036_mesg (headers, body)>

<!ELEMENT headers (required_headers, optional_headers, other_headers)>
<!ELEMENT body #PCDATA>

<!ELEMENT required_headers (From, Date, Newsgroups, Subject, Message-ID, Path)>
<!ELEMENT optional_headers (Folloup-To?, Expires?, Reply-To?, Sender?, References?, Control?, Distribution?
                            Keywords?, Summary?, Approved?, Lines?, Xref?, Organization?)>
<!ELEMENT other_headers other+>

<!ELEMENT From          #PCDATA>
<!ELEMENT Date          #PCDATA>
<!ELEMENT Newsgroups    #PCDATA>
<!ELEMENT Subject       #PCDATA>
<!ELEMENT Message-ID    #PCDATA>
<!ELEMENT Path          #PCDATA>

<!ATTLIST From       seqno  CDATA #REQUIRED>
<!ATTLIST Date       seqno  CDATA #REQUIRED>
<!ATTLIST Newsgroups        seqno CDATA #REQUIRED>
<!ATTLIST Subject    seqno  CDATA #REQUIRED>
<!ATTLIST Message-ID        seqno CDATA #REQUIRED>
<!ATTLIST Path       seqno  CDATA #REQUIRED>

<!ELEMENT Followup-To   #PCDATA>
<!ELEMENT Expires       #PCDATA>
<!ELEMENT Reply-To          #PCDATA>
<!ELEMENT Sender        #PCDATA>
<!ELEMENT References        #PCDATA>
<!ELEMENT Control       #PCDATA>
<!ELEMENT Distribution      #PCDATA>
<!ELEMENT Keywords          #PCDATA>
<!ELEMENT Summary           #PCDATA>
<!ELEMENT Approved          #PCDATA>
<!ELEMENT Lines         #PCDATA>
<!ELEMENT Xref          #PCDATA>
<!ELEMENT Organization  #PCDATA>

<!ATTLIST Followup-To           seqno CDATA #REQUIRED>
<!ATTLIST Expires        seqno  CDATA #REQUIRED>
<!ATTLIST Reply-To              seqno CDATA #REQUIRED>
<!ATTLIST Sender         seqno  CDATA #REQUIRED>
<!ATTLIST References            seqno CDATA #REQUIRED>
<!ATTLIST Control        seqno  CDATA #REQUIRED>
<!ATTLIST Distribution          seqno CDATA #REQUIRED>
<!ATTLIST Keywords              seqno CDATA #REQUIRED>
<!ATTLIST Summary               seqno CDATA #REQUIRED>
<!ATTLIST Approved              seqno CDATA #REQUIRED>
<!ATTLIST Lines          seqno  CDATA #REQUIRED>
<!ATTLIST Xref           seqno  CDATA #REQUIRED>
<!ATTLIST Organization          seqno CDATA #REQUIRED>

<!ELEMENT other   #PCDATA>

<!ATTLIST other
        keyword      CDATA #REQUIRED
        seqno        CDATA #REQUIRED>
```

FIGURE 9

```
create table ngrps_headers_core (
    internalMsgId       integer         not null,
    FromInfo            varchar(200)    not null,
    MsgDate             varchar(50)     not null,
    Newsgroups          varchar(1900)   not null,
    SubjectInfo         varchar(1900)   not null,
    MessageId           varchar(200)    not null,
    PathInfo            varchar(1900)   not null,
    FollowupTo          varchar(1900),
    ExpiresOn           varchar(50),
    ReplyTo             varchar(200),
    SenderInfo          varchar(200),
    ReferencesInfo      varchar(1900),
    ControlInfo         varchar(1900),
    DistributionInfo    varchar(500),
    KeywordsInfo        varchar(1900),
    SummaryInfo         varchar(1900),
    ApprovedInfo        varchar(500),
    LinesOfEmail        integer,
    XrefInfo            varchar(500),
    OrganizationInfo    varchar(500),
    FromSeqNum          integer,
    MsgDateSeqNum       integer,
    NewsgroupsSeqNum    integer,
    SubjectSeqNum       integer,
    MessageIdSeqNum     integer,
    PathSeqNum          integer,
    FollowupToSeqNum    integer,
    ExpiresSeqNum       integer,
    ReplyToSeqNum       integer,
    SenderSeqNum        integer,
    ReferencesSeqNum    integer,
    ControlSeqNum       integer,
    DistributionSeqNum  integer,
    KeywordsSeqNum      integer,
    SummarySeqNum       integer,
    ApprovedSeqNum      integer,
    LinesSeqNum         integer,
    XrefSeqNum          integer,
    OrganizationSeqNum  integer,
    primary key (internalMsgId),
    unique (MessageId,MsgDate)
);

create table ngrps_headers_othr (
    internalMsgId   integer     not null,
    HdrKeyName      varchar(50),
    HdrKeyValue     varchar(2000),
    HdrKeySeqNum    integer,
    foreign key (internalMsgId) references ngrps_headers_core (internalMsgId)
);

create table container_info (
    internalId      integer     not null,
    data_id         integer     not null,
    posInContainer  integer,
    sizeOfMsg       integer,
    foreign key (internalId) references ngrps_headers_core(internalMsgId),
    foreign key (data_id) references MDAS_AD_REPL(data_id)
);
```

FIGURE 10

WEB-BASED INTERFACE FOR ACCESSING THE E-MAIL COLLECTION.

```
<!ELEMENT caccf_collection (caccf_database)*>       list of CACCF databases

<!ELEMENT caccf_database (                          a single database
            date_id,                                creation date, identifies the database
            record_size,                            size of each record (bytes)
            caccf_records                           the actual data records
)>

<!ELEMENT caccf_records (
            caccf_record*                           list of caccf records
)>
```

FIGURE 14

| <!ELEMENT caccf_record EMPTY | | all info is in the attributes |
|---|---|---|
| )> | | |
| <!ATTLIST caccf_record | | length meaning |
| ms | CDATA #REQUIRED | 1 Military Service (DoD Component) |
| cc | CDATA #REQUIRED | 2 Country of Casualty |
| tc | CDATA #REQUIRED | 2 Type of Casualty |
| rn | CDATA #REQUIRED | 5 Reference Number (File Ref. No) |
| na | CDATA #REQUIRED | 28 Name (of Casualty) |
| dp | CDATA #REQUIRED | 4 Date Record Processed (YYMM) |
| sn | CDATA #REQUIRED | 9 Social Security OR Service Num. |
| mg | CDATA #REQUIRED | 4 Military Grade (Grade or Rate) |
| pg | CDATA #REQUIRED | 2 Pay Grade (Grade or Rate) |
| dd | CDATA #REQUIRED | 8 Date of Death (MM/DD/YY) (Casualty) |
| hc | CDATA #REQUIRED | 20 "Home of Record" City (Place) |
| hs | CDATA #REQUIRED | 2 "Home of Record" State Code |
| oc | CDATA #REQUIRED | 5 Service Occupation Code |
| db | CDATA #REQUIRED | 8 Date of Birth (MM/DD/YY) |
| rc | CDATA #REQUIRED | 1 Reason (Cause of Casualty) |
| ai | CDATA #REQUIRED | 1 Aircraft or Not Aircraft |
| ra | CDATA #REQUIRED | 1 Race |
| re | CDATA #REQUIRED | 2 Religion Code (Religious Denom.) |
| le | CDATA #REQUIRED | 2 Length of Service in Years |
| ma | CDATA #REQUIRED | 1 Marital Status |
| se | CDATA #REQUIRED | 1 Sex |
| ci | CDATA #REQUIRED | 1 Citizen Code |
| pp | CDATA #REQUIRED | 1 Posthumous Promotion |
| dt | CDATA #REQUIRED | 6 Date Tour in Southeast Asia |
| lr | CDATA #REQUIRED | 1 Last Record Code |
| br | CDATA #REQUIRED | 3 Body Recovered or Not |
| ag | CDATA #REQUIRED | 2 Age at Time of Casualty |
| sc | CDATA #REQUIRED | 1 Component (Service Component) |
| co | CDATA #REQUIRED | 29 Comments |
| ty | CDATA #REQUIRED | 2 Type |
| pc | CDATA #REQUIRED | 2 Province Code (South Vietnam |
| Provinces & | | |
| . | | Military Regions) |
| mc | CDATA #REQUIRED | 2 CORPCD |
| pr | CDATA #REQUIRED | 2 PROCD |
| fl | CDATA #REQUIRED | 2 Flag |
| )> | | |

FIGURE 15

```
create table CACCF (
    REC_NO              int not null,       -- DICE: no. as found in the source
    MIL_SERVICE         char (1),           -- Military Service (DoD Component)
    CASUALTY_COUNTRY    char (2),           -- Country of Casualty
    CASUALTY_TYPE       char (2),           -- Type of Casualty
    REF_NO              char (5),           -- Reference Number (File Ref. No)
    NAME                char (28),          -- Name (of Casualty)
    PROCESSED           char (4),           -- Date Record Processed (YYMM)
    SSN_SERVICE_NO      char (9),           -- Social Security OR Service Num.
    GRADE               char (4),           -- Military Grade (Grade or Rate)
    PAY_GRADE           char (2),           -- Pay Grade (Grade or Rate)
    DIED                date,               -- Date of Death (MM/DD/YY)(Casualty)
    HOR_CITY            char (20),          -- "Home of Record" City (Place)
    HOR_STATE           char (2),           -- "Home of Record" State Code
    OCCUPATION          char (5),           -- Service Occupation Code
    BORN                date,               -- Date of Birth (MM/DD/YY)
    CASUALTY_REASON     char (1),           -- Reason (Cause of Casualty)
    AIR                 char (1),           -- Aircraft or Not Aircraft
    RACE                char (1),           -- Race
    RELIGION            char (2),           -- Religion Code (Religious Denom.)
    SERVICE_LENGTH      char (2),           -- Length of Service in Years
    MARITAL_STATUS      char (1),           -- Marital Status
    SEX                 char (1),           -- Sex
    CITIZEN             char (1),           -- Citizen Code
    PH_PROMOTION        char (1),           -- Posthumous Promotion
    SEA_TOUR            date,               -- Date Tour in Southeast Asia
    LAST_RECORD         char (1),           -- Last Record Code
    BODY_RECOVERED      char (3),           -- Body Recovered or Not
    AGE                 char (2),           -- Age at Time of Casualty
    COMPONENT           char (1),           -- Component (Service Component)
    COMMENTS            char (29),          -- Comments
    TYPE                char (2),           -- Type
    PROVINCE            char (2),           -- Province Code (South Vietnam Provinces and
    Military Regions)
    CORPCD              char (2),           -- CORPCD
    PROCD               char (2),           -- PROCD
    FLAG                char (2),           -- Flag
    NOTES               varchar (1000)      -- DICE: notes/corrections made
    PRIMARY KEY         (SSN_SERVICE_NO),
    UNIQUE              (REC_NO)
```

FIGURE 16

```
/* Find records with incomplete BORN or DIED date: */
SQL> select REC_NO, NAME, BORN, DIED, AGE from CACCF
where BORN is null or DIED is null;
REC_NO NAME                         BORN        DIED        AG
------ ---------------------------- ----------- ----------- --
  2114 SEVENBERGEN JERRY L                      16-MAR-66   0
  3882 DOMINGUEZ MICHAEL J          10-SEP-66   0
  3883 JORDAN ALLAN H               10-SEP-66   0
...
33997 HALIBURTON MICHAEL R                      08-AUG-70   0
17 rows selected.
/* How many entries do NOT have a value for 'Date Tour in Southeast Asia'? */
SQL> select count (*) from CACCF where SEA_TOUR is null;
COUNT(*)
```

FIGURE 17

/* What is the number and min/max/average age of the casualties over entries where AGE is available? */

SQL> select count(*), min(AGE), max(AGE), avg(AGE)
- from CACCF
- where not AGE = '0';

| COUNT(*) | MI | MA | AVG(AGE) |
|----------|----|----|----------|
| 58164 | 16 | 62 | 22.7932742 |

FIGURE 18

```
<!ELEMENT DOCUMENT (CONGRESS|RESOLUTION|ATTESTATION)* >
<!ATTLIST DOCUMENT DOCID CDATA #IMPLIED>
<!ATTLIST DOCUMENT REFERENCENUMBER CDATA #IMPLIED>
<!ATTLIST DOCUMENT CLASS CDATA #IMPLIED>

<!ELEMENT CONGRESS (NUMBER|SESSIONNUMBER|(BODYOFCONGRESS)*|DATE) >
<!ELEMENT NUMBER (#PCDATA)* >
<!ELEMENT SESSIONNUMBER (#PCDATA)* >
<!ELEMENT BODYOFCONGRESS (#PCDATA)* >
<!ELEMENT DATE (#PCDATA)* >
<!ELEMENT RESOLUTION (TYPE|STATEMENT)* >
<!ELEMENT TYPE (#PCDATA)* >
<!ELEMENT STATEMENT (OPENING|(STRIKEOUT|INSERT)*|CLOSING) >
<!ELEMENT OPENING (#PCDATA)* >
<!ELEMENT STRIKEOUT (#PCDATA)* >
<!ELEMENT INSERT (#PCDATA)* >
<!ELEMENT CLOSING (#PCDATA)* >
<!ELEMENT ATTESTATION (#PCDATA)* >
```

FIGURE 25

```
<!ELEMENT DOCUMENT (CONGRESS|ACT)* >

<!ATTLIST DOCUMENT DOCID CDATA #IMPLIED>
<!ATTLIST DOCUMENT REFERENCENUMBER CDATA #IMPLIED>
<!ATTLIST DOCUMENT CLASS CDATA #IMPLIED>

<!ELEMENT CONGRESS (NUMBER|SESSIONNUMBER|BODYOFCONGRESS|DATE) >
<!ELEMENT NUMBER (#PCDATA)* >
<!ELEMENT SESSIONNUMBER (#PCDATA)* >
<!ELEMENT BODYOFCONGRESS (#PCDATA)* >
<!ELEMENT DATE (#PCDATA)* >

<!ELEMENT ACT (PURPOSE|SECTION)* >

<!ELEMENT PURPOSE (#PCDATA)* >
<!ELEMENT SECTION (HEADING|STATEMENT|SUBSECTION)* >
<!ATTLIST SECTION NUMBER CDATA #IMPLIED>

<!ELEMENT HEADING (#PCDATA|SHORTTITLE)* >
<!ELEMENT SHORTTITLE (#PCDATA)* >

<!ELEMENT STATEMENT (#PCDATA | AMENDMENT | SECTION | ATTESTATION | TEXT)* >
<!ELEMENT AMENDMENT (CODE|STRIKEOUT|INSERT|REDESIGNATE)* >
<!ELEMENT CODE (#PCDATA)* >
<!ELEMENT STRIKEOUT (#PCDATA)* >
<!ELEMENT INSERT (#PCDATA|PARAGRAPH|SUBSECTION|INSERT)* >
<!ELEMENT PARAGRAPH (TOPIC|TEXT|PARAGRAPH)* >
<!ATTLIST PARAGRAPH NUMBER CDATA #IMPLIED>

<!ELEMENT SUBSECTION (TOPIC|PARAGRAPH)* >
<!ATTLIST SUBSECTION NUMBER CDATA #IMPLIED>

<!ELEMENT TOPIC (#PCDATA)* >
<!ELEMENT TEXT (#PCDATA)* >
<!ELEMENT REDESIGNATE (#PCDATA)* >
<!ELEMENT ATTESTATION (#PCDATA)* >
```

FIGURE 26

```
<!ELEMENT STATEMENT (#PCDATA | AMENDMENT | SECTION | ATTESTATION | TEXT)* >
```

FIGURE 27

```
<DOCUMENT DOCID="f:hc148eas.txt" REFERENCENUMBER = "H. CON. RES. 148"
CLASS="Concurrent Resolution">

<CONGRESS>
   <NUMBER>104th CONGRESS</NUMBER>
   <SESSIONNUMBER>2d Session</SESSIONNUMBER>
   <BODYOFCONGRESS>Senate of the United States</BODYOFCONGRESS>
   <DATE>March 21, 1996</DATE>
</CONGRESS>

<RESOLUTION>
      <TYPE>AMENDMENTS</TYPE>
      <STATEMENT>
      <OPENING>
            Resolved, That the resolution from the House of Representatives (H. Con.
            Res. 148) entitled "Concurrent resolution expressing the sense of the
            Congress that the United States is committed to military stability in the
            Taiwan Strait and the United States should assist in defending the
            Republic of China (also known as Taiwan) in the event of invasion,
            missile attack, or blockade by the People's Republic of China.", do pass
            with the following
      </OPENING>
      <STRIKEOUT>Strike out all after the resolving clause
      </STRIKEOUT>
      <INSERT>
      That it is the sense of the Congress—
            (1)   to deplore the missile tests and military exercises that the
            People's Republic of China is conducting from March 8 through March 25,
            1996, and view such tests and exercises as potentially serious threats to
            the peace, security, and stability of Taiwan and not in the spirit of the
            three United States-China Joint Communiques;
            (2)   to urge the Government of the People's Republic of China to cease
            its bellicose actions directed at Taiwan and enter instead into
            meaningful dialogue with the Government of Taiwan at the highest levels,
            such as through the Straits Exchange Foundation in Taiwan and the
            Association for Relations Across the Taiwan Strait in Beijing, with an
            eye towards decreasing tensions and resolving the issue of the future of
            Taiwan;
            (3)   that the President should, consistent with section 3© of the
            Taiwan Relations Act of 1979 (22 U.S.C. 3302©), immediately consult with
            Congress on an appropriate United States response to the tests and
            exercises should the tests or exercises pose an actual threat to the
            peace, security, and stability of Taiwan; (4) that the President should,
            consistent with the Taiwan Relations Act of 1979 (22 U.S.C. 3301 et
            seq.), reexamine the nature and quantity of defense articles and services
            that may be necessary to enable Taiwan to maintain a sufficient self-
            defense capability in light of the heightened military threat; and
            (5)   that the Government of Taiwan should remain committed to the
            peaceful resolution of its future relations with the People's Republic of
            China by mutual decision.
      </INSERT>
      <STRIKEOUT>Strike out the preamble</STRIKEOUT>
      <INSERT>
            Whereas the People's Republic of China, in a clear attempt to intimidate
            the people and Government of Taiwan, has over the past 9 months conducted
            a series of military exercises, including missile tests, within
            alarmingly close proximity to Taiwan;

Whereas from March 8 through March 15, 1996, the People's Republic of
            China conducted a series of missile tests within 25 to 35 miles of the 2
            principal northern and southern ports of Taiwan, Kaohsiung and Keelung;
            Whereas on March 12, 1996, the People's Republic of China began an 8-day,
```

| 28A |
|---|
| 28B |
| 28C |

FIGURE 28A live-ammunition, joint sea-and-air military exercise in a 2,390 square mile area in the southern Taiwan Strait;

Whereas on March 18, 1996, the People's Republic of China began a 7-day, live-ammunition, joint sea-and-air military exercise between Taiwan's islands of Matsu and Wuchu;

Whereas these tests and exercises are a clear escalation of the attempts by the People's Republic of China to intimidate Taiwan and influence the outcome of the upcoming democratic presidential election in Taiwan; Whereas through the administrations of Presidents Nixon, Ford, Carter, Reagan, and Bush, the United States has adhered to a "One China" policy and, during the administration of President Clinton, the United States continues to adhere to the "One China" policy based on the Shanghai Communique of February 27, 1972, the Joint Communique on the Establishment of Diplomatic Relations Between the United States of America and the People's Republic of China of January 1, 1979, and the United States-China Joint Communique of August 17, 1982;

Whereas through the administrations of Presidents Carter, Reagan, and Bush, the United States has adhered to the provisions of the Taiwan Relations Act of 1979 (22 U.S.C. 3301 et seq.) as the basis for continuing commercial, cultural, and other relations between the people of the United States and the people of Taiwan and, during the administration of President Clinton, the United States continues to adhere to the provisions of the Taiwan Relations Act of 1979;

Whereas relations between the United States and the Peoples' Republic of China rest upon the expectation that the future of Taiwan will be settled solely by peaceful means; Whereas the strong interest of the United States in the peaceful settlement of the Taiwan question is one of the central premises of the three United States-China Joint Communiques and was codified in the Taiwan Relations Act of 1979; Whereas the Taiwan Relations Act of 1979 states that peace and stability in the western Pacific "are in the political, security, and economic interests of the United States, and are matters of international concern";

Whereas the Taiwan Relations Act of 1979 states that the United States considers "any effort to determine the future of Taiwan by other than peaceful means, including by boycotts, or embargoes, a threat to the peace and security of the western Pacific area and of grave concern to the United States"; W hereas the Taiwan Relations Act of 1979 directs the President to "inform Congress promptly of any threat to the security or the social or economic system of the people on Taiwan and any danger to the interests of the United States arising therefrom";

Whereas the Taiwan Relations Act of 1979 further directs that "the President and the Congress shall determine, in accordance with constitutional process, appropriate action by the United States in response to any such danger";

Whereas the United States, the People's Republic of China, and the Government of Taiwan have each previously expressed their commitment to the resolution of the Taiwan question through peaceful means; and Whereas these missile tests and military exercises, and the accompanying statements made by the Government of the People's Republic of China, call into serious question the commitment of China to the peaceful resolution of the Taiwan question: Now, therefore, be it.
</INSERT>
<CLOSING>
Amend the title so as to read: "Expressing the sense of Congress regarding missile tests and military exercises by the People's Republic of China.".

FIGURE 28B

```
        </CLOSING>
       </STATEMENT>
</RESOLUTION>

<ATTESTATION>Secretary</ATTESTATION>

</DOCUMENT>
```

FIGURE 28C

| Prefix | Meaning |
|---|---|
| h | House of Representatives |
| hc | House of Representatives concurrent resolution |
| hj | House of Representatives joint resolution |
| hr | House of Representatives resolution |
| s | Senate |
| sc | Senate concurrent resolution |
| sj | Senate joint resolution |
| sr | Senate resolution |

FIGURE 29

| Suffix | Count | Meaning |
|---|---|---|
| as | 3 | amendment in the Senate |
| ath | 97 | considered and agreed to in the House |
| ats | 251 | considered and agreed to in the Senate |
| cdh | 6 | considered in the House (and committed to a committee) |
| cds | 1 | considered in the Senate (and committed to a committee) |
| cph | 19 | considered and passed in the House |
| cps | 20 | considered and passed in the Senate |
| eah | 36 | resolved with amendments in the House |
| eas | 115 | resolved with amendments in the Senate |
| eh | 887 | enactment resolved in the House |
| es | 270 | enactment resolved in the Senate |
| enr | 413 | |
| hds | 3 | held at the desk in the Senate |
| ih | 4947 | introduced in the House |
| is | 2271 | introduced in the Senate |
| ips | 4 | indefinitely postponed in the Senate |
| lth | 8 | laid on the table in the House |
| pch | 1 | placed on calendar in the House |
| pcs | 184 | placed on calendar in the Senate |
| pp | 31 | ordered to be printed as passed |
| rch | 8 | re-referred to the same or a different committee in the House |
| rcs | 6 | re-referred to the same or a different committee in the Senate |
| rds | 187 | received in the Senate |
| rfh | 103 | referred to a committee in the House |
| rih | 1 | referred to a committee for a limited time in the House |
| ris | 44 | referred to a committee for a limited time to report, or be discharged and placed on the calendar in the Senate |
| rh | 742 | report in the House |
| rs | 471 | report in the Senate |
| rh2 | 1 | 2-part report in the House |
| rs2 | 3 | 2-part report in the Senate |
| rth | 1 | referred to committee in the House |
| rts | 5 | referred to committee in the Senate |
| sc | 1 | |

FIGURE 30

| | | | | | | | |
|---|---|---|---|---|---|---|---|
| Unique Identification | | | | | | | |
| Catalog | AID | AMICO Identifier | * | | N | A unique identifier, assigned to a work in the AMICO Library. Comprised of a 4 letter institutional abbreviation, followed by a dot, and then a unique number such as an accession number [DOIs will be investigated in the future] | | Validate. First 4 characters from Member Code Value Table followed by period | NMAA.87-32547/a-g}~ AIC_456502}~ GEH_3457-86}~ |
| What is it? | | | | | | | |
| Catalog | OTY | Object-Type | * | | Y | The kind of work of art described; chosen from a short list of terms | AAT-Objects | Validate. Object Type Value Table. | installation}~ sculpture}~ watercolor}~ |
| Catalog | OPP | Object-Parts/Pieces | | | Y | The number and a description of any parts/pieces of the work of art | AAT | no conditions | chair, shelf, painting on canvas, robe, and bricks}~ 3 panels}~ 2}~ |
| Catalog | CLG | Classification | | | Y | Group Does not contain data; used to group fields classifying work. | | Validate. Null value only. | }~ |
| Catalog | CLT | Classification-Term | | | N | CLG Terms used to associate this work with other like works | AAT | no conditions | sculptural multimedia installation}~ works of art on paper |
| Catalog | CLS | Classification-Scheme | | | N | CLG The classification scheme from which a term was chosen | | no conditions. Construct Object Classification Scheme list | AAT}~ |
| What is it called? | | | | | | | |
| Catalog | OTG | Object-Title/Name | * | | Y | Group Group element | | Validate. Null value only. | }~ |

FIGURE 31A

| 31N | 31A |
|---|---|
| 31O | 31B |
| 31P | 31C |
| 31Q | 31D |
| 31R | 31E |
| 31S | 31F |
| | 31G |
| | 31H |
| | 31I |
| | 31J |
| | 31K |
| | 31L |
| | 31M |

| Catalog | OTN | Object-Title-Name | * | N | OTG | | no conditions | In the Afternoon)~ untitled)~ Blue #6 | no repeat within group | ###### |
|---|---|---|---|---|---|---|---|---|---|---|
| Catalog | OTT | Title-Type | | Y | OTG | The title or name of the work | no conditions | preferred)~ popular)~ as first exhibited)~ | | |
| | | | | | | The kind of Title or Name assigned to the work. Can include terms/phrases such as 'preferred', 'as given by artist', etc. | | | | |
| Catalog | OST | State | | Y | | For works produced in multiples, the state of this particular impression | no conditions | 1 of 5)~ only known)~ artists proof | | |
| Catalog | OEN | Edition | | Y | | For works produced in multiples, the edition of this particular example. | no conditions | 1st)~ Second American)~ | | |
| What does it look like? | | | | | | | | | | |
| Catalog | OPD | Physical Description | | N | | A narrative description of the physical appearance of the work including any parts or components. | no conditions | The objects are off center with a brick pathway leading towards them and the canvas in the background)~ Installation piece for the 2nd floor sculpture court comprised of several pine sticks. The ones in the center are burned )~ | | |
| Catalog | OPA | Physical Orientation/ Arrangement | | N | | A narrative description of the orientation of the work, or its physical arrangement or set-up. For example, used to describe how to assemble an installation, or hang an oddly shaped or abstract work. | no conditions | horizontal)~ designed for 14'x28' room)~ on pedestal | | |
| Catalog | MET | Measurements-Text | * | Y | | A free text display form of the works measurements. | no conditions | 14"x28")~ 17.6" x 38" unframed)~ 160 kg.)~ 13.2 cu. m. | | |

FIGURE 31B

| | | | | | | |
|---|---|---|---|---|---|---|
| Catalog | MEG | Measurements | Y | Group | Does not contain data; used to group fields recording measurements. | Validate. Null value only. | }~ |
| Catalog | MCM | Measurement-Component-Measured | N | MEG | A term indicating what was measured (sheet, frame, lid, pedestal etc.) | AAT no conditions | sheet}~ frame}~ lid}~ pedestal}~ |
| Catalog | MED | Measurement-Dimension | N | MEG | A term indicating the measurement taken, drawn from the following list: height, width, depth, weight, circumference, duration, volume (other terms may be added) | Validate. Dimensions Value Table. | height}~ width}~ length}~ circumference}~ diameter}~ volume}~ weight}~ duration}~ |
| Catalog | MDV | Measurement-Dimension-Value | N | MEG | The number of units of the measurement (numeric only) | Validate. Numeric | 37.6}~ 14}~ 182.25 |
| Catalog | MDU | Measurement-Dimension-Units | N | MEG | The unit in which the measurement was taken: inches, feet, mm, cm, lbs., oz., kg, g., minutes, sq. ft., cu. ft. etc | Validate. Measurement Units Value Table | linear measurements: inches}~ ft}~ mm}~ cm}~ meters}~ planar measurements: sq.ft.}~ sq m.}~ volumetric measurements: cu.ft. cu. meters}~ pounds, ounces}~ grams, kilograms}~ seconds, minutes}~ hours}~ |
| Catalog | MEQ | Measurement-Qualifier | N | MEG | A qualification or indication of the accuracy of a measurement | no conditions | plus/minus 10}~ accurate to 96%}~ circa}~ | no repeat within group |
| Catalog | OMG | Materials and Techniques | Y | Group | Does not contain data; used to group fields documenting materials and techniques used to create the work. | Validate. Null value only. | }~ | ####### |
| Catalog | OMD | Materials and Techniques-Description | N | OMG | A free text description of the materials and techniques used to create the work of art | AAT | Bricks, furniture and canvas}~ ink and watercolor on paper}~ oil on canvas}~ |
| Catalog | OMT | Materials and Techniques-Process/Technique-Term | Y | OMG | Single terms that index the processes and techniques used to create the work. | AAT no conditions. look up in AAT Processes/Techniques Hierarchy | construction}~ freehand drawing}~ drip painting}~ lithograph |

FIGURE 31C

| | | | | | | | |
|---|---|---|---|---|---|---|---|
| Catalog | OMM | Materials and Techniques-Materials-Term | | Y | OMG | Single terms that index the materials used to create the work. | AAT | no conditions. look up in AAT Materials Hierarchy | brick}~ oak}~ watercolor}~ varnish}~ | | |
| Catalog | OMS | Materials and Techniques-Support | | Y | OMG | Single terms that index the support on which the work was created. | AAT | no conditions. look up in AAT Materials Hierarchy | rice paper}~ canvas | | |
| Catalog | OIN | Inscriptions and/or Marks | | Y | | A free text description or transcription of any inscriptions or marks on the work, including their location, medium, hand, and other details. | | no conditions | signed, J.G., lower front}~ silver mark on handle}~ inscribed "to my friend john" on rear, with date July 14, 1973}~ | | |
| Catalog | OCH | Condition/Examination History | | Y | | A narrative description of the Condition or Examination history of the work of art. Cite documentation associated with Condition or Examination History in the Related Documents Group. | | no conditions | Excellent Condition according to Condition Report, 14/7/82, H.M. Black, Conservator}~ not inspected when first accessioned, found to have scratch in upper left, 3 inches long, during 1965 inventory}~ | | |
| Catalog | OTH | Treatment/Conservation History | | Y | | A narrative description of the Treatment or Conservation of the Work of art. Cite Documentation associated with Treatment or Conservation in the Related Documents Group. | | no conditions | Restored, summer 1987. Detailed treatment report available}~ Base reaffixed July 1987}~ | | |
| Who made it? | | | | | | | | | | | |
| Catalog | ORG | Creator | | Y | Group | Does not contain data; used to group the fields documenting the creator of thew work. | | Validate. Null value only. | }~ | | |

FIGURE 31D

| Catalog | CRQ | Creator-Qualifier | | | N | CRG | A qualification of the attribution of the work to a particular creator. | | no conditions | School of)~ Follower of)~ Attributed to)~ Copy after)~ | |
|---|---|---|---|---|---|---|---|---|---|---|---|
| Catalog | CRT | Creator-Name-Text | * | | N | CRG | Display form (direct order) of Creator Name (and qualifier). If Creator-Name isn't present, display form of Creator Culture Nationality | ULAN | no conditions | Vito Acconci)~ W. Eugene Smith )~ Rembrandt van Rijn | no repeat within group | ###### |
| Catalog | CRN | Creator-Name | | *or CRC | N | CRG | Sort Form (inverted, last name first) of Creator name; used in indexing. | ULAN | Validate presence/ or presence of CRC | Acconci, Vito)~ Smith, W. Eugene)~ Rembrandt van Rijn | | |
| Catalog | CRC | Creator-Culture/Nationality | | * or CRN | N | CRG | The culture or nationality of the creator who made the work, or to which the creation of the work is attributed | AAT | Validate presence, or presence of CRN | Benin Culture)~ Egyptian 1085-710 B.C.)~ Native American | | |
| Catalog | CDT | Creator-Dates/Locations-Text | | | N | CRG | A free text description of dates and places associated with the creator or culture that created the work. | TGN | no conditions. Parse by Numeric years to identify begin and end dates, BC, and qualifiers | born 1876 in Staffordshire, England)~ after 800 B.C.)~ not before 1766)~ c.1450)~ 3rd century B.C.)~ Died 1990 | | |
| Catalog | CBD | Creator-Birth-Date | | | N | CRG | The date of birth of the creator. | numeric | Validate Numeric, Parse to Validate YYYYMMDD | 1957)~ 19780914)~ 190206)~ | renamed from CDB (typo originally) | |
| Catalog | CBP | Creator-Birth-Place | | | N | CRG | The place the creator was born. | TGN | no conditions. | Lille, France)~ The Netherlands)~ London, Ontario, Canada | | ###### |
| Catalog | CBQ | Creator-Birth-Qualifier | | | N | CRG | A free text qualifier of the date of birth of the creator. | | Validate Date Qualifier Value Table | c.)~ circa)~ before)~ not after)~ no later than)~ | | |
| Catalog | CDD | Creator-Death-Date | | | N | CRG | The date the creator of the work died. | numeric | Validate Numeric, Parse to Validate YYYYMMDD | 1320)~ 19380914)~ 710 B.C.)~ | | |

FIGURE 31E

| Catalog | CDP | Creator-Death-Place | | N | ORG | The place of death of the creator | TGN | no conditions. | Helsinki, Finland)~ India)~ at sea, South Atlantic)~ | | |
|---|---|---|---|---|---|---|---|---|---|---|---|
| Catalog | CDQ | Creator-Death-Qualifier | | N | ORG | A free text qualifier of the date of death of the creator. | | Validate. Date Qualifier Value Table | c.)~ circa)~ before)~ not after)~ no later than)~ | | |
| Catalog | CAD | Creator-Active-Date | | N | ORG | The creator's dates of activity; may be known when birth and death are not. | numeric | no conditions | 1342-1386)~ 1960s)~ early 7th century B.C.)~ | | |
| Catalog | CAP | Creator-Active-Place | | Y | ORG | The place where the creator was active. May repeat with multiple places. | TGN | no conditions | France)~ Middle Kingdom, Egypt)~ North America)~ | | |
| Catalog | CGN | Creator-Gender | | N | ORG | the gender of the creator. | Male/Female | Validate. 'Male' or 'Female' | Male)~ Female)~ | corrected M and F in validation to match examples. | |
| Catalog | CRB | Creator-Biography | | N | ORG | A free text biography of the creator of the work. | | no conditions | Active in Canada 1844-71; Came to Canada in 1842)~ Winner of the Prix du Rome in 1903. | | ###### |
| Catalog | CRR | Creator-Role | | Y | ORG | A term or terms describing the role played by the creator in the making of the work of art. | AAT | no conditions. Construct Role Values list | sculptor)~ designer)~ print maker)~ castings manager)~ | | |
| Catalog | CNO | Creator-Notes | | N | ORG | A free text note about the creator, and the relationship between the creator or culture and the work of art | | no conditions | Not known to have ever signed works. | | |
| When was it made? | | | | | | | | | | | |
| Catalog | OCG | Creation-Dates | | Y | Group | Does not contain data; used to group fields dating works' creation. | | Validate. Null value only. | )~ | | |
| Catalog | OCT | Creation-Date-Text | * | N | OCG | The date on which a work was created, or a range of dates during which it could have been created | Parse to Numeric equivalents | no conditions. Parse. Validate. Numeric years to identify begin and end dates, BC, and qualifiers | c. 1645)~ 1957)~ dated by the artist as September 13, 1975)~ | | |

FIGURE 31F

| Catalog | OCS | Creation-Date-Start | N | OCG | A number, indicating the earliest possible date a work could have been created; BC dates are recorded as negative integers | numeric | Validate. Numeric. Parse to Validate. YYYYMMDD | 1300)~ 198209)~ 19461103)~ | | |
|---|---|---|---|---|---|---|---|---|---|---|
| Catalog | OCE | Creation-Date-End | N | OCG | A number, indicating the latest possible date a work could have been created; BC dates are recorded as negative integers | numeric | Validate. Numeric. Parse to Validate. YYYYMMDD | 1350)~ 198301)~ 19461103)~ | | |
| Catalog | OCQ | Creation-Date-Qualifier | N | OCG | A qualifier, that indicates approximation in the earliest or latest date. | | Validate. Date Qualifier Value Table | c.)~ circa)~ before)~ not after)~ no later than)~ | | |
| Where was it made? | | | | | | | | | | |
| Catalog | OCP | Creation-Place | Y | | A place or places where the work was created. | TGN | no conditions. Lookup in TGN | Paris, France)~ Loire River Valley)~ Los Angeles, California, USA)~ | | |
| What is it about? | | | | | | | | | | |
| Catalog | STG | Style/Period | Y | Group | Does not contain data; used to group fields describing work's style or period. | | Validate. Null value only. | )~ | | |
| Catalog | STD | Style/Period-Description | N | STG | A narrative description of the style or period of the work of art | AAT | no conditions. Parse Style and Periods to terms from AAT Style & Period Terms | Early Christian with Byzantine influence)~ Eastern Han ceramic ware with 13th century decorative glazes)~ Baroque)~ Etruscan influenced)~ | | |
| Catalog | STT | Style/Period-Terms | Y | STG | Index terms that characterize the style and/or period of the work of art. | AAT | no conditions. Look up in AAT Style & Periods | Art Nouveau)~ Minyan ware)~ French Colonial)~ | | |
| Catalog | SUG | Subject Matter | Y | Group | Does not contain data; used to group fields documenting work's subject matter. | | Validate. Null value only. | )~ | | |

FIGURE 31G

| | | | | | | | | | |
|---|---|---|---|---|---|---|---|---|---|
| Catalog | SLP | | Subject Matter-Prelconographic Description | N | SUG | A free text description of the generic subject of the work of art. | AAT | no conditions | Pastoral landscape with cattle in fields in background)~ Full length portrait with ball gown and pearls)~ Group of men at table gambling and drinking)~ |
| Catalog | SUI | | Subject Matter-Iconography | Y | SUG | A free text description of the specific, named subject of the work of art. | | no conditions | Diana and hounds)~ Christ in the temple)~ Herod and the slaughter of the innocents)~ |
| Catalog | SUT | | Subject Matter-Index Terms | Y | SUG | Index terms that characterize the subject of the work of art. | AAT | no conditions | Ms. John Patorius)~ Court of Louis XIV)~ Netherlands - 16th century, Recreation)~ |
| Catalog | OXG | | Context | Y | Group | Does not contain data; used to group fields documenting work's context. | | Validate. Null value only. | )~ |
| Catalog | OXD | | Context-Description | N | OXG | A narrative description of the historical context of the work of art, including its creation, display, excavation, or other history. | | no conditions | Excavated at Pompeii in the 1876 expedition)~ Installed in Brussels town square until 1782)~ Originally displayed with framelike structure built by the artist as part of the Black3 series)~ |
| Catalog | OXP | | Context-Related-Person | Y | OXG | Index forms of the names of any people contextually related to the work of art. | ULAN | no conditions. | Pershing, John)~ Emperor Hirohito)~ Wu Hen Din)~ Pope Julius II |
| Catalog | OXS | | Context-Related Site/Place | Y | OXG | The names of any places that are contextually related to the work of art. | TGN | no conditions. | Brussels, Belgium)~ Pompeii, Italy)~ Times Square, New York, New York, USA)~ |
| Catalog | OXT | | Context-Time Period/Dates | N | OXG | The dates, times or periods of a particular context. | | no conditions | 1876)~ 1782)~ prior to acquisition by the museum in 1956)~ |

FIGURE 31H

| Catalog | OCR | Critical Responses | | Y | Narrative discussions of the critical reception or analysis of the work of art. Link any critical texts in the Related Documents Group. | | no conditions | "Delightful - A triumph." Maravius, Hans, "In the Light of day", The New City News, January 7, 1987)~ | | |
|---|---|---|---|---|---|---|---|---|---|---|
| Who showed it? | | | | | | | | | | |
| Catalog | OEH | Exhibition or Loan History | | Y | A record of when and where the work has been exhibited. | | | Manchester Museum of Art, June 10 - September 18, 1976, "New Lines in Grand Masters"~ | | |
| Who owned it? | | | | | | | | | | |
| Catalog | OOG | Owner | | Y | Group Does not contain data; used to group fields documenting works ownership. | | Validate. Null value only. | | | |
| Catalog | OON | Owner Name | * | N | OOG The name of the institution or individual who owns the work now [e.g. the AMICO member]. Can repeat if multiple/part owners | | no conditions | SF MOMA)~ The Trustees of the Harold J. Jameson Memorial Museum of Crafts)~ | | |
| Catalog | OOP | Owner-Place | * | Y | OOG The place where the work is owned. | TGN | no conditions | Buffalo, New York, USA)~ St. Petersburg, Russia)~ San Diego, Chile)~ | | |
| Catalog | OOA | Owner-Accession-Number | * | Y | OOG The accession or inventory number assigned to the work by this owner. | | no conditions | 87-4532.a-c)~ 456665-0112)~ | | |
| Catalog | OOC | Owner-Credit-Line | * | Y | OOG The Credit Line, or any required mention or acknowledgement of the ownership of the work of art. | | no conditions. | Gift of Mrs. John Francis Blue)~ Purchased with funds from trustees and friends in memory of Hector Escoboza, Brayton Wilbur and J.D. Zellerbach)~ | | |

FIGURE 31I

| Catalog | OPO | Provenance/Prior Owners-Text | | Y | | A record of the past owners of the work of art. | | no conditions | Andrew Carnegie}~ ASEA International Ltd.}~ Mr. & Mrs. John A. T. Pastors}~ | |
|---|---|---|---|---|---|---|---|---|---|---|
| Catalog | ORG | Rights/Copyright | | Y | | Group | Does not contain data; used to group fields documenting work's copyright or restrictions. | | Validate. Null value only. | }~ | |
| Catalog | ORS | Copyright-Statement | * | N | | ORG | The copyright of the work of art, including any known rights holders, encumbrances or restrictions. | | no conditions | Permission for educational use only granted by the Trustees of the Picasso estate}~ No reproductions permitted under terms of the gift}~ | |
| Catalog | ORL | Copyright-Link | | N | * | ORG | A URL that links to the AMICO member, indicating where and how a user can acquire further information or rights to use the work. | | Validate. Must be a url | http://www.artic.edu}~ | |
| What is it related to? | | | | | | | | | | | |
| Catalog | RWG | Related Works of Art | | Y | | Group | Does not contain data; groups fields documenting related works of art. | | Validate. Null value only. | }~ | |
| Catalog | RWD | Related-Works-Description | | N | | RWG | A narrative description of the relationship between this work and any others. | | no conditions | David Hockney, "Mulholland Drive: the Road to the Studio", 1980}~ Other statues from the same site accessioned by the British Museum in 1845}~ | |
| Catalog | RWR | Related-Works-Relationship-Type | | N | | RWG | The kind of relationship; drawn from the list of Dublin Core Relationship types. | DC Relations | Validate. DC Relations Type Value Table | IsBasisFor}~ IsPartOf}~ References}~ | |

FIGURE 31J

| | | | | | | | |
|---|---|---|---|---|---|---|---|
| Catalog | RWL | Related-Works-Identifier/Link | | N | RWG | An identifier for or link to the related work of art. | Validate: AMICO Inst. Code, period, alpha-numeric | LAMA.AC1954.856.32)~ AKAG.1863:1)~ | |
| Catalog | RIG | Related Images | * | Y | Group | Does not contain data; groups fields documenting related images. All AMICO works must have at least one related image. | Validate: Null value only. | )~ | |
| Catalog | RIP | Related-Image-Preferred | * | N | RIG | Indicates [yes/no] whether this is the preferred image of the work of art. Each work must have one preferred image, that will be used in lists and brief displays. | Validate. | Y~N)~ | no repeat within group |
| Catalog | RID | Related-Image-Description | * | N | RIG | The view of the work shown in this image: full, detail, recto, verso, 360 degrees, etc.; Note: Maps to XDE in Multimedia Metadata Record | Validate: Views Value Table | Detail)~ Full View)~ Aerial view)~ 360 degrees)~x-ray)~ | no repeat within group |
| Catalog | RIR | Related-Image-Relationship-Type | * | N | RIG | The relation between this work and the image, using values from the Dublin Core Relationship Types. If original work is analog, and the image is digital, this value will be "HasFormat". If the original work is digital and the image is digital, this value is "hasVersion". | Validate: DC Relations Value Table | HasFormat)~ HasVersion)~ | #####<br>#####<br>##### |
| Catalog | RIL | Related-Image-Identifier/Link | * | N | RIG | The identifier of the related image' Note: maps to XID in Multimedia Metadata Record | Validate: AMICO Inst. Code, period, alpha-numeric, period, 3 char. MIME Type from Value list | AIC_96-34543.tif)~ SFMA.89-2335.jpg)~ | |

FIGURE 31K

| Catalog | RMG | Related Multimedia | | Y | Group | Does not contain data; groups fields documenting related multimedia files. | | Validate. Null value only. | |
|---|---|---|---|---|---|---|---|---|---|
| Catalog | RMD | Related-Multimedia-Description | | N | RMG | A description of the related multimedia file. Note: Maps to XDE in Multimedia Metadata Record | | no conditions | Interview, in the artist's studio, January 17, 1993)~ "Fly-Through" movie of the installation seen from three feet above ground)~ Interpretation offered by the Museum Director in the gallery audio)~ |
| Catalog | RMR | Related-Multimedia-Relationship-Type | | N | RMG | The relationship between this work and the related multimedia file, expressed using Dublin Core Relationship Types. Note: inverse in XRT of Multimedia Metadata Record | DC Relations | Validate. DC Relations Type Value Table | References)~ IsVersionOf)~ IsBasedOn)~ |
| Catalog | RML | Related-Multimedia-Identifier/Link | | N | RMG | The identifier of the related multimedia file. Note: maps to XID in Multimedia Metadata Record | | Validate. AMICO Inst. Code, period, alpha-numeric, period, 3 char. MIME Type from Value list | SFMA 96-543.mov)~ SDCA.1324:87.1.wav)~ NMAA 67-3452.cgm)~ |
| Catalog | RDG | Related Documents | | Y | Group | Does not contain data; groups fields describing related documents. | | Validate. Null value only. | |
| Catalog | RDD | Related-Document-Description | | N | RDG | The description, or title with full citation, of the related document. Note: Maps to XDE in Multimedia Metadata Record | | no conditions. | Johnson, James, "Major Works by Hungarian Artists, London, Ballet & Baney, 1963 p.137-138)~ The New Reporter, "ARTopenARTclosed", June 17, 1989, p.7)~ transcript of gallery talk at opening, Museum Archives)~ |

FIGURE 31L

| | | | | | | | |
|---|---|---|---|---|---|---|---|
| Catalog | RDR | Related-Document-Relationship-Type | | N | RDG | A description of the relationship between the work and the related document, expressed using Dublin Core Relationship Types. Note: inverse of XRT in Multimedia Metadata Record | DC Relations | Validate. DC Relations Type Value Table | References}~ | |
| Catalog | RDL | Related-Document-Identifier/Link | | N | RDG | The Identifier of the Related Document. Note: maps to XID in Multimedia Metadata Record | | Validate. AMICO Inst. Code, period, alpha-numeric, period, 3 char. MIME Type from Value list | WGA_doc1876-45.sgm}~ MIA_newreporter46.gif}~ NWAA Ex85-342.txt}~ | |
| Who documented it? | | | | | | | | | | |
| Catalog | DCG | Documentation/Cataloguing-History | | Y | Group | Does not contain data; groups fields recording the documentation history of the work | | Validate. Null value only. | }~ | Tag changed from DCH to make consistent with other group tags | ###### |
| Catalog | DCB | Documented/Cataloged By | | N | DCG | The name of the person who documented the work. | | no conditions. | Jameson}~ PDT}~ PhotoServices3}~ | no repeat within group | ###### |
| Catalog | DCD | Documented/Cataloged-Date | | N | DCG | The date the work was documented. | date | Validate. YYYYMMDD | 19870415}~ | no repeat within group | ###### |

FIGURE 31M

| Version Control? | | | | | | | |
|---|---|---|---|---|---|---|---|
| Catalog | AVD | AMICO Validated Date | * | N | Entered by AMICO. The date the catalog record for a work of art was validated; created by AMICO | date | Validate. YYYYMMDD | 19980324}~19980214}~ |
| Catalog | AVV | Validation-Dictionary-Version | * | N | Entered by AMICO. The version of the AMICO data dictionary in which the work is documented. | numeric | Validate. Numeric | 1.0}~1.3}~ 2.1}~ |
| Catalog | ADP | AMICO Data Processing | | Y | Entered by AMICO. A record of any data processing or parsing done by AMICO; includes notes of errors, warnings, and additions through parsing routines. | | | measurement data parsed; Error - OCT is a required field! |
| Catalog | DEL | AMICO Deletion Flag | | N | Entered by AMICO. Indicates that a record should be removed from all public distributions of the library. Y=deleted record | flag Y/N | | Y}~ | added field that tracks record deletion | ###### |
| Catalog | ALY | AMICO Library Year | | N | Entered by AMICO. Indicates which library year this record was originally received in. | numeric | Validate. Numeric 4 digits exactly | 1998}~1999}~ | added field to track when record was originally submitted | ###### |

FIGURE 31N

| | | | * | N | | Validate. | MMA_39504.TIF AIC_NUMBER.MOV | | |
|---|---|---|---|---|---|---|---|---|---|
| Media Metadata | XID | DC.Resource.Ide ntifier | | N | The identifier of the metadata file. Maps to RIL, RML or RIOL in catalog record. Validation ensures conformity to file naming conventions | | | | |
| Media Metadata | XTT | DC.Title | | Y | The title or name of the work in the media file; maps to RID, RMD, or RDD in the catalog record. | | Front view | | |
| Media Metadata | XCN | DC.Creator | | Y | Group Does not contain data; groups fields documenting the creation of the media file. | | );~ | | |
| Media Metadata | XCP | DC.Creator.Pers onalName | | Y | XCN The Personal Name of the creator of media file | | | | |
| Media Metadata | XCC | DC.Creator.Cor porateName | | Y | XCN The Corporate Name of the Creator of the media file. | | | | |
| Media Metadata | XCR | DC.Creator.Rol e | | Y | XCN The role the named creator played in the making of the media file. | | | | |

FIGURE 310

| | | | | | | |
|---|---|---|---|---|---|---|
| Media Metadata | XDE | DC Description | | Y | A narrative description of the contents of the media file. | |
| Media Metadata | XPU | DC Publisher | * | N | The name of the institution that made the media file available; i.e. the name of the contributing AMICO member. | Art Institute of Chicago |
| Media Metadata | XDN | DC Contributor | | Y | Does not contain data; groups fields documenting other contributions to the creation of the media file. Group | |
| Media Metadata | XDP | DC Contributor. PersonalName | | Y | The Personal Name of a contributor to the creation of the media file. XDN | |
| Media Metadata | XDC | DC Contributor. CorporateName | | Y | The Corporate Name of a contributor to the creation of the media file. XDN | |
| Media Metadata | XDR | DC Contributor. Role | | Y | The role played by the contributor in the creation of the media file. XDN | |
| Media Metadata | XDA | DC Date | | Y | The date that the media file was created, in the format YYYYMMDD. Validate. | |

FIGURE 31P

| | | | | | | | |
|---|---|---|---|---|---|---|---|
| Media Metadata | XRT | DC.ResourceType | * | N | | A "genre-like" term, characterizing the content of the media file. For example, critical analytical report; critical review; interview; letter; lecture; portrait; reproduction; | | reproduction | | |
| Media Metadata | XAM | AMICO.Mode | * | N | | A term indicating the modality in which a person will experience the resource: audio; image; model; multimedia; text; video | Validate. | image | | |
| Media Metadata | XFO | DC.Format | | Y | | Not Used: AMICO records format in specific sub-elements. | | | | |
| Media Metadata | XFE | AMICO.Format. Encoding | * | N | XFO | The manner in which the data in the media file is encoded. E.g. gif; tiff; jfif; ascii | Validate. | TIFF | group tag added - part of XFO -- corrected TIFF in example | ###### |
| Media Metadata | XFP | AMICO.Format. ColorPalette | | N | XFO | The color palette of the media file. E.g. RGB, CMYK, Grayscale | | RGB | group tag added - part of XFO | ###### |
| Media Metadata | XCM | AMICO.Format. ColorMetric | | N | XFO | The manner in which the color data is represented; e.g. 24-bit, 8-bit. | | 24-bit | group tag added - part of XFO | ###### |
| Media Metadata | XFD | AMICO.Format. Dimensions | * | N | XFO | The dimensions of the media file: For an image, the spatial resolution of the image, e.g. 1024 x 768; 640 x 480; etc. | | 1024 x 768 | group tag added - part of XFO | ###### |

FIGURE 31Q

| | | | | | | | |
|---|---|---|---|---|---|---|---|
| Media Metadata | XFF | AMICO.Format.FileSize | | N | XFO | The storage size of the media file. | | 2.7 MB. | group tag added - part of XFO | ###### |
| Media Metadata | XFC | AMICO.Format.Compression | * | N | XFO | The compression algorithm used in storing the media file: none; jpeg; mpeg; etc. | Validate. | JPEG}~MPEG}~QT}~ | group tag added - part of XFO - corrected delimiters in examples | ###### |
| Media Metadata | XRE | DC.Relation | | Y | Group | Does not contain data; used to group fields documenting relationships. | | | | |
| Media Metadata | XRY | DC.Relation.Type | * | N | XRE | The kind of relationship, expressed as a Dublin Core Relationship type. Note: this is the inverse of the relation in the record pointed to by the Relation.Identifier. | DC Relations | IsFormatOf}~IsVersionOf}~ | | |
| Media Metadata | XRI | DC.Relation.Identifier | * | N | XRE | The identifier of the related work, image, metadata or sound; If within the AMICO Library, this must conform to naming conventions; warning produced if points outside AMICO dataset. | Validate. | AGO_253846v | | |
| Media Metadata | XRS | DC.Rights | * | Y | | Text of rights statement for this media file. | | Copyright Art Institute of Chicago | | |
| Media Metadata | XMN | AMICO.Media.Note | | N | | Capture details and other matters of importance for understanding the quality/content of the digital file. | | | | |

FIGURE 31R

| | | | | | | | |
|---|---|---|---|---|---|---|---|
| Media Metadata | XVD | AMICO Metadata Validation Date | * | N | Added by AMICO: Date the file was validated | Validate. | | 19980506 | | |
| Media Metadata | XVV | AMICO Data Dictionary Version | * | N | Version of the Data Dictionary | numeric | | 1 | | ###### |
| Media Metadata | XPR | Metadata Data Processing Note | * | Y | Added by AMICO: Documents data processing routines, errors and additions through parsing routines | | | WARNING: XRI does not point to a valid AID | Can repeat | |
| Media Metadata | XDL | Metadata Deletion Flag | | N | Entered by AMICO. Indicates that a record should be removed from all public distributions of the library. Y=deleted record | flag Y/N | | Y | add field that tracks record status (deleted?) | ###### |
| Media Metadata | XLY | Metadata Library Year | | N | Entered by AMICO. Indicates which library year this record was originally received in. | numeric | Validate. 4 digits only | 1998 | add field that tracks which library year record was submitted in. | ###### |

Deleted Fields

| | | | | | | | |
|---|---|---|---|---|---|---|---|
| Catalog Record | OLC | Object Label Copy | | | | | | | not used consistently - existing data transferred to OID | ###### |

FIGURE 31S

```
<!-- ====
    Auth
    $Id: ;
    ====
```

1. COMBINES amico-objects.dtd and amico-media.dtd into a SINGLE DTD.

2. Defines an ADDITIONAL LEVEL on top of the AMICO elements, corresponding to the abstract classification of AMICO elements in the data dictionary:

|  |  |
|---|---|
| am_classification?, | What is it? |
| am_titles, | What is it called? |
| am_appearance?, | What does it look like? |
| am_creators, | Who made it? |
| am_creation_date, | When was it made? |
| am_creation_place?, | Where was it made? |
| am_context?, | What is it about? |
| am_criticism?, | What does it mean? |
| am_exhibitions?, | Who showed it? |
| am_owners, | Who owned it? |
| am_related_works, | What is it related to? |
| am_documenters?, | Who documented it? |
| am_version_control?, | Version Control? |
| am_media_metadata | Media Metadata |

```
==================================================================
```
NAMING CONVENTIONS FOR ELEMENTS:

The AMICO data dictionary has a
    o TAG column defining a 3-letter abbreviation, and a
    o AMICO-FIELD column with the full name of the field.
These two components make up the XML tag name as follows:
    o XYZ__AMICO_FIELD_NAME
For elements which are *groups*, i.e., contain subelements, just one underscore is used.
Example:
    o CLG_classification    (group)
    o OTY__object_type    (atomic element)

NOTE: OLC is not modeled, as it is listed under 'deleted fields'
```
==================================================================
```
MULTIPLICITY OF ELEMENTS IN DTDs:
    * = zero-or-more
    + = one-or-more
    ? = zero-or-one
    otherwise: exactly one NOTE:    OLC is not modeled, as it is listed under 'deleted fields'

| 32A |
|---|
| 32B |
| 32C |
| 32D |
| 32E |
| 32F |
| 32G |
| 32H |
| 32I |
| 32J |
| 32K |

<!ELEMENT am_objects (am_object*) >

<!ELEMENT am_object (
            AID__amico_identifier,
            am_classification?,
            am_titles,
            am_appearance?,
            am_creators,
            am_creation_dates,
            am_creation_place?,
            am_context?,
            am_criticism?,
            am_exhibitions?,
            am_owners,
            am_related_works?,
            am_documenters?,
            am_version_control?,
            am_media_metadata
            )>

<!ELEMENT am_classification (
            OTY__object_type*,
            OPP__object_parts_pieces*,
            CLG_classification*
            )>

<!ELEMENT CLG_classification (
            CLS__classification_scheme?,
            CLT__classification_term?
            )>

<!ELEMENT am_titles (
            OTG_object_title_name+,
            OST__state*,
            OEN__edition*
            )>

<!ELEMENT OTG_object_title_name (
            OTN__object_title_name?,
            OTT__title_type*
            )>
```

FIGURE 32B

```
<!ELEMENT am_appearance (
          OPD__physical_description?,
          OPA__physical_orientation_arrangement?,
          MET__measurements_text*,
          MEG_measurements*,
          OMG_materials_and_techniques*,
          OIN__inscriptions_and_or_marks*,
          OCH__condition_examination_history*,
          OTH__treatment_conservation_history*
          )>

<!ELEMENT MEG_measurements (
          MCM__measurement_component_measured?,
          MED__measurement_dimension?,
          MDV__measurement_dimension_value?,
          MDU__measurement_dimension_units?,
          MEQ__measurement_qualifier?
          )>

<!ELEMENT OMG_materials_and_techniques (
          OMD__materials_and_techniques_description?,
          OMT__materials_and_techniques_process_technique_term*,
          OMM__materials_and_techniques_materials_term*,
          OMS__materials_and_techniques_support*
          )>

<!ELEMENT am_creators (
          CRG_creator*
          )>

<!ELEMENT CRG_creator (
          CRQ__creator_qualifier?,
          CRT__creator_name_text,
          CRN__creator_name?,
          CRC__creator_culture_nationality?,
          CDT__creator_dates_locations_text?,
          CBD__creator_birth_date?,
          CBP__creator_birth_place?,
          CBQ__creator_birth_qualifier?,
          CDD__creator_death_date?,
          CDP__creator_death_place?,
          CDQ__creator_death_qualifier?,
          CAD__creator_active_date?,
          CAP__creator_active_place*,
          CGN__creator_gender?,
          CRB__creator_biography?,
          CRR__creator_role*,
          CNO__creator_notes?
          )>
```

FIGURE 32C

```
<!ELEMENT am_creation_dates (
          OCG_creation_dates*
     )>

<!ELEMENT OCG_creation_dates (
          OCT__creation_date_text,
          OCS__creation_date_start?,
          OCE__creation_date_end?,
          OCQ__creation_date_qualifier?
     )>

<!ELEMENT am_creation_place (
          OCP__creation_place*
     )>

<!ELEMENT am_context (
          STG_style_period*,
          SUG_subject_matter*,
          CXG_context*
     )>

<!ELEMENT STG_style_period (
          STD__style_period_description?,
          STT__style_period_terms*
     )>

<!ELEMENT SUG_subject_matter (
          SUP__subject_matter_preiconographic_description?,
          SUI__subject_matter_iconography*,
          SUT__subject_matter_index_terms*
     )>

<!ELEMENT CXG_context (
          CXD__context_description?,
          CXP__context_related_person*,
          CXS__context_related_site_place*,
          CXT__context_time_period_dates?
     )>

<!ELEMENT am_criticism (
          OCR__critical_responses*
     )>

<!ELEMENT am_exhibitions (
          OEH__exhibition_or_loan_history*
     )>

<!ELEMENT am_owners (
          OOG_owner*,
          OPO__provenance_prior_owners_text*,
          ORG_rights_copyright*
     )>
```

FIGURE 32D

```
<!ELEMENT OOG_owner (
            OON__owner_name,
            OOP__owner_place*,
            OOA__owner_accession_number*,
            OOC__owner_credit_line+
            )>

<!ELEMENT ORG_rights_copyright (
            ORS__copyright_statement,
            ORL__copyright_link?
            )>

<!ELEMENT am_related_works (
            RWG_related_works_of_art*,
            RIG_related_images*,
            RMG_related_multimedia*,
            RDG_related_documents*
            )>

<!ELEMENT RWG_related_works_of_art (
            RWD__related_works_description?,
            RWR__related_works_relationship_type?,
            RWL__related_works_identifier_link?
            )>

<!ELEMENT RIG_related_images (
            RIP__related_image_preferred?,
            RID__related_image_description?,
            RIR__related_image_relationship_type?,
            RIL__related_image_identifier_link?
            )>

<!ELEMENT RMG_related_multimedia (
            RMD__related_multimedia_description?,
            RMR__related_multimedia_relationship_type?,
            RML__related_multimedia_identifier_link?
            )>

<!ELEMENT RDG_related_documents (
            RDD__related_document_description?,
            RDR__related_document_relationship_type?,
            RDL__related_document_identifier_link?
            )>

<!ELEMENT am_documenters (
            DCG_documentation_cataloguing_history*
            )>

<!ELEMENT DCG_documentation_cataloguing_history (
            DCB__documented_cataloged_by?,
            DCD__documented_cataloged_date?
            )>
```

FIGURE 32E

```
<!ELEMENT am_version_control (
          AVD__amico_validated_date?,
          AVV__validation_dictionary_version?,
          ADP__amico_data_processing*,
          DEL__amico_deletion_flag?,
          ALY__amico_library_year?
          )>

<!-- ======== MEDIA METADATA ===================================== -->

<!ELEMENT am_media_metadata (
          XID__dc_resource_identifier?,
          XTI__dc_title*,
          XCN_dc_creator*,
          XDE__dc_description*,
          XPU__dc_publisher?,
          XDN_dc_contributor*,
          XDA__dc_date*,
          XRT__dc_resourcetype?,
          XAM__amico_mode?,
          XFO_dc_format*,
          XRE_dc_relation*,
          XRS__dc_rights+,
          XMN__amico_media_note?
          XVD__amico_metadata_validation_date?,
          XVV__amico_data_dictionary_version?,
          XPR__metadata_data_processing_note*,
          XDL__metadata_delition_flag?,
          XLY__metadata_library_year?
          )>

<!ELEMENT XCN_dc_creator (
          XCP__dc_creator_personalname*,
          XCC__dc_creator_corporatename*,
          XCR__dc_creator_role*
          )>

<!ELEMENT XDN_dc_contributor (
          XDP__dc_contributor_personalname*,
          XDC__dc_contributor_corporatename*,
          XDR__dc_contributor_role*
          )>

<!ELEMENT XFO_dc_format (
          XFE__amico_format_encoding?,
          XFP__amico_format_colorpalette?,
          XCM__amico_format_colormetric?,
          XFD__amico_format_dimensions?,
          XFF__amico_format_filesize?,
          XFC__amico_format_compression?
          )>
```

FIGURE 32F

```
<!ELEMENT XRE_dc_relation (
         XRY__dc_relation_type?,
         XRI__dc_relation_identifier?
         )>

<!-- ========= ATOMIC ELEMENTS ====================================== -->

<!ELEMENT ADP__amico_data_processing
                          (#PCDATA)>
<!ELEMENT AID__amico_identifier
                          (#PCDATA)>
<!ELEMENT ALY__amico_library_year
                          (#PCDATA)>
<!ELEMENT AVD__amico_validated_date
                          (#PCDATA)>
<!ELEMENT AVV__validation_dictionary_version
                          (#PCDATA)>
<!ELEMENT CAD__creator_active_date
                          (#PCDATA)>
<!ELEMENT CAP__creator_active_place
                          (#PCDATA)>
<!ELEMENT CBD__creator_birth_date
                          (#PCDATA)>
<!ELEMENT CBP__creator_birth_place
                          (#PCDATA)>
<!ELEMENT CBQ__creator_birth_qualifier
                          (#PCDATA)>
<!ELEMENT CDD__creator_death_date
                          (#PCDATA)>
<!ELEMENT CDP__creator_death_place
                          (#PCDATA)>
<!ELEMENT CDQ__creator_death_qualifier
                          (#PCDATA)>
<!ELEMENT CDT__creator_dates_locations_text
                          (#PCDATA)>
<!ELEMENT CGN__creator_gender
                          (#PCDATA)>
<!ELEMENT CLS__classification_scheme
                          (#PCDATA)>
<!ELEMENT CLT__classification_term
                          (#PCDATA)>
<!ELEMENT CNO__creator_notes
                          (#PCDATA)>
<!ELEMENT CRB__creator_biography
                          (#PCDATA)>
<!ELEMENT CRC__creator_culture_nationality
                          (#PCDATA)>
<!ELEMENT CRN__creator_name
                          (#PCDATA)>
<!ELEMENT CRQ__creator_qualifier
                          (#PCDATA)>
<!ELEMENT CRR__creator_role
```

FIGURE 32G

```
<!ELEMENT CRT__creator_name_text
                              (#PCDATA)>
<!ELEMENT CXD__context_description
                              (#PCDATA)>
<!ELEMENT CXP__context_related_person
                              (#PCDATA)>
<!ELEMENT CXS__context_related_site_place
                              (#PCDATA)>
<!ELEMENT CXT__context_time_period_dates
                              (#PCDATA)>
<!ELEMENT DCB__documented_cataloged_by
                              (#PCDATA)>
<!ELEMENT DCD__documented_cataloged_date
                              (#PCDATA)>
<!ELEMENT DEL__amico_deletion_flag
                              (#PCDATA)>
<!ELEMENT
MCM__measurement_component_measured
                              (#PCDATA)>
<!ELEMENT MDU__measurement_dimension_units
                              (#PCDATA)>
<!ELEMENT MDV__measurement_dimension_value
                              (#PCDATA)>
<!ELEMENT MED__measurement_dimension
                              (#PCDATA)>
<!ELEMENT MEQ__measurement_qualifier
                              (#PCDATA)>
<!ELEMENT MET__measurements_text
                              (#PCDATA)>
<!ELEMENT OCE__creation_date_end
                              (#PCDATA)>
<!ELEMENT OCH__condition_examination_history
                              (#PCDATA)>
<!ELEMENT OCP__creation_place
                              (#PCDATA)>
<!ELEMENT OCQ__creation_date_qualifier
                              (#PCDATA)>
<!ELEMENT OCR__critical_responses
                              (#PCDATA)>
<!ELEMENT OCS__creation_date_start
                              (#PCDATA)>
<!ELEMENT OCT__creation_date_text
                              (#PCDATA)>
<!ELEMENT OEH__exhibition_or_loan_history
                              (#PCDATA)>
<!ELEMENT OEN__edition
                              (#PCDATA)>
<!ELEMENT OIN__inscriptions_and_or_marks
                              (#PCDATA)>
```

FIGURE 32H

```
<!ELEMENT OMD__materials_and_techniques_description
                    (#PCDATA)>
<!ELEMENT OMM__materials_and_techniques_materials_term
                    (#PCDATA)>
<!ELEMENT OMS__materials_and_techniques_support
                    (#PCDATA)>
<!ELEMENT OMT__materials_and_techniques_process_technique_term
                    (#PCDATA)>
<!ELEMENT OOA__owner_accession_number
                    (#PCDATA)>
<!ELEMENT OOC__owner_credit_line
                    (#PCDATA)>
<!ELEMENT OON__owner_name
                    (#PCDATA)>
<!ELEMENT OOP__owner_place
                    (#PCDATA)>
<!ELEMENT OPA__physical_orientation_arrangement
                    (#PCDATA)>
<!ELEMENT OPD__physical_description
                    (#PCDATA)>
<!ELEMENT OPO__provenance_prior_owners_text
                    (#PCDATA)>
<!ELEMENT OPP__object_parts_pieces
                    (#PCDATA)>
<!ELEMENT ORL__copyright_link
                    (#PCDATA)>
<!ELEMENT ORS__copyright_statement
                    (#PCDATA)>
<!ELEMENT OST__state
                    (#PCDATA)>
<!ELEMENT OTH__treatment_conservation_history
                    (#PCDATA)>
<!ELEMENT OTN__object_title_name
                    (#PCDATA)>
<!ELEMENT OTT__title_type
                    (#PCDATA)>
<!ELEMENT OTY__object_type
                    (#PCDATA)>
<!ELEMENT RDD__related_document_description
                    (#PCDATA)>
<!ELEMENT RDL__related_document_identifier_link
                    (#PCDATA)>
<!ELEMENT RDR__related_document_relationship_type
                    (#PCDATA)>
<!ELEMENT RID__related_image_description
                    (#PCDATA)>
<!ELEMENT RIL__related_image_identifier_link
                    (#PCDATA)>
<!ELEMENT RIP__related_image_preferred
                    (#PCDATA)>
```

FIGURE 32I

```
<!ELEMENT RIR__related_image_relationship_type
                            (#PCDATA)>
<!ELEMENT RMD__related_multimedia_description
                            (#PCDATA)>
<!ELEMENT RML__related_multimedia_identifier_link
                            (#PCDATA)>
<!ELEMENT RMR__related_multimedia_relationship_type
                            (#PCDATA)>
<!ELEMENT RWD__related_works_description
                            (#PCDATA)>
<!ELEMENT RWL__related_works_identifier_link
                            (#PCDATA)>
<!ELEMENT RWR__related_works_relationship_type
                            (#PCDATA)>
<!ELEMENT STD__style_period_description
                            (#PCDATA)>
<!ELEMENT STT__style_period_terms
                            (#PCDATA)>
<!ELEMENT SUI__subject_matter_iconography
                            (#PCDATA)>
<!ELEMENT SUP__subject_matter_preiconographic_description
                            (#PCDATA)>
<!ELEMENT SUT__subject_matter_index_terms
                            (#PCDATA)>
<!-- ======== MEDIA METADATA ======================================
>

<!ELEMENT XAM__amico_mode
                            (#PCDATA)>
<!ELEMENT XCC__dc_creator_corporatename
                            (#PCDATA)>
<!ELEMENT XCM__amico_format_colormetric
                            (#PCDATA)>
<!ELEMENT XCP__dc_creator_personalname
                            (#PCDATA)>
<!ELEMENT XCR__dc_creator_role
                            (#PCDATA)>
<!ELEMENT XDA__dc_date
                            (#PCDATA)>
<!ELEMENT XDC__dc_contributor_corporatename
                            (#PCDATA)>
<!ELEMENT XDE__dc_description
                            (#PCDATA)>
<!ELEMENT XDL__metadata_delition_flag
                            (#PCDATA)>
<!ELEMENT XDP__dc_contributor_personalname
                            (#PCDATA)>
<!ELEMENT XDR__dc_contributor_role
                            (#PCDATA)>
<!ELEMENT XFC__amico_format_compression
                            (#PCDATA)>
<!ELEMENT XFD__amico_format_dimensions
                            (#PCDATA)>
```

FIGURE 32J

```
<!ELEMENT XFE__amico_format_encoding
                            (#PCDATA)>
<!ELEMENT XFF__amico_format_filesize
                            (#PCDATA)>
<!ELEMENT XFP__amico_format_colorpalette
                            (#PCDATA)>
<!ELEMENT XID__dc_resource_identifier
                            (#PCDATA)>
<!ELEMENT XLY__metadata_library_year
                            (#PCDATA)>
<!ELEMENT XMN__amico_media_note
                            (#PCDATA)>
<!ELEMENT XPR__metadata_data_processing_note
                            (#PCDATA)>
<!ELEMENT XPU__dc_publisher
                            (#PCDATA)>
<!ELEMENT XRI__dc_relation_identifier
                            (#PCDATA)>
<!ELEMENT XRS__dc_rights
                            (#PCDATA)>
<!ELEMENT XRT__dc_resourcetype
                            (#PCDATA)>
<!ELEMENT XRY__dc_relation_type
                            (#PCDATA)>
<!ELEMENT XTI__dc_title
                            (#PCDATA)>
<!ELEMENT XVD__amico_metadata_validation_date
                            (#PCDATA)>
<!ELEMENT XVV__amico_data_dictionary_version
                            (#PCDATA)>
```

FIGURE 32K

```perl
#!/usr/local/bin/perl -w
use strict;

#=====================================================================
# amico2xml AMICO records to XML conversion
# Author:   Bertram Ludaescher <ludaesch@sdsc.edu>

# call:     amico2xml file
# returns:  XML-ified version

# 2do:      extend escXML, handling of binary data
# $Id: amico2xml,v 1.1 1999/04/06 08:43:40 ludaesch Exp $
===================================================================== my $output;         # handle for current output stream
my @record = ();    # current record (= array of fields)
my $tab = 2;        # current output tab position sub ind {           # indent according to current tab position
  return " " x $tab
} my %long_tag =              # hash of defined tags (long names currently
            # not used)
  (
  "ADP" => "ADP__amico_data_processing",
  "AID" => "AID__amico_identifier",
  "ALY" => "ALY__amico_library_year",
  "AVD" => "AVD__amico_validated_date",
  "AVV" => "AVV__validation_dictionary_version",
  "CAD" => "CAD__creator_active_date",
  "CAP" => "CAP__creator_active_place",
  "CBD" => "CBD__creator_birth_date",
  "CBP" => "CBP__creator_birth_place",
  "CBQ" => "CBQ__creator_birth_qualifier",
  "CDD" => "CDD__creator_death_date",
  "CDP" => "CDP__creator_death_place",
  "CDQ" => "CDQ__creator_death_qualifier",
  "CDT" => "CDT__creator_dates_locations_text",
  "CGN" => "CGN__creator_gender",
  "CLG" => "CLG_classification",
  "CLS" => "CLS__classification_scheme",
  "CLT" => "CLT__classification_term ",
  "CNO" => "CNO__creator_notes",
  "CRB" => "CRB__creator_biography",
  "CRC" => "CRC__creator_culture_nationality",
```

| 35A |
|-----|
| 35B |
| 35C |
| 35D |
| 35E |
| 35F |
| 35G |

FIGURE 35A

```
"CRG" => "CRG_creator",
 "CRN" => "CRN__creator_name",
 "CRQ" => "CRQ__creator_qualifier",
 "CRR" => "CRR__creator_role",
 "CRT" => "CRT__creator_name_text",
 "CXD" => "CXD__context_description",
 "CXG" => "CXG_context",
 "CXP" => "CXP__context_related_person",
 "CXS" => "CXS__context_related_site_place",
 "CXT" => "CXT__context_time_period_dates ",
 "DCB" => "DCB__documented_cataloged_by",
 "DCD" => "DCD__documented_cataloged_date ",
 "DCG" => "DCG_documentation_cataloguing_history",
 "DEL" => "DEL__amico_deletion_flag",
 "MCM" => "MCM__measurement_component_measured",
 "MDU" => "MDU__measurement_dimension_units",
 "MDV" => "MDV__measurement_dimension_value",
 "MED" => "MED__measurement_dimension",
 "MEG" => "MEG_measurements",
 "MEQ" => "MEQ__measurement_qualifier ",
 "MET" => "MET__measurements_text",
 "OCE" => "OCE__creation_date_end",
 "OCG" => "OCG_creation_dates",
 "OCH" => "OCH__condition_examination_history",
 "OCP" => "OCP__creation_place",
 "OCQ" => "OCQ__creation_date_qualifier",
 "OCR" => "OCR__critical_responses",
 "OCS" => "OCS__creation_date_start",
 "OCT" => "OCT__creation_date_text",
 "OEH" => "OEH__exhibition_or_loan_history",
 "OEN" => "OEN__edition",
 "OIN" => "OIN__inscriptions_and_or_marks",
 "OMD" => "OMD__materials_and_techniques_description",
 "OMG" => "OMG_materials_and_techniques",
 "OMM" => "OMM__materials_and_techniques_materials_term",
 "OMS" => "OMS__materials_and_techniques_support",
 "OMT" => "OMT__materials_and_techniques_process_technique_term",
 "OOA" => "OOA__owner_accession_number",
 "OOC" => "OOC__owner_credit_line",
 "OOG" => "OOG_owner",
 "OON" => "OON__owner_name",
 "OOP" => "OOP__owner_place",
 "OPA" => "OPA__physical_orientation_arrangement",
 "OPD" => "OPD__physical_description",
 "OPO" => "OPO__provenance_prior_owners_text",
 "OPP" => "OPP__object_parts_pieces",
 "ORG" => "ORG_rights_copyright",
 "ORL" => "ORL__copyright_link",
 "ORS" => "ORS__copyright_statement",
 "OST" => "OST__state",
 "OTG" => "OTG_object_title_name",
 "OTH" => "OTH__treatment_conservation_history",
```

FIGURE 35B

```
"OTN" => "OTN__object_title_name",
 "OTT" => "OTT__title_type ",
 "OTY" => "OTY__object_type",
 "RDD" => "RDD__related_document_description",
 "RDG" => "RDG_related_documents",
 "RDL" => "RDL__related_document_identifier_link",
 "RDR" => "RDR__related_document_relationship_type",
 "RID" => "RID__related_image_description",
 "RIG" => "RIG_related_images",
 "RIL" => "RIL__related_image_identifier_link",
 "RIP" => "RIP__related_image_preferred",
 "RIR" => "RIR__related_image_relationship_type",
 "RMD" => "RMD__related_multimedia_description",
 "RMG" => "RMG_related_multimedia",
 "RML" => "RML__related_multimedia_identifier_link",
 "RMR" => "RMR__related_multimedia_relationship_type",
 "RWD" => "RWD__related_works_description",
 "RWG" => "RWG_related_works_of_art",
 "RWL" => "RWL__related_works_identifier_link",
 "RWR" => "RWR__related_works_relationship_type ",
 "STD" => "STD__style_period_description",
 "STG" => "STG_style_period",
 "STT" => "STT__style_period_terms ",
 "SUG" => "SUG_subject_matter",
 "SUI" => "SUI__subject_matter_iconography",
 "SUP" => "SUP__subject_matter_preiconographic_description",
 "SUT" => "SUT__subject_matter_index_terms ",
 "XAM" => "XAM__amico_mode",
 "XCC" => "XCC__dc_creator_corporatename",
 "XCM" => "XCM__amico_format_colormetric",
 "XCN" => "XCN_dc_creator",
 "XCP" => "XCP__dc_creator_personalname",
 "XCR" => "XCR__dc_creator_role ",
 "XDA" => "XDA__dc_date",
 "XDC" => "XDC__dc_contributor_corporatename",
 "XDE" => "XDE__dc_description",
 "XDL" => "XDL__metadata_delition_flag",
 "XDN" => "XDN_dc_contributor",
 "XDP" => "XDP__dc_contributor_personalname",
 "XDR" => "XDR__dc_contributor_role ",
 "XFC" => "XFC__amico_format_compression",
 "XFD" => "XFD__amico_format_dimensions",
 "XFE" => "XFE__amico_format_encoding",
 "XFF" => "XFF__amico_format_filesize",
 "XFO" => "XFO_dc_format",
 "XFP" => "XFP__amico_format_colorpalette",
 "XID" => "XID__dc_resource_identifier",
 "XLY" => "XLY__metadata_library_year",
 "XMN" => "XMN__amico_media_note",
 "XPR" => "XPR__metadata_data_processing_note",
 "XPU" => "XPU__dc_publisher",
```

FIGURE 35C

```perl
"XRI" => "XRI__dc_relation_identifier",
  "XRS" => "XRS__dc_rights",
  "XRT" => "XRT__dc_resourcetype",
  "XRY" => "XRY__dc_relation_type",
  "XTI" => "XTI__dc_title",
  "XVD" => "XVD__amico_metadata_validation_date",
  "XVV" => "XVV__amico_data_dictionary_version"
);

sub name {          # long or short tagnames
  return $_[0]          # short
# return $long_tag{$_[0]} # long
} my %is_group = ();  # what tags are groups?

while ((my $tag, my $long) = each %long_tag) {
  $is_group{$tag} = 1 if ($long !~ /__/);
} my %group_members =   # members of each group
  (
   "CLG" => "CLS CLT",
   "CRG" => "CRQ CRT CRN CRC CDT CBD CBP CBQ CDD CDP CDQ CAD CAP CGN CRB CRR CNO",
   "CXG" => "CXD CXP CXS CXT",
   "DCG" => "DCB DCD",
   "MEG" => "MCM MED MDV MDU MEQ",
   "OCG" => "OCT OCS OCE OCQ",
   "OMG" => "OMD OMT OMM OMS",
   "OOG" => "OON OOP OOA OOC",
   "ORG" => "ORS ORL",
   "OTG" => "OTN OTT",
   "RDG" => "RDD RDR RDL",
   "RIG" => "RIP RID RIR RIL",
   "RMG" => "RMD RMR RML",
   "RWG" => "RWD RWR RWL",
   "STG" => "STD STT",
   "SUG" => "SUP SUI SUT",
   "XCN" => "XCP XCC XCR",
   "XDN" => "XDP XDC XDR",
   "XFO" => "XFE XFP XCM XFD XFF XFC",
   "XRE" => "XRY XRI"
  );
```

FIGURE 35D

```perl
my %group = ();          # inverse: returns the group of a member
while ((my $group, my $memstr) = each %group_members) {
  my @members = ($memstr =~ m/[A-Z]{3}/g);
  foreach (@members) {
    $group{$_} = $group;
  }
} sub escXML {             # escape characters: EXTEND/FIX!
  $_ = $_[0];
  s/</</g;
  s/&/&/g;
  s/á/a/g;
  s/à/a/g;
  s/â/a/g;
  s/é/e/g;
  s/è/e/g;
  s/ñ/n/g;
  $_;
} sub output_fields {  # output all fields from current record
  @record = @_;
  my $field = shift @record;      # get the next field
  if (defined $field) {
    &output_field($field);              # output it (and more if group!)
    &output_fields(@record);            # recurse through the remains
                              # of @record
  }
} sub output_field {   # output the given field PLUS follow-up group
                     # members!
  (my $field) = @_;
  if ($field =~ /([A-Z]{3})(.*)/) {     # is it a 3 letter tag + data?
    my $tag = $1; my $data = $2;
    if ($long_tag{$tag}) {              # do we know this tag?
      if ($is_group{$tag}) {            # is it a group?
        print &ind, "<", &name($tag), ">\n";
        $tab +=2 ;
        &output_group($tag);            # and output closing tag!
      }
      else {                            # it's a simple recognized tag
        print &ind, "<", &name($tag), ">",
              &escXML($data),
              "</", &name($tag), ">\n";
      }
    } else {                            # don't know this tag!
      print "<am_ERROR type = \"unrecognized tag\">";
      print &ind, "<$tag>", &escXML($data), "</$tag>\n";
      print "</am_ERROR>\n";
    }
```

FIGURE 35E

```perl
  } else {                              # don't understand that field!
     print "<am_ERROR type = \"unrecognized field\">", $_;
     print "</am_ERROR>\n";
  }
} sub output_group {  # output fields WHILE in same group
  (my $grp) = @_;
  my $field = shift @record;       # get the next field
  if (defined $field) {
    if ($field =~ /([A-Z]{3})/) {  # should be a tag
      if (defined $group{$1} and $group{$1} eq $grp) {
                                   # still in the same group??
          &output_field($field);
          &output_group($grp);             # STAY in the same group
      } else {                             # LEAVE group!
          $tab -= 2;
          print &ind, "</", &name($grp), ">\n";    # closing tag for group
          &output_field($field);
      }
    } else {                              # don't understand that field!
      print "<am_ERROR type = \"unrecognized field\">", $_;
      print "</am_ERROR>\n";
    }
  }                                        # empty @record => done
} sub get_record {     # read the next record and return first tag
  chomp;
  @record = split /\}~/;          # End-Of-Record = "|\n"
  my $last = pop(@record);        # get EOR
  if ($last ne "|") {             # ...and check
    print STDOUT "**** ERROR: unknown delimiter <$last>\n";
  }
  if (@record) {      # check if non-empty
    return substr($record[0],0,3)   # return the tag name
  } else {
    print STDOUT "**** WARNING: empty record\n";
    return 0
  }
}
```

open(AM_OBJS, ">amico_objects.xml") or die "*** ERROR <@_>\n<$?>\n";
open(AM_MEDIA, ">amico_media.xml") or die "*** ERROR <@_>\n<$?>\n";

print AM_OBJS <<EOF;
<am_objects>
EOF print AM_MEDIA <<EOF;
<am_media>
EOF print AM_OBJS <<EOF;
<?xml:stylesheet type="text/xsl" href="amico_objects.xsl"?>
# <am_objects>
EOF print AM_MEDIA <<EOF;
<?xml:stylesheet type="text/xsl" href="amico_media.xsl"?>
# <am_media>
EOF while (<>) {
  if (my $tag = &get_record) {          # get next record and tag name
    if ($tag eq "AID") {
      select(AM_OBJS);
      print &ind, "<am_object>\n";
      $tab += 2;
      &output_fields(@record) ;
      $tab -= 2;
      print &ind, "</am_object>\n";
    } elsif ($tag eq "XID") {
      select(AM_MEDIA);
      print &ind, "<am_media_metadata>\n";
      $tab += 2;
      &output_fields(@record) ;
      $tab -= 2;
      print &ind, "</am_media_metadata>\n";
    } else {
      print STDOUT "*** ERROR: unknown tag <$tag> in record: <@record>\n";
    }
  } else {
    print STDOUT "*** ERROR: get_record failed\n";
  }
} print AM_OBJS "</am_objects>\n";
print AM_MEDIA "</am_media>\n";
```

FIGURE 35G

```
#-------------------------------------------
# Perl Script to convert XML SLA version
# into software independent OAV
# representation, ready to be # loaded
# into a variety of engines:
#       - Prolog engine, or
#       - relational database engine, or
#       - XML database engine, or
#       - other

# SCRIPT devised by Richard Marciano &
#                   Bertram Ludaescher &
#                   Reagan Moore
# August 20, 2000, copyright RiM + BL + ReM
#-------------------------------------------

#!/usr/local/bin/perl
#use strict;

#-----------------------------------------------------------------
@boa; %boatype_hash = (); my $bill_count = 0;
    my $amdt_count = 0; my $con_res_count = 0;
    my $j_res_count = 0; my $res_count = 0;

@abstract; %a_value = ();
@congressional_record; %cr_value = ();
@cosponsors; %cs_value = (); @date_introduced;
    %di_value = (); @digest; %d_value = ();
@latest_status; %ls_value = (); @status_actions;
    %sa_value = (); @official_title; %ot_value = ();
@sponsor; %s_value = (); @statement_of_purpose;
    %sop_value = (); @submitted_by; %sb_value = ();
@submitted_for; %sf_value = (); @filename_senator;
@filename_period; @prepared_by; @senator;
@occurrence_section; @occurrence_committee;

@topic_index; %ti_value= ();
----------------------------------------------------------------- my $MORE_SIZE = 20;

my $bill_index_2 = "";
my %tempH = ();

my $line; my $h1; my $h2 = ""; my $h3; my $h4; my $h5; my $h6_1 = ""; my $h6_2
= "";
my $prev_h2 = "";
my $section = 0; my $committee = "";
my $senNAME = ""; my $state = ""; my $senid;

my $filename;
my $line_number;
```

| 36A | 36N |
|---|---|
| 36B | 36O |
| 36C | 36P |
| 36D | 36Q |
| 36E | 36R |
| 36F | 36S |
| 36G | 36T |
| 36H | 36U |
| 36I | 36V |
| 36J | 36W |
| 36K | 36X |
| 36L | 36Y |
| 36M | 36Z |

FIGURE 36A

```perl
my @allfile;

opendir THISDIR , "XMLDATA" or die "can't find DIRECTORY: $!";
@allfile = grep /_LAR/, readdir THISDIR;
closedir THISDIR;
open( LOG, ">logfile" ) || die "*ERROR: can't open logfile\n" ;

#==============================================================================
============= foreach my $sen (@allfile) { my $sen = "D_$ARGV[1]_LAR$ARGV[0]_106.xml";
my $sen = "D_1CP_LAR_S106_106.xml";
#my $sen = "D_1CP_LAR_S216_106.xml";
#my $sen = "D_1_LARI_S272_106.xml";

$sen =~ m/.+\_.+\_.+\_S(\d+)\_.+/;
    $senid = $1;
    $senid = $1;
    $senNAME = "";

$filename = $sen;
    $line_number = 0;

open( SEN106, "XMLDATA/$sen" ) || die "*ERROR: can't open $sen\n" ;
    #open( SEN106, "$sen" ) || die "*ERROR: can't open $sen\n" ;

&process_header( $sen );

N1:while( $line = <SEN106> ) {
        $line_number++;
 N2:;
    # DETECT SECTION headers
    if ( $line =~ m/hidden="on">(.+)<\/string>/ ) {
        $h1 = $1;
# <p align="left" bold="on"><string bold="on">SECTION I. SPONSORED
MEASURES</string></p>
        if ( $h1 =~ m/SECTION I\./ ) {
            $section = 1; $h6_1 = ""; $h6_2 = "";

my $ov = $senid . "_" . "$line_number";

my $len = $#occurrence_section;
            $occurrence_section[ $len + 1 ] = [ ($senid, $line_number,
$section, $h1) ];
        }
        elsif ( $h1 =~ m/SECTION II\./ ) {
            $section = 2; $h6_1 = ""; $h6_2 = "";

my $ov = $senid . "_" . "$line_number";
```

FIGURE 36B

```perl
        elsif ( $h1 =~ m/SECTION IV\./ ) {
            $section = 4;

my $ov = $senid . "_" . "$line_number";

my $len = $#occurrence_section;
            $occurrence_section[ $len + 1 ] = [ ($senid, $line_number,
$section, $h1) ];
        }
        elsif ( $h1 =~ m/SECTION V\./ ) {
            $section = 5; $h6_1 = ""; $h6_2 = "";

my $ov = $senid . "_" . "$line_number";

my $len = $#occurrence_section;
            $occurrence_section[ $len + 1 ] = [ ($senid, $line_number,
$section, $h1) ];
        }
        elsif ( $h1 =~ m/SECTION VI\./ ) {
            $section = 6; $h6_1 = ""; $h6_2 = "";

my $ov = $senid . "_" . "$line_number";

my $len = $#occurrence_section;
            $occurrence_section[ $len + 1 ] = [ ($senid, $line_number,
$section, $h1) ];
        }
        elsif ( $h1 =~ m/SECTION VII\./ ) {
            $section = 7; $h6_1 = ""; $h6_2 = "";

my $ov = $senid . "_" . "$line_number";

my $len = $#occurrence_section;
            $occurrence_section[ $len + 1 ] = [ ($senid, $line_number,
$section, $h1) ];
        }

&process_index;
        }
        else {
            print LOG "!!! error:COULD NOT RECOGNIZE SECTION NUMBER !!!!\n";
        }
    }

# DETECT **** BILL NUMBERS
    elsif ( $line =~ m/>\*\*\*\* (.+)<\/p>/ ) {
        $h2 = $1;
        $h2 =~ s/\s*//g;

if ( $prev_h2 ne "" ) {
#           S.123               1 dot
#           S.Amdt.123   2 dots
```

FIGURE 36C

```perl
            $boatype_hash{ bill }{ $bill }++;
        }
    }
    else {
        if( $list[1] eq "Amdt" ) {
            $amdt_count++;

my $bill;
            foreach $bill ( sort keys %{$tempH{$prev_h2}} ) {
                if ( $boatype_hash{ amdt }{ $bill } eq "" ) {
                    $boatype_hash{ amdt }{ $bill } = 0;
                }
                $boatype_hash{ amdt }{ $bill }++;
            }
        }
        elsif( $list[1] eq "Con" ) {
            $con_res_count++;

foreach my $bill ( sort keys %{$tempH{$prev_h2}} ) {
                if ( $boatype_hash{ con_res }{ $bill } eq "" ) {
                    $boatype_hash{ con_res }{ $bill } = 0;
                }
                $boatype_hash{ con_res }{ $bill }++;
            }
        }
        elsif( $list[1] eq "J" ) {
            $j_res_count++;

foreach my $bill ( sort keys %{$tempH{$prev_h2}} ) {
                if ( $boatype_hash{ j_res }{ $bill } eq "" ) {
                    $boatype_hash{ j_res }{ $bill } = 0;
                }
                $boatype_hash{ j_res }{ $bill }++;
            }
        }
        elsif( $list[1] eq "Res" ) {
            $res_count++;

foreach my $bill ( sort keys %{$tempH{$prev_h2}} ) {
                if ( $boatype_hash{ res }{ $bill } eq "" ) {
                    $boatype_hash{ res }{ $bill } = 0;
                }
                $boatype_hash{ res }{ $bill }++;
            }
        }
        else {
          print "$prev_h2\tERROR in recording boatype_hash\n";
        }
    }
    $list = "";
}
$prev_h2 = $h2;
```

FIGURE 36D

```
    # SKIP OVER header SECTIONS
#<header>
#<p align="center" bold="on" italic="off"><field><fldinst> PAGE
</fldinst><fldrslt><string charstyname="" bold="on" italic="off">2</string>
#       </fldrslt></field></p>
#<p align="right" bold="on" italic="off"><string bold="on" italic="off">Paul
S. Sarbanes</string></p>
#<p align="left" bold="on" italic="off"><string bold="on" italic="off">SECTION
IV. COSPONSORED MEASURES</string></p>
#<p align="left" bold="on" italic="off"><string bold="on"
italic="off">&tab;&tab;  ORGANIZED BY COMMITTEE REFERRAL</string></p>
#<p align="left" bold="on" italic="off"><string bold="on"
italic="off">&tab;&tab;  SENATE: AGRICULTURE</string></p>
#<p align="left" bold="off" italic="off"></p>
</header> elsif ( $line =~ m/<header/ ) {
        my $i = 0;
        while( $line = <SEN106> ) {
            $line_number++;
            if ( $line =~ m/<p align=.+>(.+)<\/p>/ ) {
                $h4 = $1;
                $i++;
                if ( $i == 3 && ( $section == 2 || $section == 3 || $section
== 4 ) ) {
                    $h4 =~ m/SECTION (.+)\. .+<\/string>/;
                    $h5 = $1;
                    if ( $h5 eq "III" ) {
                        $committee = 3;
                    }
                    elsif ( $h5 eq "IV" ) {
                        $committee = 4;
                    }
                    else {
                        $committee = "";
                    }
                }
                elsif ( $i == 5 && ( $committee == 3 || $committee == 4 ) ) {
                    $h4 =~ m/SECTION (.+)\. .+<\/string>/;
                    $h4 =~ m/&tab;&tab;\s+(.+)<\/string>/;
                    $h6_1 = "COMMITTEE";
                    $h6_2 = "$1";

my $ov = $senid . "_" . "$line_number";
#                   $occurrence_value{ $ov } = "";

my $len = $#occurrence_committee;
                    $occurrence_committee[ $len + 1 ] = [ ($senid,
$line_number, $committee, $h6_2) ];
                }
            }
        }
```

FIGURE 36E

```
#----------------------
            my $ov = $senid . "_" . "$line_number";

$di_value{ $val } = "";

my $len = $#date_introduced;
            $date_introduced[ $len + 1 ] = [ ($senid, $line_number, $val) ];
---------------------- if ( $section == 1 || $section == 3 ) {
                $tempH{$h2}{SPONSOR} = "$senid";
---------------------- my $ov = $senid . "_" . "-1";

my $s = $senid;
                $s =~ s/ /_/g;
                $s_value{ $s } = "";

my $len = $#sponsor;
                $sponsor[ $len + 1 ] = [ ($senid, "-1", $s) ];
#----------------------
            } elsif ( $section == 2 || $section == 4 ) {
                $line = <SEN106>;
                $line_number++;
#                <p bold="off" italic="off">SPONSOR: Daschle</p>
                if ( $line =~ m/<p .+>(.+): (.+)<\/p>/ ) {
                    my $mysponsor = $1;
                    my $value     = $2;
                    $tempH{$h2}{SPONSOR} = $value;
---------------------- my $ov = $senid . "_" . "$line_number";

my $s = $value;
                    $s =~ s/ /_/g;
                    $s_value{ $s } = "";

my $len = $#sponsor;
                    $sponsor[ $len + 1 ] = [ ($senid, $line_number, $s) ];
#----------------------
                }
            } elsif ( $section == 5 ) {
<p>SUBMITTED FOR: S.    4&tab;CONGRESSIONAL RECORD: S1830</p>
                $line = <SEN106>;
                $line_number++;
                if ( $line =~ m/<p>(.+)<\/p>/ ) {
                    my $submit = $1;
```

FIGURE 36F

```perl
            my $ov = $senid . "_" . "-1";

my $s = $senid;
            $s =~ s/ /_/g;
            $s_value{ $s } = "";

my $len = $#sponsor;
            $sponsor[ $len + 1 ] = [ ($senid, "-1", $s) ];
#-----------------------
            $line = <SEN106>;
            $line_number++;
            if ( $line =~ m/<p>(.+): (.+)<\/p>/ ) {
                my $submitted_by = $1;
                my $value = $2;

$tempH{$h2}{SUBMITTED_BY} = $value;
#-----------------------
                my $ov = $senid . "_" . "$line_number";

my $sb = $value;
                $sb =~ s/ /_/g;
                $sb_value{ $sb } = "";

my $len = $#submitted_by;
                $submitted_by[ $len + 1 ] = [ ($senid, $line_number, $sb)
];
#-----------------------
            }
            elsif ( $line =~ m/<p align=.+>(.+)<\/p>/ ) {
                $h3 = $1;
                goto N4;
            }
        }
        elsif ( $section == 6) {
#           <p>SUBMITTED FOR: S.    4&tab;CONGRESSIONAL RECORD: S1830</p>
#           <p>SPONSOR: Murray</p>
#           <p>SUBMITTED BY: Bingaman</p>
            $line = <SEN106>;
            $line_number++;
            if ( $line =~ m/<p>(.+)<\/p>/ ) {
                my $submit = $1;
              . my ($part1, $part2) = split(/&tab;/, $submit);
                my ($part1_1, $part1_2) = split(/: /, $part1);
                my ($part2_1, $part2_2) = split(/: /, $part2);

$part1_2 =~ s/\s*//g;

$tempH{$h2}{SUBMITTED_FOR} = $part1_2;
#-----------------------
```

FIGURE 36G

```
#----------------------
                    $tempH{$h2}{CONGRESSIONAL_RECORD} = $part2_2;
#----------------------
                    $ov = $senid . "_" . "$line_number";

my $cr = $part2_2;
                    $cr =~ s/ /_/g;
                    $cr_value{ $cr } = "";

$len = $#congressional_record;
$congressional_record[ $len + 1 ] = [ ($senid,
$line_number, $cr, $h2) ];
                    $congressional_record[ $len + 1 ] = [ ($senid,
$line_number, $cr) ];
#----------------------
                }
                $line = <SEN106>;
                $line_number++;
                if ( $line =~ m/<p>(.+): (.+)<\/p>/ ) {
                    my $mysponsor = $1;
                    my $value = $2;

$tempH{$h2}{SPONSOR} = $value;
----------------------
                    my $ov = $senid . "_" . "$line_number";

my $s = $value;
                    $s =~ s/ /_/g;
                    $s_value{ $s } = "";

my $len = $#sponsor;
                    $sponsor[ $len + 1 ] = [ ($senid, $line_number, $s) ];
#----------------------
                }
                $line = <SEN106>;
                $line_number++;
                if ( $line =~ m/<p>(.+): (.+)<\/p>/ ) {
                    my $submitted_by = $1;
                    my $value = $2;

$tempH{$h2}{SUBMITTED_BY} = $value;
#----------------------
                    my $ov = $senid . "_" . "$line_number";

my $sb = $value;
                    $sb =~ s/ /_/g;
                    $sb_value{ $sb } = "";

my $len = $#submitted_by;
```

FIGURE 36H

```
    N4:if ( $h3 eq "COSPONSORS" ) {
#          <p bold="off" italic="off">Edwards; Bayh; Kerry; Bingaman (A-
11/05/1999):</p>
           $line = <SEN106>;
           $line_number++;
           if ( $line =- m/<p .+>(.+)<\/p>/ ) {
               my $mycosponsors = $1;

if ( ($mycosponsors ne "") && ($mycosponsors ne "NONE") ) {
                   $tempH{$h2}{COSPONSORS} = $mycosponsors;
#-----------------------
                   my $ov = $senid . "_" . "$line_number";

my $cs = $mycosponsors;
                   $cs =- s/ /_/g;
                   $cs_value{ $cs } = "";

my $len = $#cosponsors;
                   $cosponsors[ $len + 1 ] = [ ($senid, $line_number, $cs) ];
#-----------------------
               }
               else {
                   $tempH{$h2}{COSPONSORS} = "NONE";
#-----------------------
                   my $ov = $senid . "_" . "$line_number";

my $cs = $mycosponsors;
                   $cs =- s/ /_/g;
                   $cs value{ $cs } = "";

my $len = $#cosponsors;
                   $cosponsors[ $len + 1 ] = [ ($senid, $line_number, $cs) ];
#-----------------------
               }
           }
           else {
               print LOG "!!! error:$senid:$h2:$h3  COSPONSORS tag !!!!\n";
           }
        } elsif ( $h3 eq "OFFICIAL TITLE" ) {
<p bold="off" italic="off">.......</p>
           $line = <SEN106>;
           $line_number++;
           if ( $line =- m/<p .+>(.+)<\/p>/ ) {
               my $title = $1;
               $tempH{$h2}{OFFICIAL_TITLE} = $title;
#-----------------------
               my $ov = $senid . "_" . "$line_number";
```

FIGURE 36I

```perl
        elsif ( $h3 eq "LATEST STATUS" || $h3 eq "STATUS ACTIONS" ) {
#           <p bold="off"><string bold="on">Oct 25, 1999&tab;Became Public
Law No: 106-80.</string></p>
#           <p><string>May 27, 1999&tab;Proposed amendment S.Amdt. 387
withdrawn in Senate.</string></p>
#           <p><string>May 27, 1999&tab;Proposed by Senator Levin for Senator
Sarbanes.</string></p>
#           <p align="center" italic="off">ABSTRACT</p>
            my $cumulative_content = "";
            my $i = 0;
            my $save_line_number;
            while ( $line = <SEN106> ) {
                $line_number++;
                if ( $i == 0 ) { $save_line_number = $line_number; }
                $i++;
                if ( $line =~ m/<p.*><string.*>(.+)<\/string><\/p>/ ) {
                    my $content = $1;
                    $cumulative_content .= "$content CCCRRR "; # replace \n
with " CCCRRR "
                }
                else {
                    if ( $h3 eq "LATEST STATUS" ) {
                        $tempH{$h2}{LATEST_STATUS} = $cumulative_content;
                    }
                    elsif ( $h3 eq "STATUS ACTIONS" ) {
                        $tempH{$h2}{STATUS_ACTIONS} = $cumulative_content;
                    }
#----------------------
                    my $ov = $senid . "_" . "$line_number";

if ( $h3 eq "LATEST STATUS" ) {
                        my $status = $cumulative_content;
                        $status =~ s/ /_/g;
                        $ls_value{ $status } = "";

my $len = $#latest_status;
                        $latest_status[ $len + 1 ] = [ ($senid, $line_number,
$status) ];
                    }
                    elsif ( $h3 eq "STATUS ACTIONS" ) {
                        my $status = $cumulative_content;
                        $status =~ s/ /_/g;
                        $sa_value{ $status } = "";

my $len = $#status_actions;
                        $status_actions[ $len + 1 ] = [ ($senid, $line_number,
$status) ];
                    }
#----------------------
                    goto N2;
                }
```

FIGURE 36J

```perl
                }
            } elsif ( $h3 eq "ABSTRACT" ) {
<p italic="off">NONE</p>
            $line = <SEN106>;
            $line_number++;
            if ( $line =~ m/<p.*>(.+)<\/p>/ ) {
                my $abstract = $1;
                $tempH{$h2}{ABSTRACT} = $abstract;
---------------------- my $ov = $senid . "_" . "$line_number";

my $a = $abstract;
                $a =~ s/ /_/g;
                $a_value{ $a } = "";

my $len = $#abstract;
                $abstract[ $len + 1 ] = [ ($senid, $line_number, $a) ];
#----------------------
            }
            else {
                print LOG "!!! error:$senid:$h2:$h3  ABSTRACT tag !!!!\n";
            }
        } elsif ( $h3 eq "STATEMENT OF PURPOSE" ) {
<p align="center" italic="off">STATEMENT OF PURPOSE</p>

#           <p italic="off">...</p>
#                    OR
#           <p align="center" italic="off">ABSTRACT</p>
#                    OR
#           </section>

$line = <SEN106>;
            $line_number++;
---------------------- my $ov = $senid . "_" . "$line_number";
----------------------
            if ( $line =~ m/<p italic=.+>(.*)<\/p>/ ) {
                my $stmt = $1;
                    if ( $stmt eq "" ) {
                        $tempH{$h2}{STATEMENT_OF_PURPOSE} = $stmt;
                    }
                    else {
                        $tempH{$h2}{STATEMENT_OF_PURPOSE} = $stmt;
                    }
#----------------------
                my $sop = $stmt;
                $sop =~ s/ /_/g;
```

FIGURE 36K

```perl
                my $sop = "";
                $sop_value{ $sop } = "";

my $len = $#statement_of_purpose;
                $statement_of_purpose[ $len + 1 ] = [ ($senid, $line_number,
$sop) ];
#-----------------------
                goto N2;
            }
            else {
                print LOG "!!! error:$senid:$h2:$h3  STATEMENT OF PURPOSE tag
!!!!\n";
            }

} elsif ( $h3 eq "DIGEST" ) {
<p italic="off">NONE</p>
            $line = <SEN106>;
            $line_number++;
            if ( $line =~ m/<p .+>(.+)<\/p>/ ) {
                my $mydigest = $1;
                $tempH{$h2}{DIGEST} = $mydigest;
#-----------------------
                my $ov = $senid . "_" . "$line_number";

my $d = $mydigest;
                $d =~ s/ /_/g;
                $d_value{ $d } = "";

my $len = $#digest;
                $digest[ $len + 1 ] = [ ($senid, $line_number, $d) ];
#-----------------------
            }
            else {
                print LOG "!!! error:$senid:$h2:$h3  DIGEST tag !!!!\n";
            }
        } else {
            print LOG "!!! error:$senid:$h2:$h3  UNKNOWN tag !!!!\n";
        }
    }
} # END WHILE THEEND:;
    $prev_h2 = $h2;

} # comment out foreach loop my $buff = "";
```

FIGURE 36L

```
PROCS:

if( $inputstr eq "q" )        { goto MYEND; }
    elsif( $inputstr eq "b" )     { &print_table( "boa" ); }
    elsif( $inputstr eq "a" )     { &print_table( "abstract" ); }
    elsif( $inputstr eq "ha" )    { &print_hash ( "a_value" ); }
    elsif( $inputstr eq "cr" )    { &print_table( "congressional_record" ); }
    elsif( $inputstr eq "hcr" )   { &print_hash ( "cr_value" ); }
    elsif( $inputstr eq "cs" )    { &print_table( "cosponsors" ); }
    elsif( $inputstr eq "hcs" )   { &print_hash ( "cs_value" ); }
    elsif( $inputstr eq "di" )    { &print_table( "date_introduced" ); }
    elsif( $inputstr eq "hdi" )   { &print_hash ( "di_value" ) }
    elsif( $inputstr eq "d" )     { &print_table( "digest" ); }
    elsif( $inputstr eq "hd" )    { &print_hash ( "d_value" ); }
    elsif( $inputstr eq "ls" )    { &print_table( "latest_status" ); }
    elsif( $inputstr eq "hls" )   { &print_hash ( "ls_value" ); }
    elsif( $inputstr eq "sa" )    { &print_table( "status_actions" ); }
    elsif( $inputstr eq "hsa" )   { &print_hash ( "sa_value" ); }
    elsif( $inputstr eq "ot" )    { &print_table( "official_title" ); }
    elsif( $inputstr eq "hot" )   { &print_hash ( "ot_value" ); }
    elsif( $inputstr eq "s" )     { &print_table( "sponsor" ); }
    elsif( $inputstr eq "hs" )    { &print_hash ( "s_value" ); }
    elsif( $inputstr eq "sop" )   { &print_table( "statement_of_purpose" ); }
    elsif( $inputstr eq "hsop" )  { &print_hash ( "sop_value" ); }
    elsif( $inputstr eq "sb" )    { &print_table( "submitted_by" ); }
    elsif( $inputstr eq "hsb" )   { &print_hash ( "sb_value" ); }
    elsif( $inputstr eq "sf" )    { &print_table( "submitted_for" ); }
    elsif( $inputstr eq "hsf" )   { &print_hash ( "sf_value" ); }
    elsif( $inputstr eq "ti" )    { &print_table( "topic_index" ); }
    elsif( $inputstr eq "hti" )   { &print_hash( "ti_value" ); } elsif( $inputstr eq "1" )     { &print_table( "filename_senator" ); }
    elsif( $inputstr eq "2" )     { &print_table( "senator" ); }
    elsif( $inputstr eq "3" )     { &print_table( "filename_period" ); }
    elsif( $inputstr eq "4" )     { &print_table( "prepared_by" ); }
    elsif( $inputstr eq "5" )     { &print_table( "occurrence_section" ); }
    elsif( $inputstr eq "6" )     { &print_table( "occurrence_committee" ); }
    elsif( $inputstr eq "pp" )    { &pretty_print_tables( "106" ); }
    else { print "\t\t**** WRONG OPTION ****\n"; }

&print_prompt;
}

MYEND:;

close LOG;
exit;

```perl
        print "\t\"d\".    digest ................ \"hd\".   d_value\n";
        print "\t\"ls\".   latest_status ......... \"hls\".  ls_value\n";
        print "\t\"sa\".   status_actions ........ \"hsa\".  sa_value\n";
        print "\t\"ot\".   official_title ........ \"hot\".  ot_value\n";
        print "\t\"s\".    sponsor ............... \"hs\".   s_value\n";
        print "\t\"sop\".  statement_of_purpose .. \"hsop\". sop_value\n";
        print "\t\"sb\".   submitted_by .......... \"hsb\".  sb_value\n";
        print "\t\"sf\".   submitted_for ......... \"hsf\".  sf_value\n";
        print "\t\"ti\".   topic_index ........... \"hti\".  ti_value\n";
        print "\t\n";
        print "\t\"1\". filename_senator    --- \"2\". senator\n";
        print "\t\"3\". filename_period     --- \"4\". prepared_by\n";
        print "\t\"5\". occurrence_section  --- \"6\". occurrence_committee\n";
        print "\t\n";
        print "\t\"pp\". pretty print (Prolog)---\n";
        print " *******************************\n";
} sub pretty_print_tables {
        my $sid = $_[0];

my $DIR = "Prolog/sen_$senid";
        mkdir $DIR, 0755;

open( PP, ">$DIR/boa.P" ) || die "*ERROR: can't open\n" ;
        &pretty_print( "boa" );
        close PP;

open( PP, ">$DIR/abstract.P" ) || die "*ERROR: can't open\n" ;
        &pretty_print( "abstract" );
        close PP;

open( PP, ">$DIR/congressional_record.P" ) || die "*ERROR: can't open\n" ;
        &pretty_print( "congressional_record" );
        close PP;

open( PP, ">$DIR/cosponsors.P" ) || die "*ERROR: can't open\n" ;
        &pretty_print( "cosponsors" );
        close PP;

open( PP, ">$DIR/date_introduced.P" ) || die "*ERROR: can't open\n" ;
        &pretty_print( "date_introduced" );
        close PP;

open( PP, ">$DIR/digest.P" ) || die "*ERROR: can't open\n" ;
        &pretty_print( "digest" );
        close PP;

open( PP, ">$DIR/latest_status.P" ) || die "*ERROR: can't open\n" ;
        &pretty_print( "latest_status" );
        close PP;

open( PP, ">$DIR/status_actions.P" ) || die "*ERROR: can't open\n" ;
```

FIGURE 36N

```perl
    open( PP, ">$DIR/statement_of_purpose.P" ) || die "*ERROR: can't open\n" ;
    &pretty_print( "statement_of_purpose" );
    close PP;

open( PP, ">$DIR/submitted_by.P" ) || die "*ERROR: can't open\n" ;
    &pretty_print( "submitted_by" );
    close PP;

open( PP, ">$DIR/submitted_for.P" ) || die "*ERROR: can't open\n" ;
    &pretty_print( "submitted_for" );
    close PP;

open( PP, ">$DIR/topic_index.P" ) || die "*ERROR: can't open\n" ;
    &pretty_print( "topic_index" );
    close PP;

open( PP, ">$DIR/filename_senator.P" ) || die "*ERROR: can't open\n" ;
    &pretty_print( "filename_senator" );
    close PP;

open( PP, ">$DIR/filename_period.P" ) || die "*ERROR: can't open\n" ;
    &pretty_print( "filename_period" );
    close PP;

open( PP, ">$DIR/senator.P" ) || die "*ERROR: can't open\n" ;
    &pretty_print( "senator" );
    close PP;

open( PP, ">$DIR/prepared_by.P" ) || die "*ERROR: can't open\n" ;
    &pretty_print( "prepared_by" );
    close PP;

open( PP, ">$DIR/occurrence_section.P" ) || die "*ERROR: can't open\n" ;
    &pretty_print( "occurrence_section" );
    close PP;

open( PP, ">$DIR/occurrence_committee.P" ) || die "*ERROR: can't open\n" ;
    &pretty_print( "occurrence_committee" );
    close PP;
} sub pretty_print {
    my $arg_table = $_[0];

digest('quoted strings', .., .. , ..).

my $buff = "";
    my @arr = "";
    my $inputstr = "";

no strict;
```

FIGURE 36O

```
            else {
                print PP "\'$aref->[$j]\',";
            }
        }
        $aref->[$n] =~ s/_/ /g;

if( $arg_table eq "latest_status" || $arg_table eq "status_actions" )
{
            $aref->[$n] =~ s/ CCCRRR /\n/g;
            my @list = split(/\n/, $aref->[$n]);
            my $len = $#list;
            my $newstr = "[";
            foreach my $i ( 0 .. $len ) {
                my ($ls_date, $ls_mesg) = split(/&tab;/, $list[$i]);
                $newstr .= "d(\'$ls_date\',";
                $newstr .= "\'$ls_mesg\')";
                if( $len > 0 && $i < $len ) {
                    $newstr .= ", ";
                }
            }
            $newstr .= "]";
            $aref->[$n] = $newstr;
            print PP "$aref->[$n]";
            print PP ")\.\n";
        } elsif( $arg_table eq "cosponsors" ) {
Dodd; Bryan; Leahy; Edwards; Hollings; Breaux (A-02/08/2000):

if ( $aref->[$n] =~ m/.+:/ ) {
                chop $aref->[$n];
            }
            my @colist = split(/;/, $aref->[$n]);
            my $newstr = "[";
            foreach my $item (@colist) {
                my $items = "";
                $item =~ m/\s*(.+)/ && ($items = $1);
                my $co_name = "";
                my $co_amend = "";
#           Mikulski (A-11/08/1999)
                if ( $items =~ m/(.+) \((.+)\)/ ) {
                    $co_name = $1;
                    $co_amend = $2;
                    $newstr .= "d(\'$co_name\',\'$co_amend\'), ";
                }
                else {
                    my $cosponsor_val = $items;
                    $newstr .= "\'$cosponsor_val\', ";
                }
            }
            chop $newstr;
            chop $newstr;
            $newstr .= "]";
```

FIGURE 36P

```
#===============================================================================
====
sub print_bills {
    my $bill;
    my $field;
    foreach $bill ( sort keys %HoH ) {
        print "<bill name=\"$bill\">\n";
        my $flag_NONE = "false";
        foreach $field ( sort keys %{ $HoH{$bill} } ) {
            if( $field eq "DATE_INTRODUCED" ) {
                print "   <date_introduced>$HoH{$bill}{$field}</date_introduced>\n";
            }

#------------------------
            elsif( $field eq "SPONSOR" ) {
                my $sponsor_val = $HoH{$bill}{$field};
                my $val = "";
                my $print_field;
                $sponsor_val =~ m/^(\d+)/ && ($val = $1);
                if ( $val ne "" ) {   # then it's a number
                    my $key = $senNUMHash{ $val };
                    $print_field = $keypeopleHash{ $key }{ nameURI }; # use of
uninitialized value!!!
                    print "   <sponsor>$print_field</sponsor>\n";
                }
                else {
                    $sponsor_val =~ s/ //g;
                    $sponsor_val = lc $sponsor_val;
                    if ( exists( $keypeopleHash{ $sponsor_val } ) ) {
                        $print_field = $keypeopleHash{ $sponsor_val }{ nameURI }
};
                        print "   <sponsor>$print_field</sponsor>\n";
                    }
                    else {
                        print LOG "!!! In print_bills: in SPONSOR section:
keypeopleHash{ $sponsor_val } DOES NOT EXIST!\n";
                        print "   <sponsor>$HoH{$bill}{$field}</sponsor>\n";
                    }
                }
            }
#------------------------
            elsif( $field eq "COSPONSORS" ) {
                my $cosponsors = $HoH{$bill}{$field};
                if ( $cosponsors =~ m/.+:/ ) {
                    chop $cosponsors;
                } #=== COMMENT if you want COSPONSOR=NONE to disappear
                print "   <cosponsors>\n";
```

FIGURE 36Q

```perl
                        if ( $items =~ m/(.+) \((.+)\)/ ) {
                            $co_name = $1;
                            $co_amend = $2;
                            my $cosponsor_val = $co_name;
                            my $val = "";
                            my $print_field;
                            $cosponsor_val =~ s/ //g;
                            $cosponsor_val = lc $cosponsor_val;
                            if ( exists( $keypeopleHash{ $cosponsor_val } ) )
{
                                $print_field = $keypeopleHash{ $cosponsor_val
}{ nameURI };
                                print "            <co_name a-
date=\"$co_amend\">$print_field</co_name>\n";
                            }
                            else {
                                print LOG "!!! In print_bills: in COSPONSORS
section: keypeopleHash{ $cosponsor_val } DOES NOT EXIST!\n";
                                print "            <co_name a-
date=\"$co_amend\">$co_name</co_name>\n";
                            }
                        }
                        else {
                            my $cosponsor_val = $items;
                            my $val = "";
                            my $print_field;
                            $cosponsor_val =~ s/ //g;
                            $cosponsor_val = lc $cosponsor_val;
                            if ( exists( $keypeopleHash{ $cosponsor_val } ) )
{
                                $print_field = $keypeopleHash{ $cosponsor_val
}{ nameURI };
                                print "
<co_name>$print_field</co_name>\n"
                            }
                            else {
                                print LOG "!!! In print_bills: in COSPONSORS
section: keypeopleHash{ $cosponsor_val } DOES NOT EXIST!\n";
                                print "
<co_name>$items</co_name>\n"
                            }
                        }
                        print "        </cosponsor>\n";
                    }
                    print "    </cosponsors>\n";
#               )       === UNCOMMENT if you want COSPONSOR=NONE to disappear
            }
            elsif( $field eq "OFFICIAL_TITLE" ) {
                print "
<official_title>$HoH{$bill}{$field}</official_title>\n";
            } elsif( $field eq "LATEST_STATUS" ) {
```

FIGURE 36R

```perl
            elsif( $field eq "ABSTRACT" ) {
                print "    <abstract>$HoH{$bill}{$field}</abstract>\n";
            }
            elsif( $field eq "COMMITTEE" ) {
                my $len = $#{ $HoH{$bill}{COMMITTEE} };
                print "    <committees>\n";
                foreach my $i ( 0 .. $len ) {
                    print "
<committee>$HoH{$bill}{$field}[$i]</committee>\n";
                }
                print "    </committees>\n";
            }
            elsif( $field eq "SUBMITTED_FOR" ) {
                print "
<submitted_for>$HoH{$bill}{$field}</submitted_for>\n";
            }
            elsif( $field eq "CONGRESSIONAL_RECORD" ) {
                print "
<congressional_record>$HoH{$bill}{$field}</congressional_record>\n";
            }

#------------------------
            elsif( $field eq "SUBMITTED_BY" ) {
                my $submitted_by_val = $HoH{$bill}{$field};
                my $val = "";
                my $print_field;
                    $submitted_by_val =~ s/ //g;
                    $submitted_by_val = lc $submitted_by_val;
                    if ( exists( $keypeopleHash{ $submitted_by_val } ) ) {
                        $print_field = $keypeopleHash{ $submitted_by_val }{
nameURI };
                        print "
<submitted_by>$print_field</submitted_by>\n";
                    }
                    else {
                        print LOG "!!! In print_bills: in SUBMITTEED_BY
section: keypeopleHash{ $submitted_by_val } DOES NOT EXIST!\n";
                        print "
<submitted_by>$HoH{$bill}{$field}</submitted_by>\n";
                    }
            } elsif( $field eq "STATEMENT_OF_PURPOSE" ) {
                print "
<statement_of_purpose>$HoH{$bill}{$field}</statement_of_purpose>\n";
            }
            elsif( $field eq "DIGEST" ) {
                print "    <digest>$HoH{$bill}{$field}</digest>\n";
            }
            else {
                print LOG "!!! WRONG TAG:$field !!! in sub: print_bills\n";
            }
        }
```

FIGURE 36S

```perl
    no strict;

my $len = $#{$arg_table} + 1;
    print "$arg_table: COUNT=$len\n";
    for my $i ( 0 .. $#{$arg_table} ) { if ( !($i % $MORE_SIZE ) && !($i == 0) ) {
            my $percent = ( ($i+1) / $len ) * 100;
            print "--More--";
            printf( "(%1d)", $percent );
            print "\% -- q: to quit\n";
            read(STDIN, $buff, 1);

for ( my $i = 0; ; read(STDIN, $buff, 1) ) {
                if ( $i == 0 ) { @arr=""; }
                $arr[$i++] = $buff;
                if ( $buff eq "\n" ) {
                    $inputstr = join '', @arr;
                    chop $inputstr;
                    goto NEXT;
                }
                $buff = "";
            }
        }
NEXT:
        if( $inputstr eq "q" )  { goto END_PRINT_TABLE; } my $aref = ${$arg_table}[$i];
        my $n = @$aref - 1;
        printf( "\t%5d:", $i );
        for my $j ( 0 .. $n ) {
            print "\t$aref->[$j]";
        }
        print "\n";
    }
    END_PRINT_TABLE:;
} sub print_hash {
    my $arg_hash = $_[0];

no strict;

my $buff = "";
    my @arr = "";
    my $inputstr = "";

my $len = scalar keys %{$arg_hash};
    print "$arg_hash Hash: COUNT=$len\n";
    my $i = 0;
    foreach my $key( sort keys %{$arg_hash} ) { if ( !($i % $MORE_SIZE ) && !($i == 0) ) {
```

FIGURE 36T

```perl
            for ( my $i = 0; ; read(STDIN, $buff, 1) )  {
                if ( $i == 0 ) { @arr=""; }
                $arr[$i++] = $buff;
                if ( $buff eq "\n" ) {
                    $inputstr = join '', @arr;
                    chop $inputstr;
                    goto NEXT2;
                }
                $buff = "";
            }
        }
    NEXT2:
        if( $inputstr eq "q" )  { goto END_PRINT_HASH; }

$i++;
        print "\t*$key*\n";
    }
    END_PRINT_HASH:;
}
#==============================================================================
====
#<section>
#<p fontname="Courier New" fontsize="20"></p>
#<p align="center" fontname="Courier New" fontsize="28" bold="on">UNITED STATES SENATE</p>
#<p align="center" fontname="Courier New" fontsize="28" bold="on"></p>
#<p align="center" fontname="Courier New" fontsize="28" bold="on"></p>
#<p align="center" fontname="Courier New" fontsize="28" bold="on"></p>
#<p align="center" fontname="Courier New" fontsize="28" bold="on"></p>
#<p align="left" fontname="Courier New" fontsize="48" bold="on">_____</p>
#<p align="left" fontname="Courier New" fontsize="48" bold="on"></p>
#<p align="left" fontname="Courier New" fontsize="48" bold="on">LEGISLATIVE ACTIVITIES</p>
#<p align="left" fontname="Courier New" fontsize="48" bold="on">_____</p>
#<p align="left" fontname="Courier New" fontsize="48" bold="on"></p>
#<p align="left" fontname="Courier New" fontsize="36" bold="on">THE HONORABLE</p>
#<p align="left" fontname="Courier New" fontsize="36" bold="on">PAUL S. SARBANES</p>
#<p align="left" fontname="Courier New" fontsize="36" bold="on">OF MARYLAND</p>
#<p align="left" fontname="Courier New" fontsize="36" bold="on"></p>
#<p align="left" fontname="Courier New" fontsize="28" bold="on">FOR THE PERIOD</p>
#<p align="left" fontname="Courier New" fontsize="28" bold="on">JANUARY 06, 1999 TO MARCH 31, 2000</p>
#<p align="left" fontname="Courier New" fontsize="28" bold="on"></p>
#<p align="left" fontname="Courier New" fontsize="48" bold="on">_____</p>
#<p fontname="Courier New" fontsize="20" bold="on"></p>
```

FIGURE 36U

```
#<p fontname="Courier New" fontsize="20" bold="on"></p>
#<p fontname="Courier New" fontsize="20" bold="on"></p>
#<p fontname="Courier New" fontsize="20" bold="on"></p>
#<p fontname="Courier New" fontsize="20" bold="on"></p>
#<p fontname="Courier New" fontsize="20" bold="on"></p>
#<p align="left" fontname="Courier New" fontsize="20" bold="on">Prepared
by:</p>
#<p align="left" fontname="Courier New" fontsize="20" bold="on">Senate
Computer Center</p>
#<p align="left" fontname="Courier New" fontsize="20" bold="on">Office of the
Sergeant at Arms</p>
#<p align="left" fontname="Courier New" fontsize="20" bold="on">and</p>
#<p align="left" fontname="Courier New" fontsize="20" bold="on">Committee on
Rules and Administration</p>
</section> sub process_header {
    while( $line = <SEN106> ) {
        $line_number++;
        if ( $line =~ m/<p align=.+>(.+)<\/p>/ ) {
            $h4 = $1;
            if ( $line =~ m/THE HONORABLE/ ) {

$line = <SEN106>;
                $line_number++;
                $line =~ m/<p align=.+>(.+)<\/p>/;
                $senNAME= $1;
                my $first_line = $line_number;

$line = <SEN106>;
                $line_number++;
                $line =~ m/OF (.+)<\/p>/;
                $state = $1;

my @senlist = split(/ /, $senNAME);
                my $firstname = $senlist[0];
                my $lastname = $senlist[$#senlist];
                my $middlepart = "";
                foreach my $i (1 .. ($#senlist-1)) {
                    $middlepart .= "$senlist[$i] ";
                }
                chop $middlepart;

$len = $#senator;
                $senator[ $len + 1 ] = [ ($senid, $first_line, $firstname,
$middlepart, $lastname, $state) ];

$line = <SEN106>;
                $line_number++;
                $line = <SEN106>;
                $line_number++;
```

FIGURE 36V

```perl
            $line = <SEN106>;
            $line_number++;

$line = <SEN106>;
            $line_number++;

while( $line = <SEN106> ) {
                $line_number++;
                if ( $line =~ m/<p align=/ ) {
                    goto BEGIN_Prepared_by;
                }
            }
      BEGIN_Prepared_by:;
            my $first_line2 = $line_number;
            $line =~ m/>(.+)<\/p>/;
            my $cumulative_content = "$1 ";

$line = <SEN106>;
            $line_number++;
            $line =~ m/>(.+)<\/p>/;
            $cumulative_content .= "$1 ";

$line = <SEN106>;
            $line_number++;
            $line =~ m/>(.+)<\/p>/;
            $cumulative_content .= "$1 ";

$line = <SEN106>;
            $line_number++;
            $line =~ m/>(.+)<\/p>/;
            $cumulative_content .= "$1 ";

$line = <SEN106>;
            $line_number++;
            $line =~ m/>(.+)<\/p>/;
            $cumulative_content .= "$1";

my $ov = $senid . "_" . "$line_number";

$len = $#prepared_by;
            $prepared_by[ $len + 1 ] = [ ($senid, $first_line2,
$cumulative_content) ];
         }
         $h4 = $1;
      }
      elsif ( .$line =~ m/<\/section>/ ) {
         goto PH1;
      }
   }

PH1:;
   if ( $filename eq "D_1_LARI_S272_106.xml" ) {
```

FIGURE 36W

```perl
    while( $line = <SEN106> ) {
        $line_number++;
        if ( $line =~ m/<\/section>/ ) {
            goto END_process_header;
        }
    }
    END_process_header:;

}

# <p><string italic="off" hidden="on">SECTION VII. SUBJECT
INDEX</string>ACADEMIC PERFORMANCE&tab; S.7, S.514, S.564</p>
<p>ACCESS TO HEALTH CARE&tab; S.6, S.1678, S.1690</p> sub process_index_old {
            $line =~ m/<p>.+<\/string>(.+)&tab; (.+)<\/p>/;
            my $subject = $1;
            my $bill_seq = $2;

#<p align="right">Administrative procedure--Department of Health and Human
Services&tab; S.331, S.1327</p>
#<p>AGED&tab; S.10, S.51, S.331, S.391, S.472, S.718, S.784, S.792,</p>
#<p align="right"> S.1023, S.1074, S.1142, S.1327, S.1499, S.1678, S.1760</p>

N3:while( $line = <SEN106> ) {
                $line_number++;
                if ( $line =~ m/<p.*>(.+)&tab;(.+\d)(.*)<\/p>/ ) {
                    my $subject = $1;
                    my $bill_seq = $2;
                    my $comma = $3;
                    # IS THERE A CONTINUATION...
                    while ( $comma eq "," ) {
                        my $buf = <SEN106>;
                        $line_number++;
                        $buf=~ m/<p.*>(.+\d)(.*)<\/p>/;
                        my $bill_seq = $1;
                        my $comma = $2;
                        if ( $comma eq "" ) {
                            goto N3;
                        }
                    }
                }
#<p></p>
                elsif ( $line =~ m/<p><\/p>/ ) {
                }
                else {
                    goto THEEND;
                }
            }
}
# <p><string italic="off" hidden="on">SECTION VII. SUBJECT
INDEX</string>ACADEMIC PERFORMANCE&tab; S.7, S.514, S.564</p>
```

FIGURE 36X

```
#<p align="left" fontname="Courier New" fontsize="20" bold="on">Committee on
Rules and Administration</p>
</section>
#<section>
#<header>
#<p align="center" fontname="Courier New" fontsize="20"
bold="on"><field><fldinst> PAGE </fldinst><fldrslt><string charstyname=""
#           fontname="Courier New" fontsize="20"
bold="on">2</string></fldrslt></field></p>
#<p align="right" fontname="Courier New" fontsize="20" bold="on">
#          <string fontname="Courier New" fontsize="20" bold="on">Lincoln D.
Chafee</string></p>
#<p align="left" fontname="Courier New" fontsize="20" bold="on"><string
fontname="Courier New" fontsize="20" bold="on">
#               SUBJECT INDEX TO SPONSORED AND COSPONSORED MEASURES AND
AMENDMENTS</string></p>
#<p align="left" fontname="Courier New" fontsize="20" bold="off"></p>
#</header>
#<p>ACCESS TO HEALTH CARE&tab; S.494</p>
<p>ACCIDENT PREVENTION&tab; S.149, S.936</p> sub process_index {

$line =~ m/<p>.+<\/string>(.+)&tab; (.+)<\/p>/;
        my $subject = $1;
        my $bill_seq = $2;
        my @bill_list = split( /,/, $bill_seq );

my $sub = $subject;
        $sub =~ s/ /_/g;
        $ti_value{ $sub } = "";

foreach my $item (@bill_list) {
            $item =~ s/\s*//g ;

my $len = $#topic_index;
            $topic_index[ $len + 1 ] = [ ($senid, $line_number, $sub,
$item) ];
        }

#<p align="right">Administrative procedure--Department of Health and Human
Services&tab; S.331, S.1327</p>
#<p>AGED&tab; S.10, S.51, S.331, S.391, S.472, S.718, S.784, S.792,</p>
#<p align="right"> S.1023, S.1074, S.1142, S.1327, S.1499, S.1678, S.1760</p>

N3:while( $line = <SEN106> ) {
            $line_number++;
            if ( $line =~ m/<p.*>(.+)&tab;(.+\d)(.*)<\/p>/ ) {
                my $subject = $1;
                my $bill_seq = $2;
                my $comma = $3;
                my @bill_list = split( /,/, $bill_seq );
```

FIGURE 36Y

```
                    # IS THERE A CONTINUATION...
                    while ( $comma eq "," ) {
                        my $buf = <SEN106>;
                        $line_number++;
                        $buf=~ m/<p.*>(.+\d)(.*)<\/p>/;
                        my $bill_seq = $1;
                        my $comma = $2;
                        my @bill_list = split( /,/, $bill_seq );
                        foreach my $item (@bill_list) {
                            $item =~ s/\s*//g ;
                            my $len = $#topic_index;
                            $topic_index[ $len + 1 ] = [ ($senid,
$line_number, $subject, $item) ];
                        }
                        if ( $comma eq "" ) {
                            goto N3;
                        }
                    }
                }
#<p></p>
                elsif ( $line =~ m/<p><\/p>/ ) {
                }
                else {
                    goto THEEND;
                }
            }
        }
```

FIGURE 36Z

```
<!ELEMENT SLA_collection =  (senate_file*)>
<!ELEMENT senate_file =     (filename, header_page?, section*, subject_index?)>
<!ELEMENT header_page =     (senator?, report_period?, prepared_by?)>
<!ELEMENT senator =         (first_name?, middle_part?, last_name?, state?)>
<!ELEMENT report_date =     (start_date?, end_date?)>
<!ELEMENT section =         (sec_number, sec_name, bar*)>
<!ELEMENT bar =             (bill | resolution | amendment)>
<!ELEMENT resolution =      (joint_resolution, concurrent_resolution, simple_resolution)
<!ELEMENT bill =            (bar_id, date_introduced, sponsor?, cosponsors?, official_title,
                             (latest_status | status_actions), abstract, committee?)>
<!ELEMENT amendment =       (bar_id, date_introduced, submitted_for, congressional_record,
                             sponsor?, submitted_by?, cosponsors,
                             statement_of_purpose, (latest_status | status_actions),
                             abstract)>
```

FIGURE 37

```perl
#!/usr/local/bin/perl -w
use strict;

caccf_xml FILE REC_SIZE my $REC_SIZE = 164;

die "*** Record size must be 164!\n" if ( $ARGV[1] != 164 );

my $rec_count = 0;
my $rec;
my $fsize;

open(IN, "< $ARGV[0]") || die "can't read from: $!";

$fsize = -s IN;

print "*** WARNING: file size ($fsize) is no multiple of record size
($REC_SIZE)\n"
  if ( $fsize % $REC_SIZE != 0 );

open(OUT,"> $ARGV[0].xml") || die "can't write to: $!";
open(LOG,"> $ARGV[0].xml.log") || die "can't write to: $!";

print OUT "<caccf_records>\n";

while (read(IN, $rec, $REC_SIZE) == $REC_SIZE) {
  print OUT "<rec no=\"", ++ $rec_count, "\" ";
  print OUT "ms=\"",substr($rec,0,1),"\" ";
  print OUT "cc=\"",substr($rec,1,2),"\" ";
  print OUT "tc=\"",substr($rec,3,2),"\" ";
  print OUT "rn=\"",substr($rec,5,5),"\" ";
  print LOG "*** ERROR, >", (substr($rec,10,1)), "< instead of blank in #11,
rec $rec_count:\n[[$rec]]\n\n"
      if (substr($rec,10,1) ne " ");
  print OUT "na=\"",substr($rec,11,28),"\" ";
  print OUT "dp=\"",substr($rec,39,4),"\" ";
  print OUT "sn=\"",substr($rec,43,9),"\" ";
  print OUT "mg=\"",substr($rec,52,4),"\" ";
  print OUT "pg=\"",substr($rec,56,2),"\" ";
  print OUT "dd=\"",substr($rec,58,8),"\" ";
  print OUT "hc=\"",substr($rec,66,20),"\" ";
  print OUT "hs=\"",substr($rec,86,2),"\" ";
  print OUT "oc=\"",substr($rec,88,5),"\" ";
  print OUT "db=\"",substr($rec,93,8),"\" ";
  print OUT "rc=\"",substr($rec,101,1),"\" ";
  print OUT "ai=\"",substr($rec,102,1),"\" ";
  print OUT "ra=\"",substr($rec,103,1),"\" ";
  print OUT "re=\"",substr($rec,104,2),"\" ";
  print OUT "le=\"",substr($rec,106,2),"\" ";
  print OUT "ma=\"",substr($rec,108,1),"\" ";
  print OUT "se=\"",substr($rec,109,1),"\" ";
```

FIGURE 38

```perl
#!/usr/local/bin/perl -w
use strict;

caccf2oracle FILE REC_SIZE my $REC_SIZE = 164;

die "*** Record size must be 164!\n" if ( $ARGV[1] != 164 );

my $rec_count = 0;
my $rec;
my $fsize;

my %month = ("01" => "JAN",
             "02" => "FEB",
             "03" => "MAR",
             "04" => "APR",
             "05" => "MAY",
             "06" => "JUN",
             "07" => "JUL",
             "08" => "AUG",
             "09" => "SEP",
             "10" => "OCT",
             "11" => "NOV",
             "12" => "DEC" );
sub mm_dd_yy {
  my ($a_date) = @_ ;
  if ($a_date =~ m|([0-9]{2})/([0-9]{2})/([0-9]{2})| ) {
    return "TO_DATE('$2-$month{$1}-19$3')";
  } else {
    print "*** ERROR   Rec #$rec_count, mm_dd_yy, not a date >>>$a_date<<<\n";
    return "NULL";
  }
};

sub yymmdd {
  my ($a_date) = @_ ;
  if ($a_date =~ m|([0-9]{2})([0-9]{2})([0-9]{2})| ) {
    "TO_DATE('$3-$month{$2}-19$1')";
  } else {
    print "*** WARNING Rec #$rec_count, yymmdd, not a date >>>$a_date<<<\n";
    return "NULL";
  };
};

sub escapeQuote {
  my ($a_string) = @_ ;
  if ($a_string =~ s/\'/\'\'/g) {
    print "*** NOTE    Rec #$rec_count, quote escaped >>>$a_string<<<\n";
  }
  return $a_string;
}
```

FIGURE 39A

| 39A |
|-----|
| 39B |

```perl
open(OUT,"> $ARGV[0].sql") || die "can't write to: $!";
open(LOG,"> $ARGV[0].sql.log") || die "can't write to: $!";

while (read(IN, $rec, $REC_SIZE) == $REC_SIZE) {
  print OUT "insert into CACCF values (";
  print OUT "'",   ++ $rec_count  ,"',"; # internal record number
  print OUT "'",substr($rec,0,1),"',"; # ms
  print OUT "'",substr($rec,1,2),"',"; # cc
  print OUT "'",substr($rec,3,2),"',"; # tc
  print OUT "'",substr($rec,5,5),"',"; # rn
  print OUT "'",escapeQuote(substr($rec,11,28)),"',"; # na
  print OUT "'",substr($rec,39,4),"',";  # dp
  print OUT "'",substr($rec,43,9),"',"; # sn
  print OUT "'",substr($rec,52,4),"',"; # mg
  print OUT "'",substr($rec,56,2),"',"; # pg
  print OUT mm_dd_yy(substr($rec,58,8)),","; # dd
  print OUT "'",escapeQuote(substr($rec,66,20)),"',"; # hc
  print OUT "'",substr($rec,86,2),"',"; # hs
  print OUT "'",substr($rec,88,5),"',"; # oc
  print OUT mm_dd_yy(substr($rec,93,8)),","; # db
  print OUT "'",substr($rec,101,1),"',"; # rc
  print OUT "'",substr($rec,102,1),"',"; # ai
  print OUT "'",substr($rec,103,1),"',"; # ra
  print OUT "'",substr($rec,104,2),"',"; # re
  print OUT "'",substr($rec,106,2),"',"; # le
  print OUT "'",substr($rec,108,1),"',"; # ma
  print OUT "'",substr($rec,109,1),"',"; # se
  print OUT "'",substr($rec,110,1),"',"; # ci
  print OUT "'",substr($rec,111,1),"',"; # pp
  print OUT yymmdd(substr($rec,112,6)),","; # dt
  print OUT "'",substr($rec,118,1),"',"; # lr
  print OUT "'",substr($rec,119,3),"',"; # br
  print OUT "'",substr($rec,122,2),"',"; # ag
  print OUT "'",substr($rec,124,1),"',"; # sc
  print OUT "'",escapeQuote(substr($rec,125,29)),"',"; # co
  print OUT "'",escapeQuote(substr($rec,154,2)),"',"; # ty
  print OUT "'",escapeQuote(substr($rec,156,2)),"',"; # pc
  print OUT "'",substr($rec,158,2),"',"; # mc
  print OUT "'",substr($rec,160,2),"',"; # pr
  print OUT "'",substr($rec,162,2),"'"; # fl
  print OUT ");\n";
};

print LOG "[$ARGV[0]: read ",$rec_count*$REC_SIZE, " bytes = $rec_count
records x $REC_SIZE]\n";

print LOG "*** WARNING: file size = $fsize\n"
  if ( $rec_count*$REC_SIZE != $fsize );
```

FIGURE 39B

```
       ⎧  %%% Rules for (!ELEMENT X   (Y Z))
       ⎪  false ← P:X, not (P.1):Y.                              % 1st child is not Y
4800 ⎨   fa     P:X, not (P.2):Z.                              % 2nd child is not Z
       ⎪  false ← P:X, not P[_→_].                              % there are no children
       ⎩  false ← P:X[N→_], not N=1, not N=2.                   % there are other children ⎧  %%% Rules for (!ELEMENT X   (Y | Z))
4802 ⎨   false ← P:X[1→A], not A:Y, not A:Z.                   % 1st child other than Y or Z
       ⎪  false ← P:X, not P[_→_].                              % there are no children
       ⎩  false ← P:X[N→_], not N=1.                            % a non-1st child 4804 ⎰  %%% Rule for (!ELEMENT X   (Y)*)
       ⎱  false ← P:X[_→C], not C:Y.                            % a non-Y child
```

FIGURE 48

```
#------------------------------------------------------------
# An excerpt of an example of a Topic Map for the SLA (Senate)
                    # Collection.
                          #
# 4 Topics are shown: t1, t2, t3, and t4 of type "SubjectEntry"
    # --> These are actually Subject Index Entries found in the
#                         raw data
                          #
# For each topic, there is an occurence list of locator elements
         # corresponding to the bills that discuss that topic.
                          #
# In addition, topics are related to each other through associations.
         # Here we created two types of associations:
    #    <assoc types="CoDiscussedInExactlyOneBill">
    #    <assoc types="CoDiscussedInTwoOrMoreBills">
                          #
# showing the "degree of connectedness" between two topics.
# These would be value-added relationships, as they are implicit
    # in the raw data, and discovered by our topic map building
                      # routines.
                          #
# Bertram Ludaescher & Richard Marciano -- March 20, 2001
#------------------------------------------------------------

<!DOCTYPE topicmap [
            <!ELEMENT topicmap (topic | assoc )* >
            <!ELEMENT topic (topname | occurs)* >
                <!ATTLIST topic
                  id    ID    #REQUIRED
                  types CDATA #IMPLIED
                >
            <!ELEMENT topname (basename, dispname, sortname)>
                <!ELEMENT basename (#PCDATA) >
                <!ELEMENT dispname (#PCDATA) >
                <!ELEMENT sortname (#PCDATA) >
                    <!ELEMENT occurs (locator*) >
                    <!ELEMENT locator EMPTY >
                        <!ATTLIST locator
                          role CDATA  #REQUIRED
                          href CDATA  #REQUIRED
                        >
                  <!ELEMENT assoc (assocrl*) >
                        <!ATTLIST assoc
                          types CDATA #IMPLIED
                        >
                  <!ELEMENT assocrl EMPTY >
                        <!ATTLIST assocrl
                          role CDATA  #REQUIRED
                          href CDATA  #REQUIRED
                        >
                      ]>
```

| 54A |
|-----|
| 54B |
| 54C |

FIGURE 54A

```xml
<topicmap>
    <topic id="t1" types="SubjectEntry">
        <topname>
            <basename>Apartment houses</basename>
            <dispname>Apt. Houses</dispname>
            <sortname>APARTMENTHOUSES</sortname>
        </topname>
        <occurs>
            <locator role="DiscussedIn" href="#S.463" />
        </occurs>
    </topic>

<topic id="t2" types="SubjectEntry">
        <topname>
            <basename>Children</basename>
            <dispname>Child.</dispname>
            <sortname>CHILDREN</sortname>
        </topname>
        <occurs>
            <locator role="DiscussedIn" href="#S.300" />
            <locator role="DiscussedIn" href="#S.463" />
            <locator role="DiscussedIn" href="#S.1638" />
            <locator role="DiscussedIn" href="#S.1673" />
            <locator role="DiscussedIn" href="#S.1709" />
            <locator role="DiscussedIn" href="#S.Res.125" />
            <locator role="DiscussedIn" href="#S.Res.258" />
        </occurs>
    </topic>

<topic id="t3" types="SubjectEntry">
        <topname>
            <basename>Welfare</basename>
            <dispname>Welf.</dispname>
            <sortname>WELFARE</sortname>
        </topname>
        <occurs>
            <locator role="DiscussedIn" href="#S.463" />
            <locator role="DiscussedIn" href="#S.1277" />
            <locator role="DiscussedIn" href="#S.1709" />
            <locator role="DiscussedIn" href="#S.Con.Res.28" />
            <locator role="DiscussedIn" href="#S.Res.125" />
            <locator role="DiscussedIn" href="#S.Res.260" />
        </occurs>
    </topic>
```

FIGURE 54B

```xml
<topic id="t4" types="SubjectEntry">
    <topname>
        <basename>Youth employment</basename>
        <dispname>Youth empl.</dispname>
        <sortname>YOUTEMPLOYMENT</sortname>
    </topname>
    <occurs>
        <locator role="DiscussedIn" href="#S.463" />
    </occurs>
</topic>

<assoc types="CoDiscussedInExactlyOneBill">
    <assocrl role="DiscussedInSameBill" href="t1" />
    <assocrl role="DiscussedInSameBill" href="t2" />
    <assocrl role="DiscussedInSameBill" href="t3" />
    <assocrl role="DiscussedInSameBill" href="t4" />
</assoc>

<assoc types="CoDiscussedInTwoOrMoreBills">
    <assocrl role="DiscussedInSameBill" href="t2" />
    <assocrl role="DiscussedInSameBill" href="t3" />
</assoc>

</topicmap>
```

FIGURE 54C

PERSISTENT ARCHIVES

This application is a continuation of U.S. patent application Ser. No. 09/815,447, filed Mar. 21, 2001 now U.S. Pat. No. 6,963,975, which claims the benefit of U.S. Provisional Application No. 60/191,662, filed Mar. 23, 2000, U.S. Provisional Application No. 60/255,795, filed Dec. 15, 2000, U.S. Provisional Application No. 60/255,794, filed Dec. 15, 2000, and U.S. Provisional Application No. 60/273,464 filed Mar. 5, 2001. All of the above applications are hereby fully incorporated by reference herein as though set forth in full.

The U.S. Government has a paid-up license in this invention and the right in limited circumstances to require the patent owner to license others on reasonable terms as provided for by the terms of contract number F19628-96-C-0020 awarded by the Department of Defense.

BACKGROUND OF THE INVENTION

1. Field of the Invention

This invention relates generally to the field of data archives, and, more specifically, persistent archives of collections of data objects.

2. Related Art

The long-term storage and access of digital information is a major challenge. The rapid change of technology resulting in obsolescence of archival storage media and database management systems, coupled with the very large volumes of data (terabytes to petabytes in size) involved, appears to make the problem intractable. A concern is that, when access to data in the archive is desired at some point in the future, the technology used to create the archive may be obsolete and unavailable, and the technology existing in the future may not allow access to the data absent time-consuming conversion efforts. Another concern is that the data may not be understandable due to the passage of time and loss of context.

SUMMARY

The invention provides a persistent archive of a collection of data objects tangibly embodied on a processor readable medium. The persistent archive comprises a self-describing, infrastructure-independent representation of a logical structure for the collection, and a self-describing, infrastructure-independent representation of the data objects.

For purposes of this disclosure, the phrase "self-describing" is a flexible concept which varies according to the circumstances, but it is generally used to refer to an element whose meaning is apparent from the element itself or through resort to no more than generally understood principles; the term "persistent" generally means the quality or capability of being accessible and usable at an indefinite point in time in the future; and the phase "infrastructure-independent" generally refers to the state or quality of being independent of a particular storage or computing platform or implementation or at most limited to only a generic class of storage or computing platforms or implementations.

Since the elements of the persistent archive—the logical structure of the collection and the data objects—are expressed in a self-describing, infrastructure-independent form, the collection can be re-instantiated and understood at an indefinite point in time in the future no matter what the specific state of technology is at the time. Consequently, the archive is persistent.

The logical structure of the collection may be expressed through a variety of means, but, in one example, the logical structure is expressed in the form of an eXtensible Markup Language (XML) Document Type Definition (DTD), which defines elements of data objects or collections, their inter-relationship, and their attributes. Since an XML DTD is a non-proprietary and widely known mode of expression, is platform-independent, and is emerging as a standard, it qualifies as a self-describing infrastructure-independent means of expressing the logical structure of the collection.

In another example, the logical structure is expressed in the form of Structured Query Language (SQL) commands for creating relational database tables. Since SQL is a non-proprietary and widely known mode of expression, and is platform independent, this mode of expression also qualifies as self-describing.

The data objects of the collection may also be expressed through a variety of means, but, in one example, the data objects are expressed in the form of tagged XML data objects, in which components of the data objects are tagged with element or attribute names from the DTD. Since the DTD defines the meaning and interrelationship of the elements and attributes, the tagging, in associating element and attribute names with components of the data objects, qualifies as a self-describing, infrastructure-independent form of expression.

The persistent archive may also include a self-describing, infrastructure-independent representation of a presentation mechanism for one or more of the data objects. The presentation mechanism may capture the "look and feel" of certain presentation formats for the data objects that may be re-created at some point in the future when the archive is re-instantiated.

In one example, the presentation mechanism is represented in the form of an eXtensible Stylesheet Language (XSL) style sheet which specifies one or more templates for transforming XML-tagged data objects into desired presentation entities, such as a HTML page for presentation on a web browser. Since XSL is written in XML, it as well qualifies as a self-describing, infrastructure-independent form of expression.

The invention also provides a method of ingesting data objects into the persistent archive, a method of instantiating the persistent archive as a query-able mechanism, a method of migrating the archive to a new medium, and a method of presenting the data objects using a self-describing, infrastructure-independent representation of a presentation mechanism stored with the archive.

One embodiment of the method of ingesting data objects into the archive comprises the steps of transforming a representation of the data objects into a self-describing, infrastructure-independent representation of the data objects, and then archiving the self-describing, infrastructure-independent representation of the data objects with a self-describing, infrastructure-independent representation of a logical structure for the collection.

One embodiment of the method of instantiating the persistent archive comprises the steps of retrieving from the persistent archive a self-describing, infrastructure-independent representation of a logical structure for the collection, creating on a medium a query-able mechanism in accordance with the logical structure, retrieving from the archive a self-describing, infrastructure-independent representation of one or more data objects, and then loading the one or more data objects into the query-mechanism.

In one example, the query-able mechanism is a database management system. The data objects, once instantiated on the database management system, may be rapidly accessed using database queries. The retrieved objects may then be presented using a presentation mechanism retrieved from the archive. In one example, the presentation mechanism is an HTML web page which specifies the format for displaying data objects on a web browser.

One embodiment of the method of migrating a persistent archive to a new medium comprises retrieving the persistent archive from a first medium, optionally redefining the logical structure of the collection or the self-describing, infrastructure-independent representation of the data objects in the archive, and storing the persistent archive as optionally redefined onto a second medium.

One embodiment of the method of presenting one or more data objects from the persistent archive comprises retrieving from the archive a self-describing, infrastructure-independent representation of a presentation mechanism for the one or more data objects, and presenting the one or more data objects using the presentation mechanism.

A system for maintaining a persistent archive is also provided. In one embodiment, the system comprises an ingestion subsystem for ingesting objects into the archive; and an instantiation subsystem for instantiating the archive onto a query-able mechanism. The instantiation subsystem may include a plurality of drivers for instantiating the archive on a variety of media. As new media becomes available, a driver for providing read and write access to that media may be added to the instantiation subsystem.

The system may conform to a client-server model in which the archive is maintained on a server, and the server responds to requests from a client which are transmitted to the server over a network. Depending on the request, the ingestion subsystem or instantiation subsystem may be invoked.

The system may also include a migration subsystem for migrating the archive to a new medium; and a presentation subsystem for presenting one or more data objects from the archive using a self-describing, infrastructure-independent presentation mechanism retrieved from the archive.

As with the instantiation subsystem, the migration subsystem may include a plurality of drivers for instantiating the archive on a variety of media. As new media becomes available, a driver for providing read and write access to that media may be added to the migration subsystem. Moreover, the presentation subsystem may be configured to present data objects as retrieved from a query-able mechanism, or it may be configured to present data objects as retrieved from the archive.

In a second embodiment of the invention, a knowledge-based persistent archive of a collection of data objects tangibly embodied on a processor readable medium is provided. The knowledge-based persistent archive comprises a self-describing, infrastructure-independent representation of a logical structure for the collection, a self-describing, infrastructure-independent representation of the data objects, and a self-describing, infrastructure-independent representation of knowledge relevant to the collection. Optionally, the archive may also include a self-describing, infrastructure-independent representation of a presentation mechanism for presenting one or more data objects from the collection.

The first two elements of the archive—the self-describing, infrastructure-independent representation of a logical structure for the collection and a self-describing, infrastructure-independent representation of the data objects in the collection—are as described in the previous embodiment.

The third element—the self-describing, infrastructure-independent representation of knowledge relevant to the collection—represents knowledge not embodied in the first two elements which is necessary or desirable for the purpose of understanding the collection, and which may be included in the archive for the purpose of enhancing or contributing to its persistent quality.

The knowledge may be in the form of relationships between concepts relevant to the collection. The relationships may be logical or semantic relationships, such as mappings between concepts and attributes or elements of data objects. The relationships may also be temporal or procedural relationships, such as timing relationships that may exist between data objects in the collection. The relationships may also be spatial or structural relationships, and embody rules or constraints between certain elements or attributes of data objects. The relationships may also be algorithmic or functional relationships, such as algorithmic relationships identifying features within data objects. The relationships may be used to validate the collection during ingestion, instantiation, migration, or presentation processes.

In one example, the relationships may be expressed in a language such as Prolog. Prolog is a non-proprietary and infrastructure-independent language which is emerging as a standard. Thus, it as well qualifies as a self-describing, infrastructure-independent mode of expressing the relationships.

During ingestion of data objects into a knowledge-based persistent archive, the knowledge base of the archive may be used to verify the transformation of data objects into a self-describing, infrastructure independent form. Similarly, during instantiation of a knowledge-based persistent archive, the knowledge base may be used to verify data objects retrieved from the archive.

The knowledge base of the archive may also be used to validate the collection of data objects contained in the archive. In particular, it may be used to check the internal consistency of the archive, i.e., determine that it is consistent with several known rules and any noted exceptions to the rules.

The knowledge base of a persistent archive may also comprise a self-describing, infrastructure-independent, or executable representation of a transformation procedure. Various methods are possible which utilize such a transformation procedure.

First, a method of transforming data objects into a form capable of ingestion into the archive is possible which, in one embodiment, comprises the steps of retrieving the representation of the procedure from the archive, and executing the procedure to transform the data objects into a form ready for ingestion into the archive.

Second, a method of transforming data objects into a form capable of instantiation onto a query-able mechanism is possible which, in one embodiment, comprises the steps of retrieving the representation of the transformation procedure from the archive, retrieving from the archive one or more data objects in a self-describing, infrastructure independent form, and executing the procedure to transform the data objects in the self-describing, infrastructure independent form into a form capable of being instantiated onto a query-able mechanism.

Third, a method of transforming data objects into occurrences of attribute or element values is also possible which comprises, in one embodiment, the steps of retrieving the representation of the transformation procedure from the archive, retrieving from the archive one or more data objects in a self-describing, infrastructure independent form, and executing the procedure to transform the data objects in the self-describing, infrastructure independent form into the occurrences of the attribute or element values.

The occurrences of attribute or element values may also be formed using data records tagged with attribute or element names. Moreover, inverted attribute indices may be formed from the occurrences.

These occurrences and/or inverted attribute indices may be used for a variety of purposes, including (1) validating the collection, (2) identifying knowledge to be added to the knowledge base of a knowledge-based persistent archive formed from the tagged data records, such as exceptional conditions, (3) confirming closure of attribute or element selection for a collection formed from the tagged data records, (4) obtaining useful information about a collection formed from the tagged data records, such as the degree of redundancy in the collection, (5) determining transformation procedures for a collection formed from the tagged data records, and (6) checking the internal consistency of a collection formed or to be formed from the tagged data records.

Furthermore, these occurrences and/or inverted attribute indices may be (1) transformed into tagged data records, (2) transformed into a form capable of being ingested into a persistent archive, (3) transformed into a form capable of being instantiated onto a query-able mechanism, or (4) transformed into a form capable of being presented to a user.

In a third embodiment of the invention, a knowledge-based persistent archive of a collection of data objects is provided which includes at least one self-describing, infrastructure-independent or executable specification. The specification may be used to validate the collection or put it in a form suitable for instantiation, presentation, migration, ingestion, etc. The archive may be tangibly embodied on a processor readable medium.

The archive comprises at least one representation of the collection or of the data objects; at least one self-describing, infrastructure-independent or executable specification of one or more transformations relating to the collection; and at least one self-describing, infrastructure-independent or executable specification of one or more rules encoding knowledge relevant to the collection.

In this embodiment, at least one of the representations of the collection may be (1) a self-describing, infrastructure-independent representation, (2) raw data, (3) data in a form capable of presentation, (4) data in a form capable of instantiation onto a query-able mechanism, (5) occurrences of attribute or element values, (6) one or more inverted attribute indices, (7) a topic map, or (8) data in a form capable of migration onto another medium. Furthermore, at least one of the representations of the collection may be a product of one of the transformations, or an input to one of the transformations.

Moreover, at least one of the transformations in this embodiment may be (1) content-preserving, (2) invertible, (3) configured to produce data objects in a form suitable for ingestion into the archive, (4) configured to produce data objects in a form suitable for instantiation onto a query-able mechanism, (5) configured to produce data objects in a form suitable for presentation, (6) configured to produce data objects in a form suitable for migration, (7) configured to produce occurrences of attribute or element values, or (8) configured to produce one or more inverted attribute indices.

A method of automatically placing one or more data objects from an archived collection into a form suitable for instantiation onto a query-able mechanism is also provided. In one embodiment, this method comprises the steps of retrieving from the archive a self-describing, infrastructure-independent or executable specification of one or more transformations relevant to the collection; retrieving from the archive a representation of one or more data objects in the collection; and executing the specification to automatically place the one or more data objects into a form suitable for instantiation onto the query-able mechanism.

Also provided is a method of automatically validating a collection of data objects within a persistent archive. In one embodiment, this method comprises the steps of retrieving from the archive a self-describing, infrastructure-independent or executable specification of one or more rules relevant to the collection; and executing the specification to automatically validate the collection.

In the foregoing method, the step of validating the collection may be performed by producing occurrences of attribute or element values; and determining that the occurrences are consistent with the rules encoded by the specification and any valid exceptions.

A method of automatically presenting one or more data objects from a persistent archive of a collection of data objects is also provided. In one embodiment, this method comprises retrieving from the archive a self-describing, infrastructure-independent or executable specification of one or more transformations relevant to the collection; retrieving from the archive a representation of one or more data objects in the collection; and executing the specification to automatically place the one or more data objects from the collection in a form suitable for presentation.

A method of automatically placing an archived collection of data objects into a form suitable for migration to a new medium is also provided. In one embodiment, this method comprises retrieving from the archive a self-describing, infrastructure-independent or executable specification of one or more transformations relevant to the collection; and executing the specification to automatically place the collection into a form suitable for migration to a new medium.

Any of the foregoing methods may be tangibly embodied on a processor readable medium.

A system is also provided which includes an engine for executing self-describing, infrastructure-independent, or executable specifications. In one embodiment, this system may further include a validation subsystem for validating the collection by commanding the engine to execute at least one self-describing, infrastructure-independent or executable specification encoding one or more rules relevant to the collection.

This system may further include a transformation subsystem for transforming one or more data objects in the collection by commanding the engine to execute at least one self-describing, infrastructure-independent or executable specification of one or more transformations relevant to the collection.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

FIG. 2 illustrates an example of raw data records.

FIG. 3A illustrates an example of an XML DTD.

FIG. 3B illustrates an example of an XML encoded data object.

FIG. 4 illustrates an example of an XML encoded data object which incorporates a DTD.

FIG. 5 illustrates another example of an XML encoded data object.

FIG. 6 illustrates an example of an XSL style sheet.

FIG. 7 illustrates an example of an HTML document specifying a format for a web browser.

FIG. 8 illustrates an example of a raw e-mail message manipulated as an object.

FIG. 9 illustrates an example of a DTD for the e-mail messages.

FIG. 10 illustrates SQL commands for creating relational database tables for the e-mails.

FIG. 14 illustrates an example of a DTD for Vietnam casualty statistics at the collection level.

FIG. 15 is an example of a DTD for Vietnam casualty statistics at the data object level.

FIG. 16 is an example of a SQL command for creating a relational database table for Vietnam casualty statistics.

FIG. 17 is an example of a SQL query to detect incomplete records in a database of Vietnam casualty statistics.

FIG. 18 is an example of an SQL query to determine total count, minimum age, maximum age, and average age at time of death from a database of Vietnam casualty statistics.

FIG. 25 illustrates an example of a DTD for legislative amendments.

FIG. 26 illustrates an example of a DTD for legislative Acts.

FIG. 27 illustrates an example of a declaration of an amendment element in the Act DTD.

FIGS. 28A-28C illustrate an example of an XML encoded Amendment.

FIG. 29 gives the meanings of file prefixes for an example collection of legislative Acts and amendments.

FIG. 30 gives the meanings of file suffixes for an example collection of legislative Acts and amendment.

FIGS. 31A-31S illustrate an example of a data dictionary for a collection of data objects representing artworks and images of artworks.

FIGS. 32A-32K illustrate an example of a DTD for a collection of data objects representing artworks and images of artworks.

FIGS. 35A-35G is a Perl script embodying a procedure for transforming raw data records into XML encoded data objects for an example collection involving artworks and images of artworks.

FIGS. 36A-36Z is a Perl script embodying a procedure for transforming XML encoded data objects into occurrence tuples for an example collection involving Senate legislative activities for the 106$^{th}$ Congress.

FIG. 37 is an example of a DTD for an example collection involving Senate legislative activities for the 106$^{th}$ Congress.

FIG. 38 is a Perl script for transforming raw data records into XML encoded data objects for an example collection involving Vietnam casualty statistics.

FIGS. 39A-39B is a Perl script for transforming raw data records into a form ready for instantiation onto a relational database for an example collection involving Vietnam casualty statistics.

FIG. 48 illustrates examples of F-logic rules implied by DTD declarations.

FIGS. 54A-54C illustrate an example of a topic map for a collection involving Senate legislative activities for the 106$^{th}$ Congress.

DETAILED DESCRIPTION

I. First Embodiment

A. Persistent Archives

Figure 1:
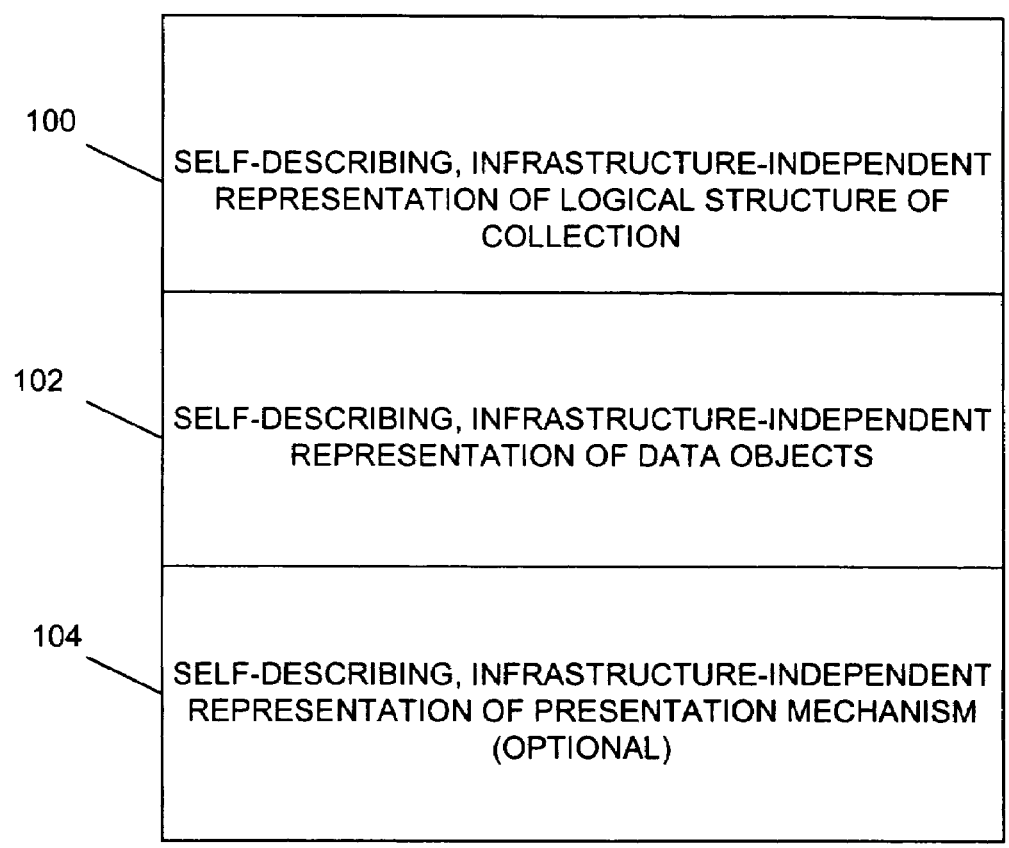
FIG. 1 illustrates an embodiment of a persistent archive according to the invention.

A first embodiment of the invention comprises a persistent archive as illustrated in FIG. 1. The archive, which may be tangibly embodied on a processor readable medium, comprises a self-describing, infrastructure-independent representation of a logical structure for the collection, identified with numeral 100, and a self-describing, infrastructure-independent representation of the data objects, identified with numeral 102. As illustrated, the archive may also include a self-describing, infrastructure-independent representation of a presentation mechanism for one or more of the data objects. This representation is identified in the figure with numeral 104.

For purposes of this disclosure, the phrase "self-describing" is a flexible concept which varies according to the circumstances, but it is generally used to refer to an element whose meaning is apparent from the element itself or through resort to no more than generally understood principles; the term "persistent" generally means the quality or capability of being accessible and usable at an indefinite point in time in the future; and the phase "infrastructure-independent" generally refers to the state or quality of being independent of a particular storage or computing platform or implementation or at most limited to only a generic class of storage or computing platforms or implementations.

Since the elements of the persistent archive—the logical structure of the collection and the data objects—are expressed in a self-describing, infrastructure-independent form, the collection can be re-instantiated and understood at an indefinite point in time in the future no matter what the specific state of technology is at the time. Consequently, the archive is persistent.

The logical structure of the collection may be expressed through a variety of means, but, in one example, the logical structure is expressed in the form of an eXtensible Markup Language (XML) Document Type Definition (DTD), which defines elements of data objects or collections, their interrelationship, and their attributes. Since an XML DTD is a non-proprietary and widely known mode of expression, is platform-independent, and is emerging as a standard, it qualifies as a self-describing infrastructure-independent means of expressing the logical structure of the collection. In fact, a standards body, the World Wide Web Consortium (W3C), originated XML and continues to develop a specification for it today. XML 1.0 became a formal W3C Recommendation in February, 1998. The formal specification for XML 1.0 is available at www.w3.org/TR/REC-xml, and is reproduced as Appendix A of "Professional XML," Wrox Press, 2000, pp. 937-980, which is hereby fully incorporated by reference herein as through set forth in full. An annotated version of the specification is available at www.xml.com/axml/testaxml.htm.

An example of an XML DTD is illustrated in FIG. 3B. This figure illustrates a DTD created for the customer records illustrated in FIG. 2. As can be seen in FIG. 2, each record associates the following fields with a customer: Customer Id, First, Last, City, Email, Phone, and Fax. This association is reflected in the DTD of FIG. 3A. There, the portion identified with numeral 300 creates a root element, CUSTOMER, and associates it with the following child elements: customer_name, email, phone, and fax. The + symbol following the customer_name element indicates that element can appear one or more times for each CUSTOMER; the * symbol following the email and phone elements indicates that these elements are optional and, if present, can appear more than once; and the ? symbol following the fax element indicates that this element is optional and, if present, can only appear once.

In addition, the DTD, in the portion identified with numeral 302, associates the following attributes with the root element CUSTOMER: customer_ID and city. The ID nomenclature appearing next to the customer_id element indicates that element is a unique identifier of the CUSTOMER element. The customer_id and city attributes are further identified as being required for each CUSTOMER element.

Line 304 indicates that the customer_name element itself has two child elements, first and last, each of which can appear one or more times. Portion 306 indicates that the first, last, email, phone, and fax elements may each have content which comprises PCDATA, i.e., parsed character data.

In another example, the logical structure of the collection is expressed in the form of Structured Query Language (SQL) commands for creating relational database tables. Since SQL is a non-proprietary and widely known mode of expression, and is platform independent, this mode of expression also qualifies as self-describing. This form of expression is described farther on in this specification in relation to FIG. 10.

The data objects of the collection may also be expressed through a variety of means, but, in one example, the data objects are expressed in the form of tagged XML data objects, in which components of the data objects are tagged with element or attribute names from the DTD. Since the DTD defines the meaning and interrelationship of the elements and attributes, the tagging, in associating element and attribute names with components of the data objects, qualifies as a self-describing, infrastructure-independent form of expression.

FIG. 3B is an example of a tagged XML document, and is the first of the customer records of FIG. 2 tagged using the DTD of FIG. 3A. Portion 308 indicates that the record is tagged using XML 1.0, and also identifies the corresponding DTD. Portion 310 consists of the tags identifying the root element CUSTOMER, and the values of its two attributes, customer_id and city. Portion 312 consists of the tags for the child element customer_name, and portion 314 shows the parsed character strings tagged by the child elements first and last. Finally, portion 316 shows the parsed character strings tagged by the elements email, phone, and fax.

Note that XML allows the integration of a DTD into a tagged XML document. FIG. 4 illustrates an example of such a document. Portion 400 indicates that the DTD is integrated into the XML document, portion 402 is the DTD, and portion 404 consists of the tagged XML document.

The persistent archive may also include a self-describing, infrastructure-independent representation of a presentation mechanism for one or more of the data objects. The presentation mechanism may capture the "look and feel" of certain presentation formats for the data objects that may be re-created at some point in the future when the archive is re-instantiated.

In one example, the presentation mechanism is represented in the form of an eXtensible Stylesheet Language (XSL) style sheet which specifies one or more templates for transforming XML-tagged data objects into desired presentation entities, such as a HTML page for presentation on a web browser. Since XSL is written in XML, it as well qualifies as a self-describing, infrastructure-independent form of expression. In December 1998, the standards body W3C made a formal Recommendation of the transformations portion of XSL (known as XSLT). An overview of XSL is available in "Professional XML," supra, Appendix E, pp. 1085-1099, and pp. 373-418, 692-712, which sections are all hereby fully incorporated by reference herein as though set forth in full.

FIG. 6 is an example of an XSL style sheet for transforming the tagged XML document of FIG. 5 into the HTML page of FIG. 7. The HTML page represents a mechanism for presenting the tagged XML document on a web browser.

A first example of a persistent archive according to the invention will now be described. This first example is a persistent archive of a collection of e-mails, one of which is illustrated in FIG. 8. The persistent archive in this example consists of the combination of (1) a DTD specifying elements and attributes for the e-mails, illustrated in FIG. 9; (2) SQL commands for creating relational database tables, illustrated in FIG. 10; (3) the XML-tagged e-mails; and (4) an HTML web page for presenting e-mails on a web browser.

Note that the DTD of FIG. 9 creates elements for most of the fields in the email of FIG. 8, and divides these elements into three groupings: required, optional, and other. Note also that the SQL commands of FIG. 10 and the DTD of FIG. 9 both represent a logical structure of the collection, although for different purposes. The SQL commands of FIG. 10 represent a logical structure for the collection which is appropriate for the purpose of instantiating the archive as a relational database. The DTD of FIG. 9, on the other hand, depicts the structure of individual data objects within the collection for the purpose of validating tagged XML documents using an XML parser. Although FIG. 9 depicts the structure of an individual data object, it still represents the structure of the entire collection, since the collection is an accumulation of individual data objects.

Figure 11:
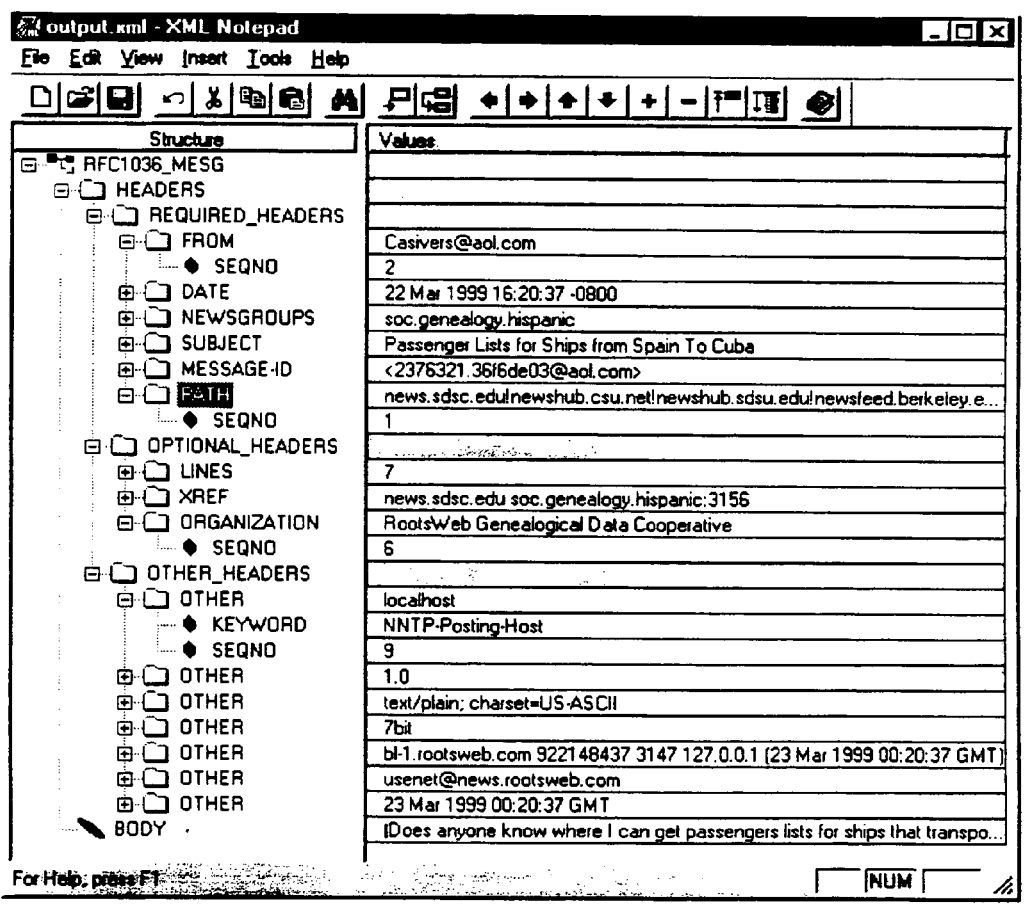
FIG. 11 illustrates an example of a presentation using Microsoft Notepad, an XML viewer.
Figure 12:
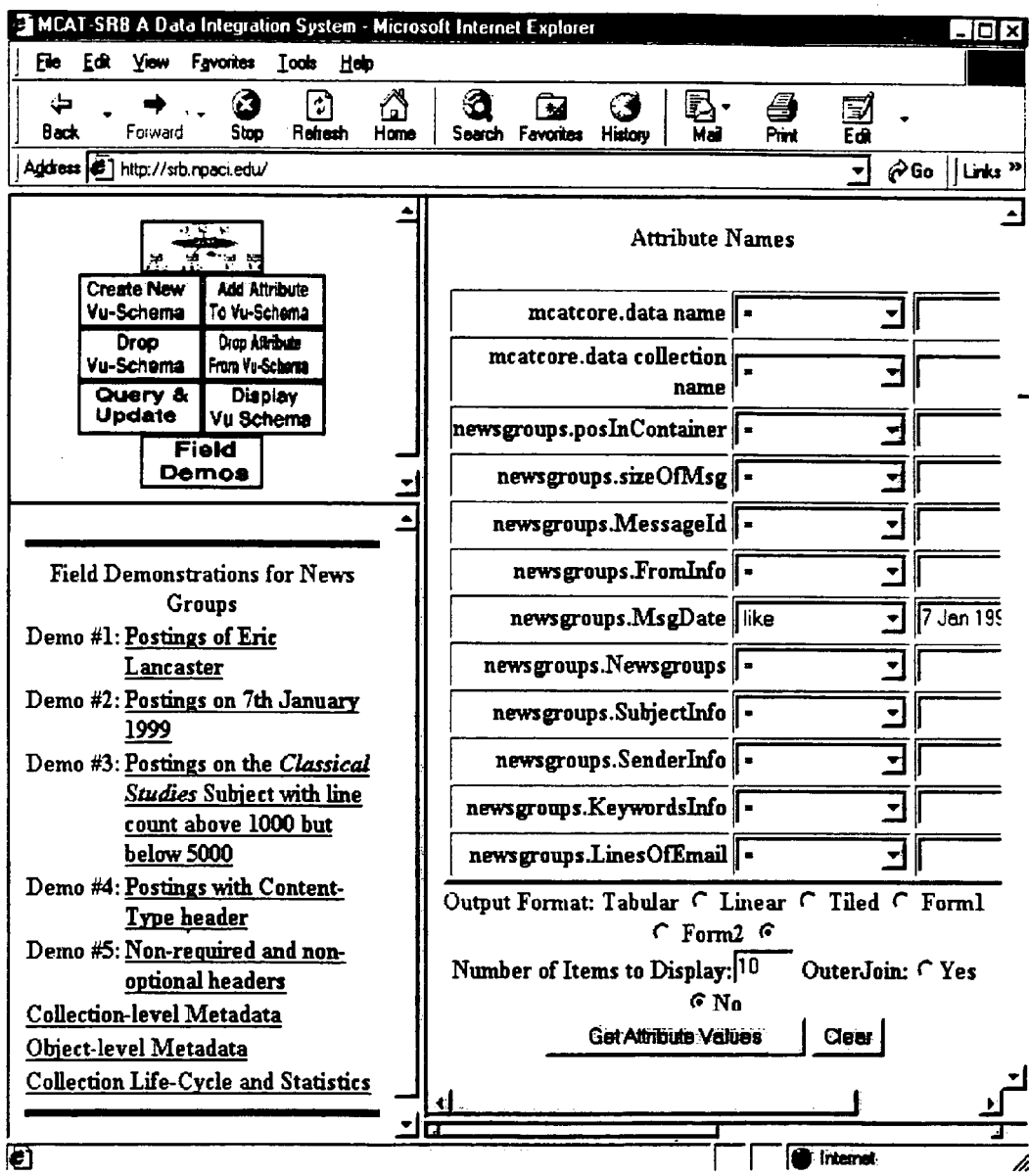
FIG. 12 illustrates an example of a web-based presentation formatted according to an HTML style sheet.
Figure 13:
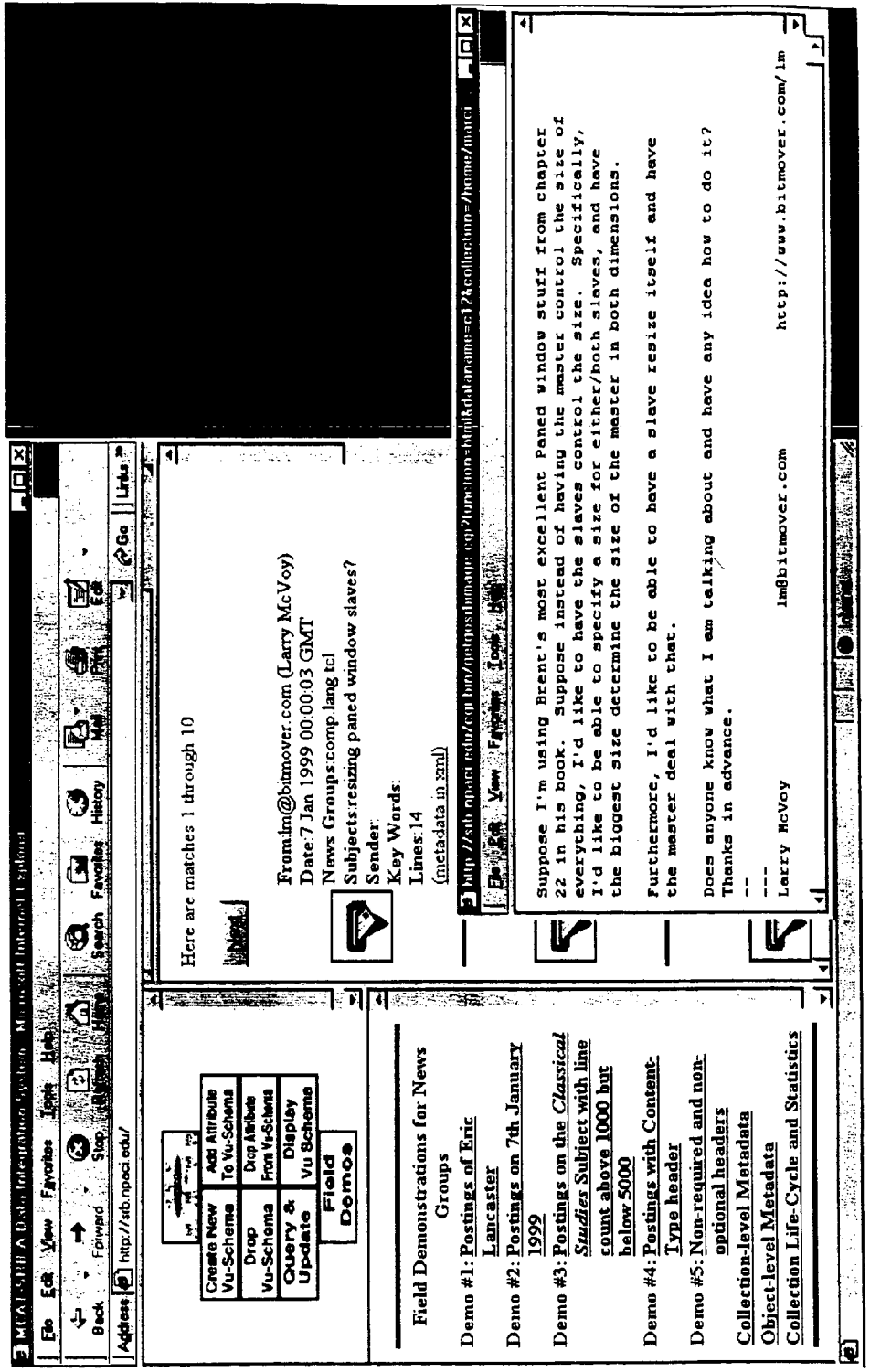
FIG. 13 illustrates an example of a web-based presentation of the results of a database query formatted using an HTML style sheet.

FIG. 11 illustrates a presentation of the e-mails using Microsoft Notepad, an XML viewer. Note that the viewer displays the tagged XML documents directly, and does not utilize the HTML page for this purpose. FIG. 12 illustrates a query to the e-mails after they have been instantiated onto a relational database. FIG. 13 illustrates the results of the query displayed according to the HTML page stored with the archive. As can be seen, the results are stored in blocks of 10, and the text of the e-mail currently clicked on is displayed in a separate tinted window.

A second example of a persistent archive in accordance with the invention will now be described. This second example concerns Vietnam casualty statistics. Here, the collection comprises a plurality of data objects, each of which is a record documenting a Vietnam casualty. The persistent archive in this example comprises (a) a DTD for the collection as a whole, illustrated in FIG. 14; (b) a DTD for the individual data objects within the collection, illustrated in FIG. 15; (c) SQL commands for creating relational database tables for the collection, illustrated in FIG. 16; and (d) XML-tagged casualty records.

Note that the DTD of FIG. 14, the DTD of FIG. 15, and the SQL commands of FIG. 16, each represent the logical structure of the collection, although for different purposes. The DTD of FIG. 14 is for the purpose of defining elements at the collection level, and the DTD of FIG. 15 is for the purpose of defining elements at the individual data object level. The tables created by the SQL commands of FIG. 16 are for the purpose of instantiating the collection as a relational database. Note also that the XML-tagged records represent the data objects of the collection.

Referring to FIG. 14, the DTD indicates that the collection has one or more databases, and the remainder of the DTD indicates that each database has a creation date, a record size, and one or more records.

Referring to FIG. 15, the DTD indicates that a record has no child elements, but instead is defined in terms of required attributes, such as social security or service number, date of death, date of birth, cause of death, age at time of death, etc.

Referring to FIG. 16, the SQL commands create a relational database table with entries for each of the required attributes in the DTD of FIG. 15. Other records which are added include a unique record number and a record indicating that the social security number/service number is the primary key for querying the database.

FIGS. 17 and 18 illustrate examples of queries which can be made once the collection has been instantiated as a relational database. FIG. 17 illustrates a SQL query seeking all casualty records where the date of birth or date of death is incomplete or null. FIG. 18 illustrates a SQL query seeking a total count of the casualty records where age at time of death is available, the minimum age and maximum age represented by all these records, and the average age determined over all these records.

B. Methods Involving Persistent Archives

The invention includes several methods involving persistent archives such as a method of ingesting data objects into a persistent archive, a method of instantiating a persistent archive onto a query-able mechanism, a method of presenting one or more data objects from a persistent archive, and a method of migrating a persistent archive from a first medium to a second medium.

Figure 19:
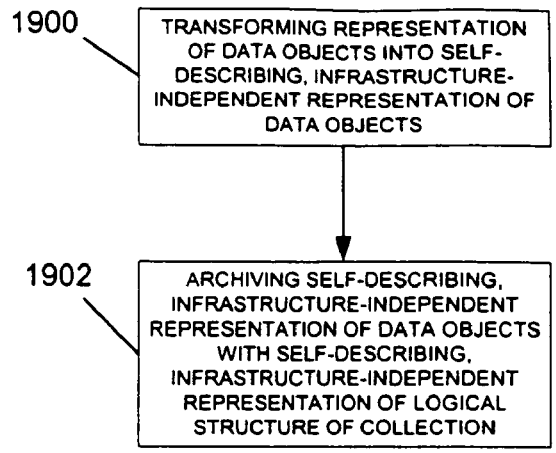
FIG. 19 is a flowchart of an embodiment of a method of ingestion according to the invention.

FIG. 19 is a flowchart of one embodiment of a method of ingesting one or more data objects into a persistent archive according to the invention. This method may be practiced when the archive is first created, or when an existing archive is to be supplemented. As illustrated, the method comprises steps 1900 and 1902. Step 1900 comprises transforming a representation of the data objects into a self-describing, infrastructure-independent representation of the data objects. In one example, this step comprises tagging the content of the data objects with XML element and attribute names, thus giving rise to XML-tagged data objects. Step 1902 comprises archiving the self-describing, infrastructure-independent representation of the data objects with a self-describing, infrastructure-independent representation of a logical structure for the collection.

In one example, the self-describing, infrastructure-independent representation of a logical structure for the collection is a DTD for the individual data objects in the collection. In a second example, it is a DTD for the overall collection. In a third example, it is a representation of the collection suitable for instantiation on a query-able mechanism. This representation may comprise SQL commands for creating one or more relational database tables embodying a relational database schema. In a fourth example, this representation may comprise combinations of the foregoing.

Figure 20:
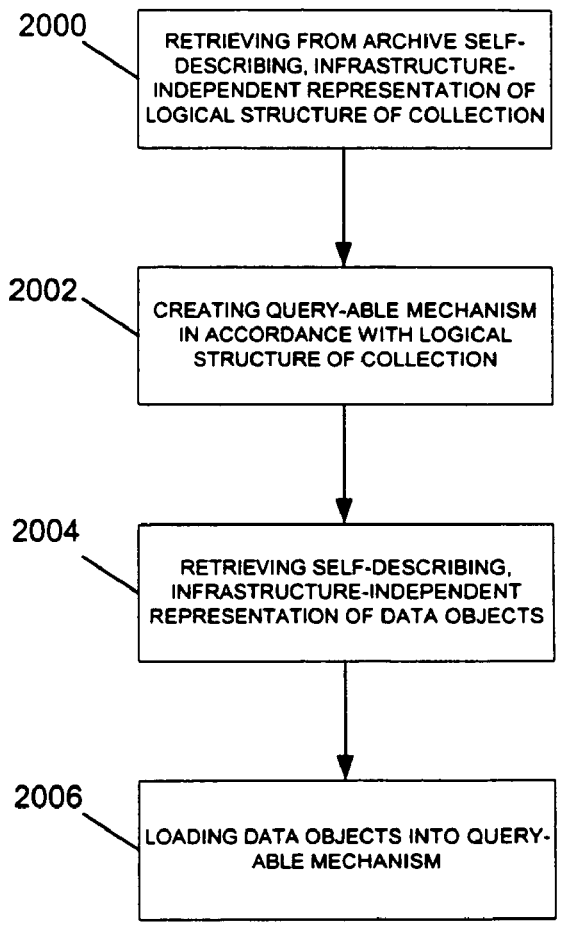
FIG. 20 is a flowchart of an embodiment of a method of instantiation according to the invention.

FIG. 20 is a flowchart of a method of instantiating a persistent archive onto a query-able mechanism according to one embodiment of the invention. This method may be practiced when it is desired to re-establish the archive onto a query-able mechanism which is able to access and retrieve the data objects in response to specific queries. That may occur many years after the archive is first created, and may even involve instantiating the archive onto technology which was not in existence at the time the archive was created.

As illustrated, the method comprises, in step 2000, retrieving from the persistent archive a self-describing, infrastructure-independent representation of a logical structure for the collection; in step 2002, creating on a medium a query-able mechanism in accordance with the logical structure; in step 2004, retrieving from the archive a self-describing, infrastructure-independent representation of one or more data objects; and then, in step 2006, loading the one or more data objects into the query-mechanism.

In one example, the query-able mechanism is a database management system, such as a relational or hierarchical database management system. The data objects, once instantiated on the database management system, may be rapidly accessed using database queries. The retrieved objects may then be presented using a presentation mechanism retrieved from the archive. In one example, the presentation mechanism is an HTML web page which specifies the format for displaying data objects on a web browser. In another example, the presentation mechanism is a XSL style sheet which specifies a format for displaying XML-tagged data objects on a web browser.

Figure 21A:
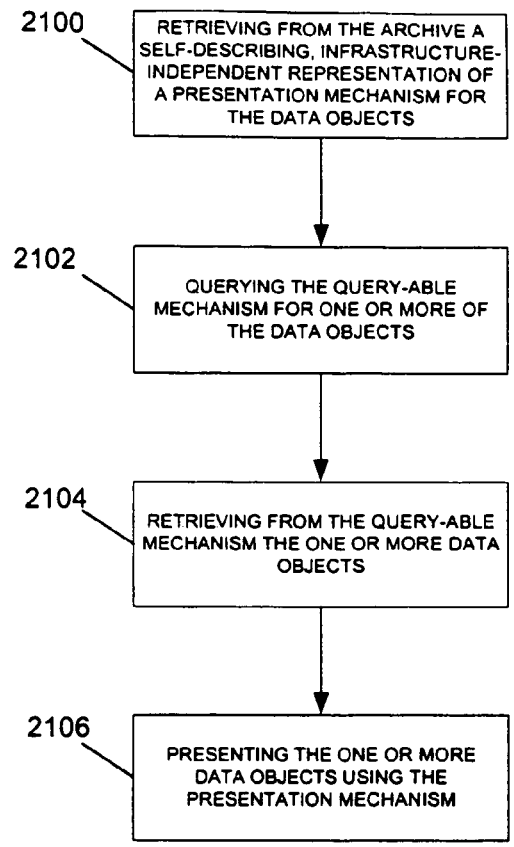
FIG. 21A-21B are flowcharts of embodiments of methods of presentation according to the invention.

FIG. 21A is a flowchart of a method of presenting, according to one embodiment of the invention, one or more data objects from a query-able mechanism onto which a persistent archive has been instantiated. The method comprises, in step 2100, retrieving from the archive a self-describing, infrastructure-independent representation of a presentation mechanism for one or more data objects in the archive; in step 2102, querying the query-able mechanism for one or more data objects, in step 2104, retrieving from the query-able mechanism the one or more data objects queried in the previous step; and, in step 2106, presenting the one or more data objects using the presentation mechanism.

Figure 21B:
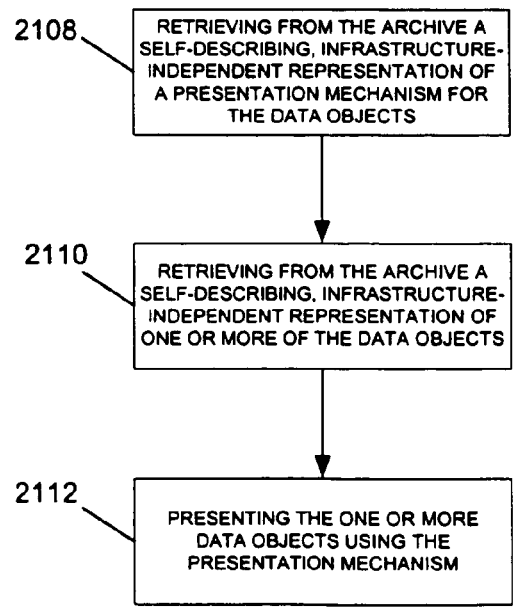

FIG. 21B is a flowchart of a method, according to one embodiment of the invention, of presenting one or more data objects retrieved from a persistent archive. The method comprises, in step 2108, retrieving from the archive a self-describing, infrastructure-independent representation of a presentation mechanism for one or more data objects; in step 2110, retrieving from the archive a self-describing, infrastructure-independent representation of one or more of the data objects; and, in step 2112, presenting the one or more data objects using the presentation mechanism.

Figure 22:
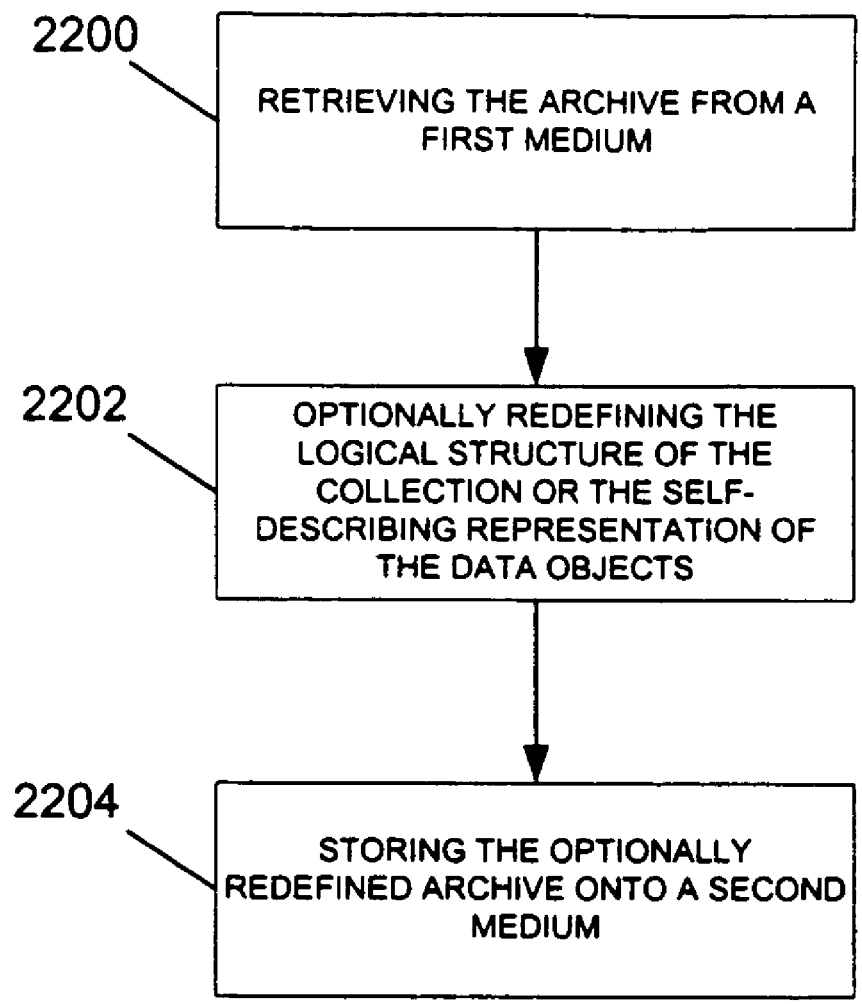
FIG. 22 is a flowchart of an embodiment of a method of migration according to the invention.

FIG. 22 is a flowchart of a method, according to one embodiment of the invention, of migrating a persistent archive from a first medium onto a second medium. For purposes of this disclosure, a "medium" is any processor accessible device capable of storing data, including without limitation RAM, ROM, EPROM, EEPROM, PROM, disk, floppy disk, hard disk, CD-ROM, DVD, flash memory, etc. This method may be practiced on a periodic basis to guard against physical degradation or obsolescence of the medium on which a persistent archive is stored. The second medium may even embody new technology which was not in existence at the time the archive was stored on the first medium.

The method comprises, in step 2200, retrieving the persistent archive from a first medium; in step 2202, optionally redefining the logical structure of the collection or the self-describing, infrastructure-independent representation of the data objects in the archive; and, in step 2204, storing the persistent archive as optionally redefined onto a second medium.

Each of the foregoing methods may be tangibly embodied as a series of processor-executable instructions stored on a processor-readable medium. Again, for purposes of this disclosure, a "medium" is any processor accessible device capable of storing data, including without limitation RAM, ROM, EPROM, EEPROM, PROM, disk, floppy disk, hard disk, CD-ROM, DVD, flash memory, etc.

In one example, one or more of the foregoing methods are tangibly embodied as a Perl script stored on a processor readable medium. Examples of Perl scripts for performing various ingestion and instantiation functions are illustrated in FIGS. 32A-32K, 35A-35G, 36A-36Z, 38, and 39A-39B, which are discussed infra.

C. Systems For Maintaining Persistent Archives

Figure 23A:
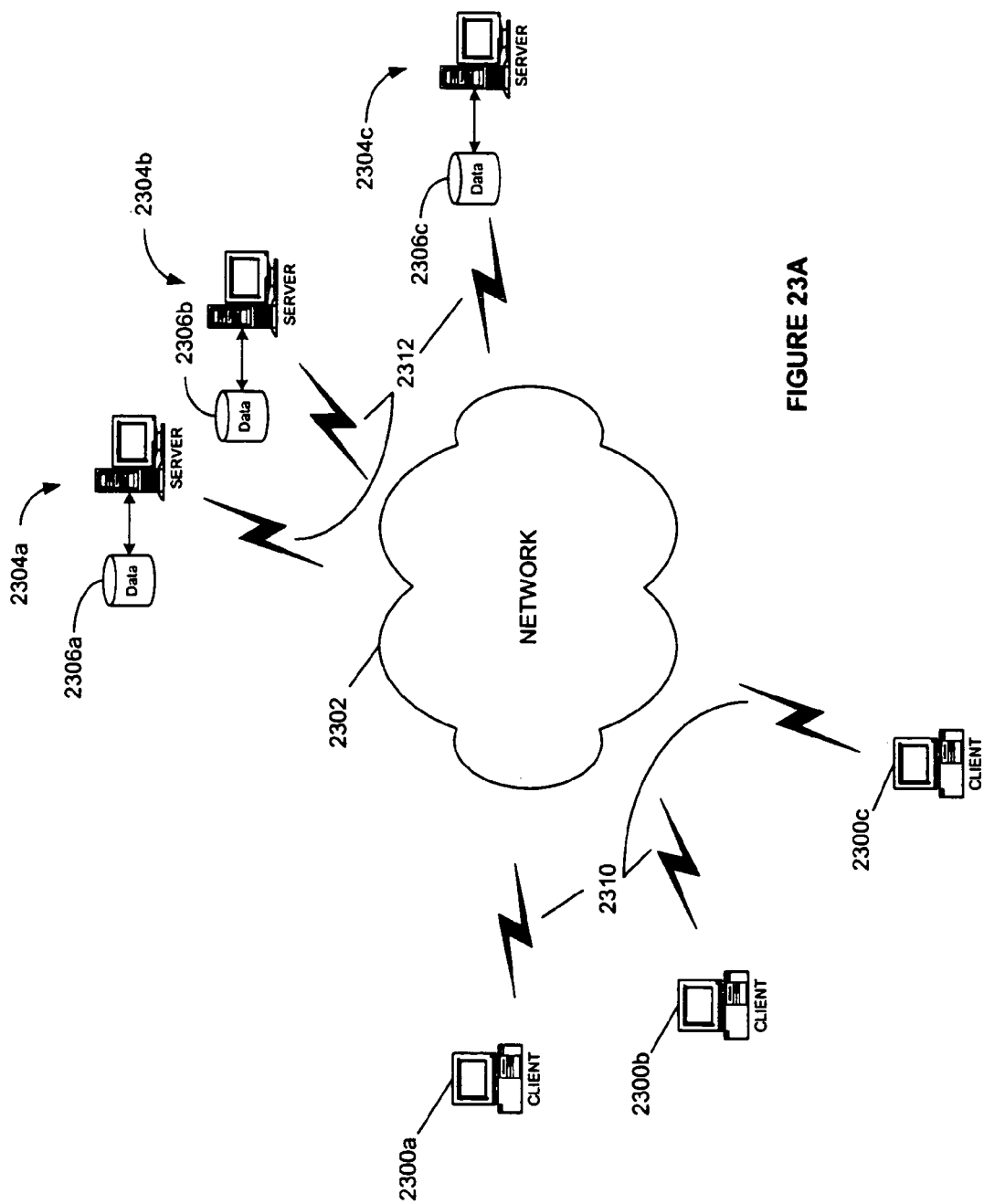
FIG. 23A illustrates one embodiment of a system according to the invention.

A system for maintaining a persistent archive according to one embodiment of the invention is illustrated in FIG. 23A. As illustrated, in this embodiment, the system conforms to a client-server model, but it should be appreciated that embodiments are possible which conform to other models, such as a typical processor configuration in which a processor is tightly coupled to one or more storage devices or media, and one or more input/output (I/O) devices through an address and data bus, and also possible an I/O bus.

Referring to FIG. 23A, the system comprises one or more clients 2300a, 2300b, 2300c capable of accessing one or more servers 2304a, 2304b, 2304c over one or more networks 2302. The network 2302 may be a proprietary network or a public network such as the Internet. Moreover, the clients may be coupled to the network through wireline or wireless communications links 2310, and the servers may be coupled to the network through wireline or wireless communications links 2312.

One or more of the servers 2304a, 2304b, 2304c may include a medium 2306a, 2306b, 2306c capable of holding a persistent archive or a query-able mechanism onto which a persistent archive may be instantiated. One or more of the clients 2300a, 2300b, 2300c may be capable of holding a presentation mechanism for presenting data objects from one of the archives or query-able mechanisms maintained on the servers.

One or more the clients 2300a, 2300b, 2300c may be capable of issuing requests which are provided to one or more of the servers 2304a, 2304b, 2304c over the network 2302. Responsive thereto, one or more servers receiving the requests are configured to respond to and handle the requests appropriately.

Figure 23B:
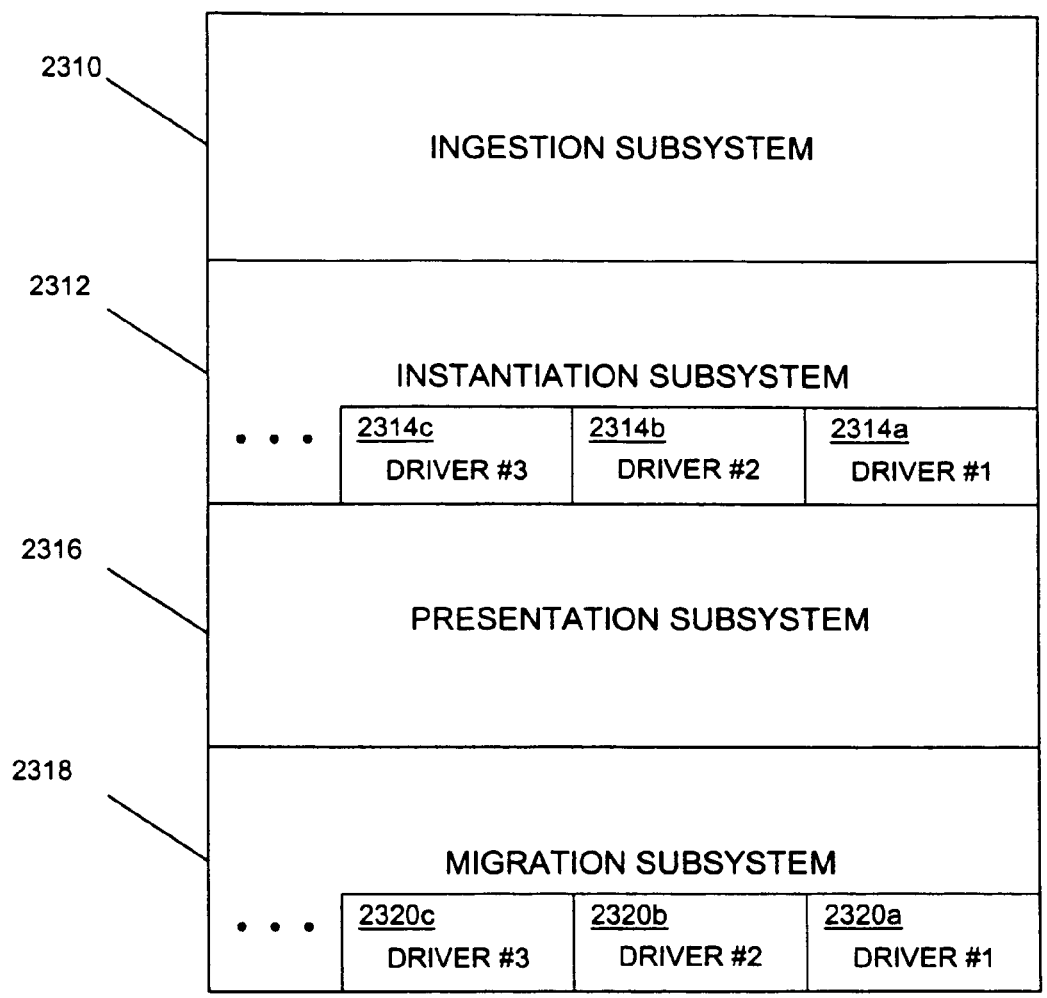
FIG. 23B illustrates subsystems within the system of FIG. 23A.

Referring to FIG. 23B, one or more of the servers 2304a, 2304b, 2304c may comprise an ingestion subsystem 2310 for ingesting data objects into a persistent archive, responsive to a request from a client, and an instantiation subsystem 2312 for instantiating a persistent archive onto a query-able mechanism, again responsive to a request from a client. The instantiation subsystem 2312 may include a plurality of drivers 2314a, 2314b, 2314c for instantiating the archive on a variety of media. As new media becomes available, a driver for providing read and write access to that media may be added to the instantiation subsystem 2312.

Again referring to FIG. 23B, one or more of the servers may also include a migration subsystem 2318 for migrating an archive onto a new medium, perhaps maintained by a different server, responsive to a request from a client, and a presentation subsystem 2316 for presenting to a client, responsive to a request from a client, one or more data objects from an archive maintained either on the server or a query-able mechanism maintained by the server onto which the archive has been instantiated. The one or more data objects may be presented to the client, and the client may in turn present the one or more data objects to a user, using a self-describing, infrastructure-independent presentation mechanism retrieved from the archive.

As with the instantiation subsystem 2312, the migration 2318 subsystem may include a plurality of drivers 2320a, 2320b, 2320c for instantiating the archive on a variety of media. As new media becomes available, a driver for providing read and write access to that media may be added to the migration subsystem 2318.

As discussed, the system may conform to a client-server model in which an archive is maintained on a server, and the server responds to requests from a client which are transmitted to the server over a network. Depending on the request, the ingestion subsystem 2310, instantiation subsystem 2312, presentation subsystem 2316, or migration subsystem 2318 may be invoked. Requests for ingestion are handled by the ingestion subsystem 2310, requests for instantiation are handled by the instantiation subsystem 2312, requests for presentation are handled by the presentation subsystem 2316, and requests for migration are handled by the migration subsystem 2318.

In one implementation, the system is a Storage Resource Broker as developed and maintained at the Supercomputer Center on the campus of the University of California, San Diego. In this implementation, the SRB is middleware which brokers requests from clients in a client-server system to servers. When a request by a client is initiated, the SRB spawns a broker to handle the request. The broker then examines system resources and selects one or more servers to handle the request. The broker then passes the request on to the selected servers which then handle the request. The broker monitors the situation and remains active until the request has been handled. At that point, the broker reports any results back to the client, and also updates it on the status of the request, i.e., whether it was satisfactorily completed or not.

The SRB may also employ a meta-data catalog (MCAT) for keeping track of where data is stored throughout the system. When a request from a client necessitates access to data stored on the system, the broker which is spawned to handle the request may first access the MCAT to determine where the data is located on the system. If the request results in the data being altered or modified in any way, the broker may update the MCAT to reflect these modifications and changes. Similarly, if the request results in the addition of data to the system, the broker may create records in the MCAT indicating the location of, and possibly other attributes, of this data.

II. Second Embodiment

A. Knowledge-Based Persistent Archives

Figure 24:
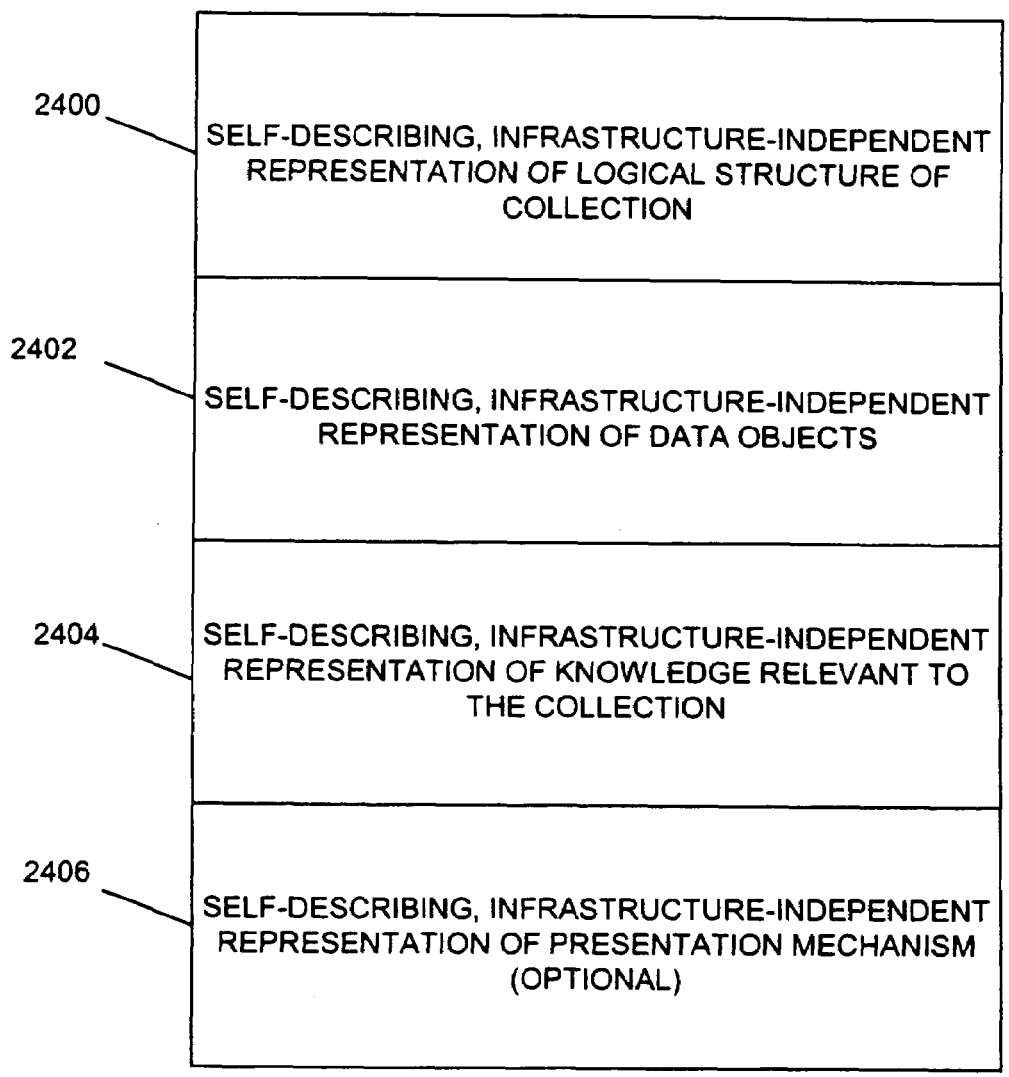
FIG. 24 illustrates an embodiment of a knowledge-based persistent archive according to the invention.

In a second embodiment, the invention provides a knowledge-based persistent archive of a collection of data objects tangibly embodied on a processor readable medium. Referring to FIG. 24, one embodiment of the knowledge-based persistent archive comprises a self-describing, infrastructure-independent representation of a logical structure for the collection, identified with numeral 2400, a self-describing, infrastructure-independent representation of the data objects, identified with numeral 2402, and a self-describing, infrastructure-independent representation of knowledge relevant to the collection, identified with numeral 2404. The archive may optionally include a self-describing, infrastructure-independent representation of a presentation mechanism for one or more data objects in the collection.

The first two elements of the archive—the self-describing, infrastructure-independent representation of a logical structure for the collection and a self-describing, infrastructure-independent representation of the data objects in the collection—are as described in relation to the previous embodiment. Similarly, the fourth optional element—the self-describing, infrastructure-independent representation of the data objects in the collection—is as described in relation to the previous embodiment.

The third element—the self-describing, infrastructure-independent representation of knowledge relevant to the collection—represents knowledge which may not be embodied in the first two elements and which may be necessary or desirable for the purpose of understanding the collection. Accordingly, this element may be included in the archive for the purpose of enhancing or contributing to its persistent quality.

The knowledge may be in the form of relationships between concepts relevant to the collection. The relationships may be logical or semantic relationships, such as mappings between concepts and attributes or elements of data objects. The relationships may also be temporal or procedural relationships, such as timing relationships that may exist between data objects in the collection, or procedures for transforming data objects into a form ready for ingestion into the archive, instantiation into a query-able mechanism, or presentation to a user. The relationships may also be spatial or structural relationships, and embody rules or constraints between certain elements or attributes of data objects. The relationships may also be algorithmic or functional relationships, such as algorithmic relationships between data objects and features of data objects.

In one example, the knowledge may be expressed in a language such as Prolog. Prolog is a non-proprietary and infrastructure-independent language which is emerging as a standard. Thus, it as well qualifies as a self-describing, infrastructure-independent mode of expressing the knowledge. In a second example, the knowledge may be expressed in the form of Knowledge Interchange Format (KIF). In a third example, the knowledge is in the form of a topic map which maps concepts relevant to the collection to attribute and elements of the data objects in accordance with the ISO 13250 Topic Map standard (set forth in ISO/IEC 13250 Topic Maps, International Organization for Standardization and the International Electromechanical Commission, which is hereby fully incorporated herein as though set forth in full).

A first example of a knowledge-based persistent archive according to the invention will now be described. This archive concerns a collection of data objects each representing a particular legislative action, i.e., bill, amendment, resolution, etc., taken during the $104^{th}$ Congress. The raw data for ingestion into the archive consists of a plurality of files, each representing a legislative action, with a prefix to the file name indicating the origin of the legislative action, and a suffix to the file indicating the specific type of legislative action represented by the file.

Referring to FIG. 29, the possible prefixes to the files are indicated. Generally speaking, the prefixes identify whether the legislative action originated in the House or the Senate. FIG. 30 lists the possible suffixes to the files. For example, the suffixes "eah" and "eas" both indicate that the corresponding legislative action is an amendment, and the suffixes "eh" and "es" both indicate that the corresponding legislative action is an Act.

The ingestion process in this particular example consists of creating a separate DTD for each possible type of legislative action, and then tagging each of the files with the elements and attributes of the corresponding DTD to create XML encoded data objects, each representing a legislative action.

In this particular example, the knowledge base that is considered important is the timing relationships between the various legislative actions represented by the suffixes in FIG. 30. This is considered important because these timing relationships embody relationships that exist between the various data objects in the collection. For example, consider that an enacted piece of legislation starts out as a bill in one of the bodies of Congress (House or Senate). That bill is eventually referred to a Committee. After emerging from the Committee, the bill is eventually referred to the full House or Senate, where it may be read on the floor of these bodies. In addition, that bill spawns a bill in the other body of Congress. That bill in turn is also referred to a Committee, and eventually to the full House or Senate. A joint Committee then resolves differences between the House and Senate versions of the bill. The data objects representing these legislative actions all bear a relationship to one another, and the purpose of the knowledge base in this particular example is to capture these relationships. In one implementation, this information is captured and expressed in a language such as Prolog.

The persistent archive in this example comprises (a) the DTD for each of the possible legislative actions; (b) the XML-tagged data objects each representing a legislative action taken during the 104$^{th}$ Congress; and (c) the timing relationships between the various legislative actions expressed in Prolog.

FIG. 25 illustrates an example of a DTD for amendments, i.e., those files having a suffix of "eas" or "eah". The core portion of this DTD is the element RESOLUTION. As indicated, the element RESOLUTION consists of (1) zero or more instances of the element TYPE or (2) the element STATEMENT.

Moreover, the element STATEMENT consists of (1) the element OPENING or (2) zero or more instances of the element STRIKEOUT or the element INSERT or (3) the element CLOSING.

FIGS. 28A-28C illustrate an example of an XML tagged data object for an amendment. In this particular example, there is an OPENING, two STRIKEOUTS, two INSERTS, and a CLOSING.

FIG. 26 illustrates one example of the DTD for an Act, i.e., those files having a suffix of "eh" or "es". The core portion of this DTD is the element ACT. As indicated, this element consists of zero of more instances of the elements PURPOSE or SECTION. The element SECTION consists of zero or more instances of (1) HEADING or (2) STATEMENT or (3) SUBSECTION. The element HEADING consists of zero or more instances of (1) character data or (2) the element SHORTTITLE.

The element STATEMENT consists of zero or more instances of (1) character data or (2) the element AMENDMENT or (3) the element SECTION or (4) the element ATTESTATION.

The element AMENDMENT consists of zero or more instances of (1) the element CODE or (2) the element STRIKEOUT or (3) the element INSERT or (4) the element REDESIGNATE.

The element INSERT consists of zero or more instances of (1) character data or (2) the element PARAGRAPH or (3) the element SUBSECTION or (4) the element INSERT.

The element PARAGRAPH consists of zero or more instances of (1) the element TOPIC or (2) the element TEXT or (3) the element PARAGRAPH. An attribute NUMBER is associated with each PARAGRAPH.

The element SUBSECTION consists of zero or more instances of (1) the element TOPIC or (2) the element PARAGRAPH. An attribute NUMBER is associated with each SUBSECTION.

Note that, in this example, an Act can be an original Act or an amendment. Thus, the DTD of FIG. 26 can also be used in lieu of the DTD of FIG. 25 to tag files representing amendments. FIG. 27 illustrates the portion of the DTD of FIG. 26 which gives it the flexibility to handle amendments: the declaration that the element STATEMENT can consist of the element AMENDMENT.

A second example of a knowledge-based persistent archive according to the invention will now be described. This example involves a collection of data objects each of which represents an art object as well as one or more images of the art object. Accordingly, the DTD in this example specifies elements and attributes of both the underlying art object as well as any images of the art object.

This combined DTD is illustrated in FIGS. 32A-32K. As indicated, for each art object, the DTD creates elements for classifying the work (am_classification), describing its appearance (am_appearance), identifying its creators (am_creators), etc. In addition, the DTD creates an element (am_media_metadata) which contains links to images and multimedia files relating to the art object and to data which further describes these images and multimedia files.

This DTD is in accordance with a data dictionary supplied by the producer of the archive. This data dictionary, which is expressed in the form of a Microsoft Excel spreadsheet, is illustrated in FIGS. 31A-31S. In particular, note that the DTD specifies atomic elements for the record fields described in the data dictionary. For example, FIG. 31A of the data dictionary describes a OTY record type for identifying the kind of art work involved, and FIG. 32B of the DTD specifies the atomic element OTY_object_type as a child of the am_classification element.

Figure 33:
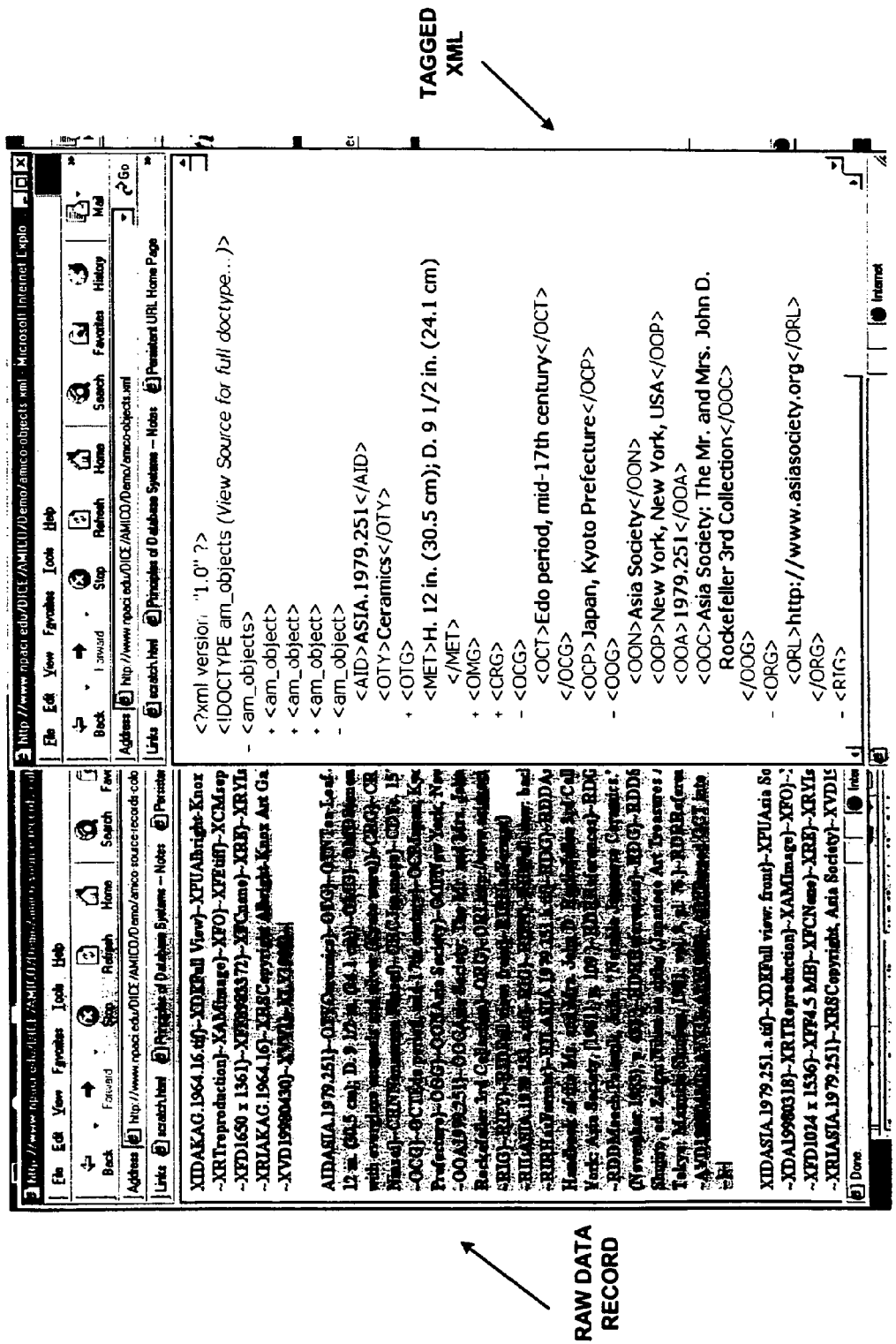
FIG. 33 illustrates the transformation of raw data records into XML encoded data objects.

This DTD can be used to tag raw data records for each of the art objects and their corresponding images/multimedia files. FIG. 33 is a screen shot showing on the left an example of a raw data record, and also showing on the right the XML-tagged version of that data record.

Figure 34:
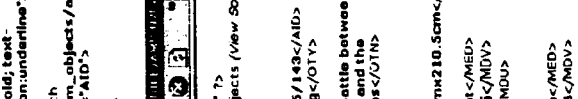
FIG. 34 illustrates an example of a presentation made according to an XSL style sheet.

An XSL style sheet can be used to display the XML tagged data objects on a web browser in a prescribed format. FIG. 34 is a screen shot showing at the upper left an XSL style sheet, showing on the lower left XML-tagged data objects, and showing on the right a screen shot of the data objects presented in accordance with the XSL style sheet.

A Perl script can be used for the purpose of automatically transforming the raw data records into XML tagged data objects. This script is set forth at FIGS. 35A-35G. Note that Perl is a standard language capable of being executed on a variety of platforms. Thus, it qualifies as a self-describing, infrastructure-independent representation of the process of transforming the raw data records into the XML tagged data objects.

The knowledge base in this example consists of two items. The first is the data dictionary of FIGS. 31A-31S expressed in a suitable self-describing, infrastructure-independent form such as Prolog or KIF. This data dictionary is useful to archive because it contains a definition of each of the record fields, and thus the atomic elements in the DTD. Thus, it can be used to facilitate understanding of the archive at the time of instantiation.

The second element is the Perl script of FIGS. 35A-35G. This script is useful to archive because it can be used for the purpose of ingesting additional data records into the archive at some point in the future. When it is desired to supplement the archive with new data records, this script could be retrieved and used to transform the raw data records into XML tagged data objects which would then be added to the archive. In addition, since this script provides the processing steps used to create the data objects in the collection, it can facilitate understanding of the collection at some point in the future.

The knowledge-based persistent archive in this example thus comprises: (1) the DTD of FIGS. 32A-32K; (2) the XML tagged data objects representing the art objects and their associated images/multimedia files; (3) optionally, one or more XSL style sheets for presenting the data objects; (4) the data dictionary of FIGS. 31A-31S expressed in a language such as Prolog or KIF; and (5) the Perl script of FIGS. 35A-35G.

A third example of a knowledge-based persistent archive in accordance with the invention will now be described. This third example involves Senate legislative activities for the 106$^{th}$ Congress. Raw files each represent a legislative activity, whether a bill, resolution, or amendment, by a Senator during the 106$^{th}$ Congress. Each of the files is encoded into an XML-tagged format in accordance with the DTD of FIG. 37. As can be seen, this DTD specifies a Senate legislative activity (SLA) collection consisting of zero or more senate_files. Each senate_file may have a header_page which identifies the Senator by first name, middle name, last name, and state. In addition, each senate_file may have zero or more sections, with each section associated with one or more bills, amendments, or resolutions (bars).

A Perl script, illustrated in FIGS. 36A-36Z, is capable of processing the XML tagged data objects and producing a list of occurrence, attribute, value (oav) triplets. Each oav triplet represents an occurrence of an attribute of the data object (element using XML terminology), and identifies (1) the attribute, (2) the value associated with that attribute for the particular occurrence, and (3) the location of that occurrence in the XML tagged data objects.

These oav triplets may be used for a variety of purposes. First, they may be used to confirm that the selected XML elements and attributes are suitable for representing either the collection or the data objects. For example, if an XML element is selected, but there are no oav triplets for the element, that suggests the element may not be needed to represent the data objects, and that a new element may be appropriate. As another example, the oav triplets may help to determine that a combination of elements, e.g., first and last name, may not be sufficient to uniquely identify a Senator and that it may be necessary to add the state of the Senator to the combination in order to form a unique identifier for a Senator. This helps achieve closure faster during the element or attribute definition phase.

Figure 43:
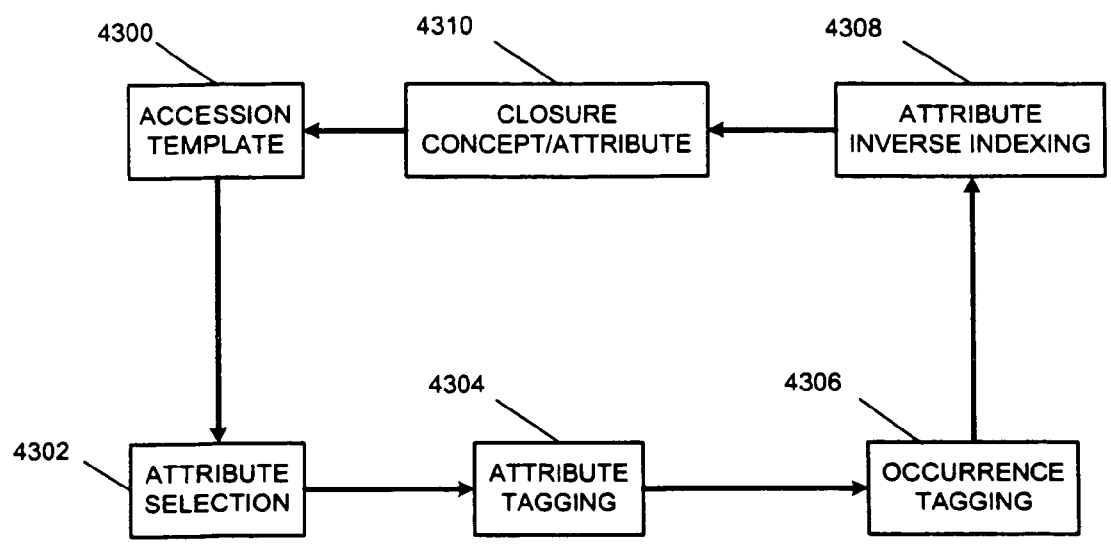
FIG. 43 is a flowchart depicting one embodiment of the process of achieving closure of attribute selection according to the invention.

The attribute selection process is represented in FIG. 43. In step 4300, the accession template, i.e., the fields of the raw data records to be ingested into the archive, is analyzed, and in step 4302, attribute and elements relevant to the collection are initially selected. Then, in step 4304, the raw data records are tagged using the attribute and elements identified in the previous step. Step 4306 is then performed. There, oav triplets as described previously are produced. Step 4308 is then performed. This step comprises inverting the oav triplets to result in the following format: attribute (value, occurrence). This form facilitates determination of whether closure has been achieved. Step 4310 is then performed. This step comprises analyzing the oav triplets and/or the inverted triplets to ensure both completeness and consistency. Completeness may be identified when all attributes are populated, and the information content is fully annotated. Consistency may be identified when all attribute values fall within defined ranges, and when other relevant consistency checks are satisfied.

Second, the triplets may form a flat database which may be queried to obtain useful information about the collection. For example, these queries can help determine the amount of redundancy in the collection, and thus suggest transformation rules for reducing the size of the collection. In one instance, an analysis of the occurrence for the bar_id attribute revealed that only about 5,600 unique bars are represented by 44,000 SLA data objects. As another example, the queries can help determine if there are any exceptional or surprising conditions, such as no legislative activity for a particular Senator, which would be useful to add to the knowledge base of the archive.

Third, the oav triplets may help check the internal consistency of the collection. For example, a particular Senator may be either a sponsor, co-sponsor, or submitter of a bar. Thus, it would seem reasonable to conclude that the total number of SLA files would equal the number of Senators identified within the collection as being a sponsor, co-sponsor, or submitter of a BAR. The oav triplets can be analyzed to determine whether or not this condition is satisfied, or whether exceptions exist which must be added to the knowledge base so that completeness and/or consistency can be declared.

Fourth, the oav triplets may be readily transformed into other useful data structures. For example, the oav triplets may be readily converted into a form ready for instantiation onto a query-able mechanism, such as a relational database. As another example, the oav triplets may be readily converted into a form, such as XML tagged data objects, ready for ingestion into the archive.

In this example, the knowledge base may consist of the Perl script of FIGS. 36A-36Z, the oav triplets, or the oav triplets in combination with the Perl script. The knowledge-based persistent archive in this example may thus comprise (1) the DTD of FIG. 37; (2) the XML tagged data objects representing the SLA activities; and (3) the Perl script of FIGS. 36A-36Z and/or the oav triplets.

A fourth example of a knowledge-based persistent archive is based on the Vietnam casualty archive discussed in relation to the first embodiment. Here, this archive is extended to include a knowledge base. The knowledge base in this example may have two components. The first is a Perl script for automatically transforming the raw casualty records into XML tagged data objects using the DTD of FIG. 15. This first Perl script is illustrated in FIG. 38. The second is a Perl script for automatically transforming the raw casualty records into a form ready for instantiation into an Oracle relational database. This second script is illustrated in FIGS. 39A-39B.

B. Methods Relating to Knowledge-Based Persistent Archives

The methods described previously in Section I.B. apply equally to knowledge-based persistent archives. However, there are several refinements and/or additions to these methods that take advantage of or utilize the knowledge base of the archive for a particular purpose.

Figure 40:
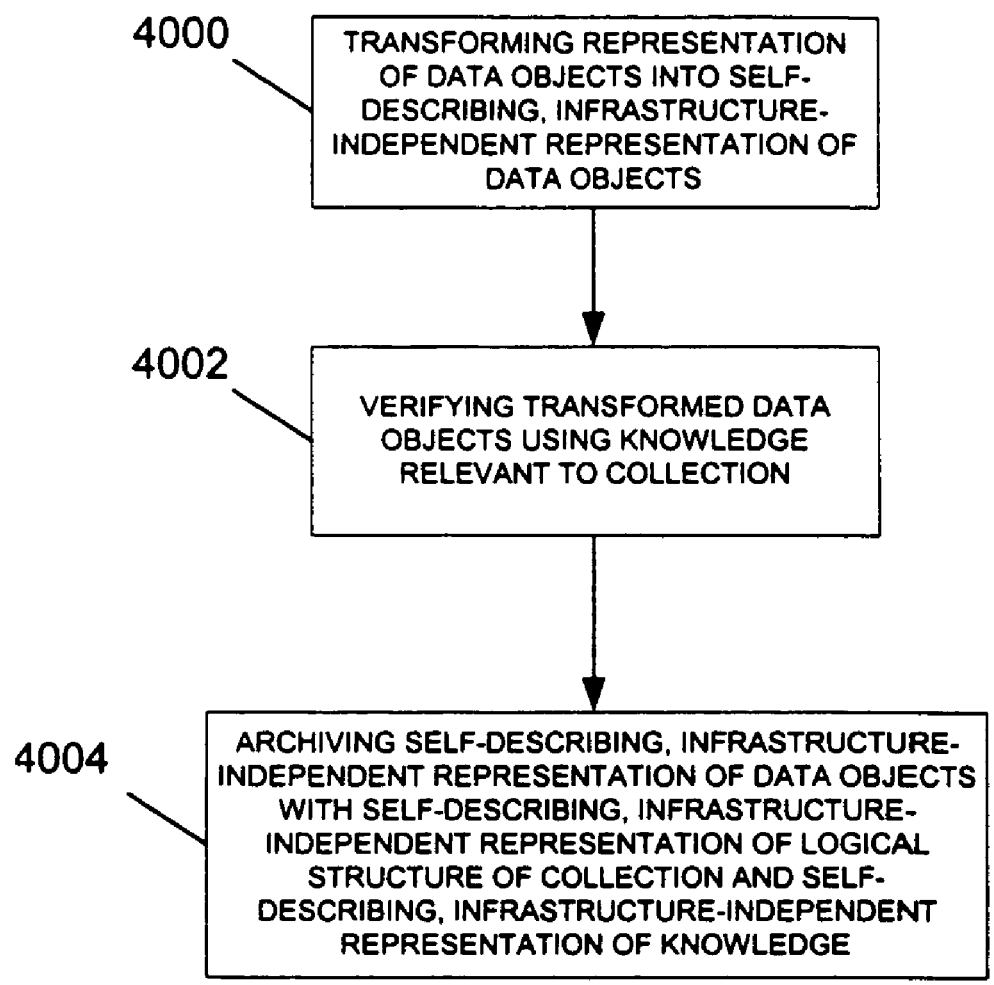
FIG. 40 is a flowchart of one embodiment of a method for ingesting data objects into a knowledge-based persistent archive according to the invention.

During ingestion of data objects into a knowledge-based persistent archive, the knowledge base of the archive may be used to verify the data objects after transformation into a self-describing, infrastructure independent form. A flowchart of one embodiment of such a method is illustrated in FIG. 40. As illustrated, the method comprises, in step 4000, transforming a representation of data objects into a self-describing, infrastructure-independent representation, and, in step 4002, verifying the transformed data objects using knowledge relevant to the collection.

In one implementation, where the self-describing, infrastructure independent representation of the data objects are data objects tagged with attribute or element names, this verification step may occur by forming occurrences of attribute or element values, inverting the occurrences to form inverted attribute indices, and using the inverted attribute indices to confirm that attribute and element values are within defined ranges, and that internal consistency of the collection is maintained.

Step 4004 follows step 4002. In step 4004, the self-describing, infrastructure independent representation of the data objects is archived with the self-describing, infrastructure independent representation of a logical structure of the collection and a self-describing, infrastructure independent representation of knowledge relevant to the collection.

Figure 41A:
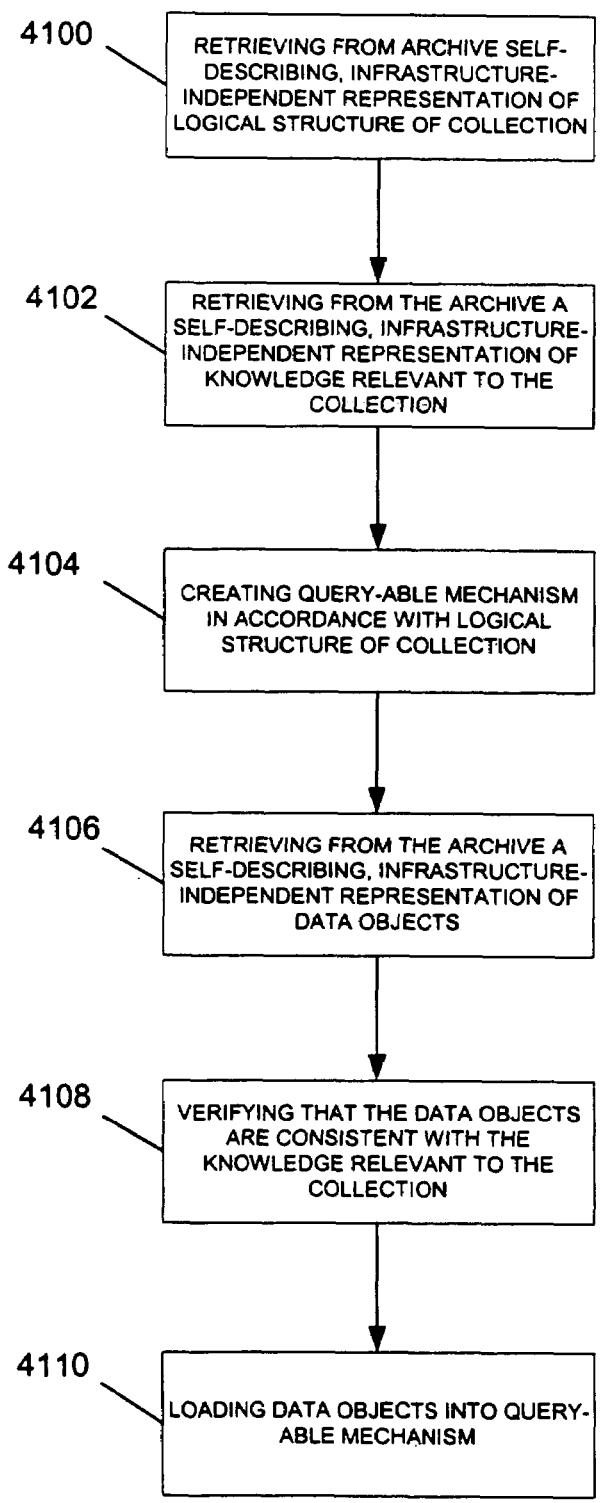
FIG. 41A is a flowchart of one embodiment of a method of instantiating a knowledge-based persistent archive according to the invention.

Similarly, during instantiation of a knowledge-based persistent archive, the knowledge base may be used to verify data objects retrieved from the archive. A flowchart of one embodiment of such a method is illustrated in FIG. 41A. As illustrated, the method comprises, in step 4100, retrieving from the archive a self-describing, infrastructure independent representation of a logical structure of the collection, and, in step 4102, retrieving from the archive a self-describing, infrastructure independent representation of knowledge relevant to the collection. Step 4102 is followed by step 4104, in which a query-able mechanism is created in accordance with the logical structure of the collection.

In step 4106, a self-describing, infrastructure independent representation of one or more data objects is retrieved from the archive. Then, in step 4108, the retrieved data objects are verified to ensure that they are consistent with the knowledge relevant to the collection.

In one implementation, the self-describing, infrastructure independent representation of the data objects comprises data objects tagged with attribute or element names. In this implementation, the verifying step may occur by forming occurrences of attribute or element values from the tagged data objects, forming one or more inverted attribute indices from the occurrences, and confirming that the attribute or element values are within defined ranges, and/or follow prescribed rules and/or exceptions to the rules, and that the collection is internally consistent.

Step 4108 is followed by step 4110, in which the verified data objects are loaded into the query-able mechanism.

Once the data objects have been loaded into the query-able mechanism, they may be retrieved in response to queries for presentation to a user. At that time, they may be again be verified using the knowledge relevant to the collection as described above.

Figure 41B:
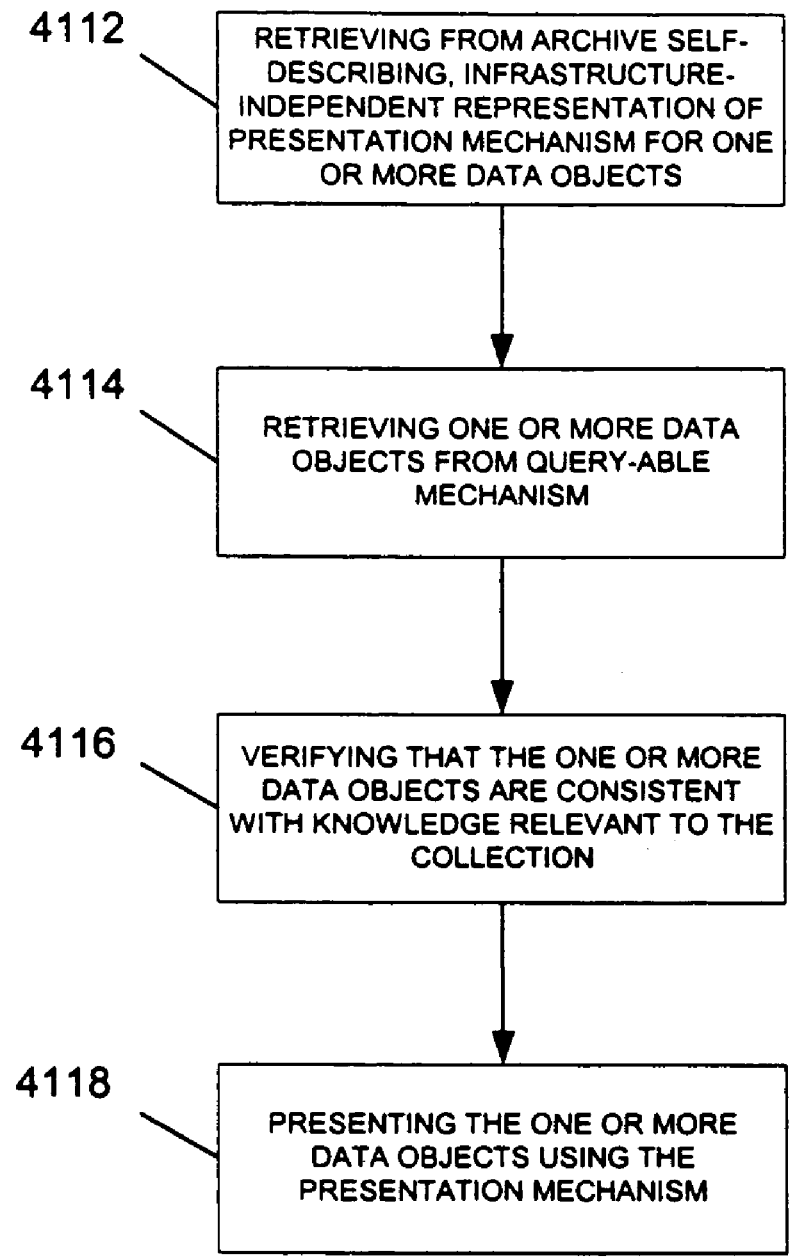
FIG. 41B is a flowchart of one embodiment of a method of presenting data objects from a knowledge-based persistent archive according to the invention.

A flowchart of one embodiment of such a method is illustrated in FIG. 41B. As illustrated, this method comprises, in step 4112, retrieving from the archive a self-describing, infrastructure-independent representation of a presentation mechanism for one or more of the data objects, and, in step 4114, retrieving, responsive to queries, one or more data objects from a query-able mechanism.

Step 4114 is followed by step 4116, which comprises verifying that the one or more retrieved data objects are consistent with the knowledge relevant to the collection. Again, this step may occur by forming occurrences of attribute or element values from tagged data objects, forming inverted attribute indices from the occurrences, and analyzing the inverted attribute indices to ensure that the attribute or element values are within prescribed ranges and/or that the attribute or element values follow prescribed rules and/or exceptions to the rules, and that the collection is internally consistent.

Step 4116 is followed by step 4118. There, the one or more verified data objects are presented using the presentation mechanism.

Figure 42:
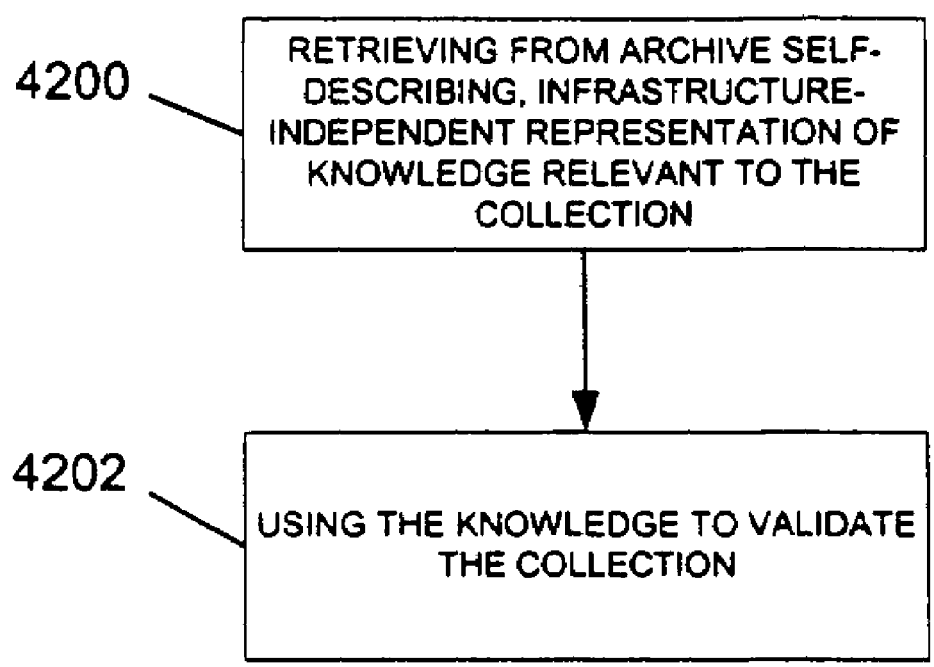
FIG. 42 is a flowchart of one embodiment of a method of validating a knowledge-based persistent archive according to the invention.

The knowledge base of the archive may also be used to validate the collection of data objects contained in the archive at arbitrary times. A flowchart of one embodiment of such a method is illustrated in FIG. 42. As illustrated, the method comprises, in step 4200, retrieving from the archive a self-describing, infrastructure independent representation of knowledge relevant to the collection, and, in step 4202, using the knowledge to validate the collection.

Again, this step may occur by forming occurrences of attribute or element values from tagged data objects, forming inverted attribute indices from the occurrences, and analyzing the inverted attribute indices to ensure that the attribute or element values are within prescribed ranges and/or that the attribute or element values follow prescribed rules and/or exceptions to the rules, and that the collection is internally consistent.

The knowledge base of a persistent archive may also comprise a self-describing, infrastructure independent, executable representation of a transformation procedure, such as a Perl script. Various methods are possible which utilize such a transformation procedure.

Figure 44A:
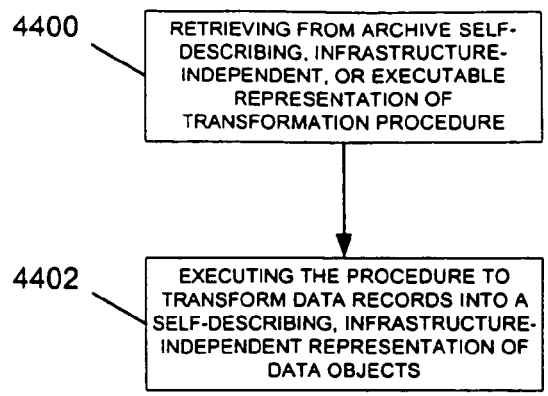
FIG. 44A is a flowchart of one embodiment of a method of transforming data objects according to the invention.

First, a method of transforming data objects into a form capable of ingestion into the archive is possible. One embodiment of such a method is illustrated in FIG. 44A. As illustrated, this embodiment of the method comprises, in step 4400, retrieving the representation of the procedure from the archive, and, in step 4402, executing the procedure to transform the data objects into a form ready for ingestion into the archive.

Figure 44B:
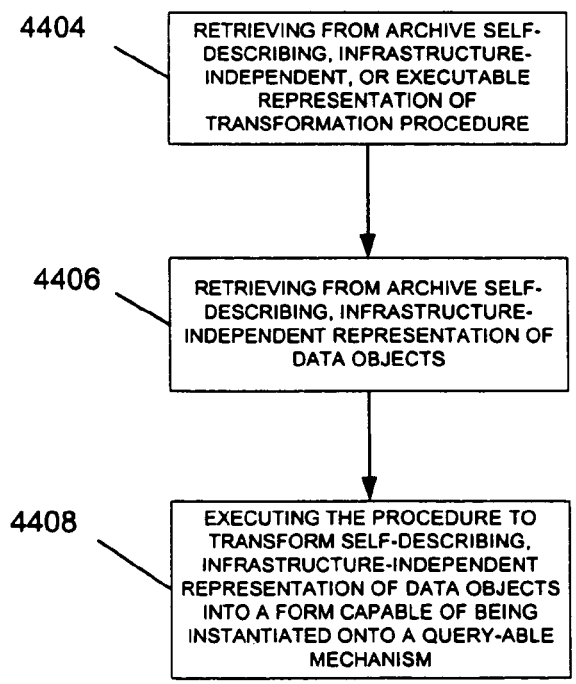
FIG. 44B is a flowchart of one embodiment of a method of transforming data objects into a form ready for instantiation onto a query-able mechanism according to the invention.

Second, a method of transforming data objects into a form capable of instantiation onto a query-able mechanism is also possible. One embodiment of such a method is illustrated in FIG. 44B. As illustrated, the embodiment of the method comprises, in step 4404, retrieving the representation of the transformation procedure from the archive, and, in step 4406, retrieving from the archive one or more data objects in a self-describing, infrastructure independent form. This is followed by step 4408, which comprises executing the procedure to transform the data objects in the self-describing, infrastructure independent form into a form capable of being instantiated onto a query-able mechanism.

Figure 44C:
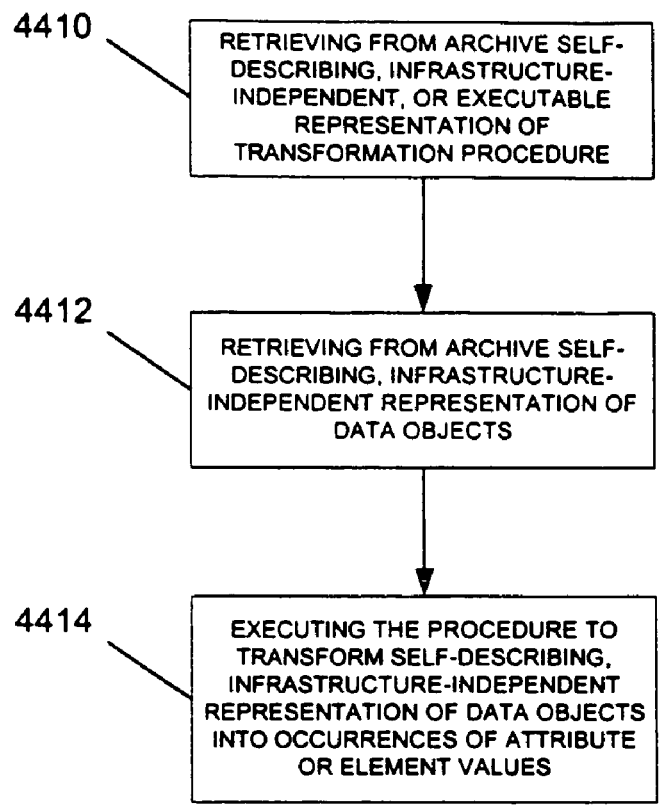
FIG. 44C is a flowchart of one embodiment of a method of transforming data objects into occurrence tuples according to the invention.

Third, a method of transforming data objects into occurrences of attribute or element values is also possible. One embodiment of such a method is illustrated in FIG. 44C. As illustrated, the embodiment of the method comprises, in step 4410, retrieving the representation of the transformation procedure from the archive, and, in step 4412, retrieving from the archive one or more data objects in a self-describing, infrastructure independent form. This is followed by step 4414, which comprises executing the procedure to transform the data objects in the self-describing, infrastructure independent form into the occurrences of attribute or element values.

Figure 45:
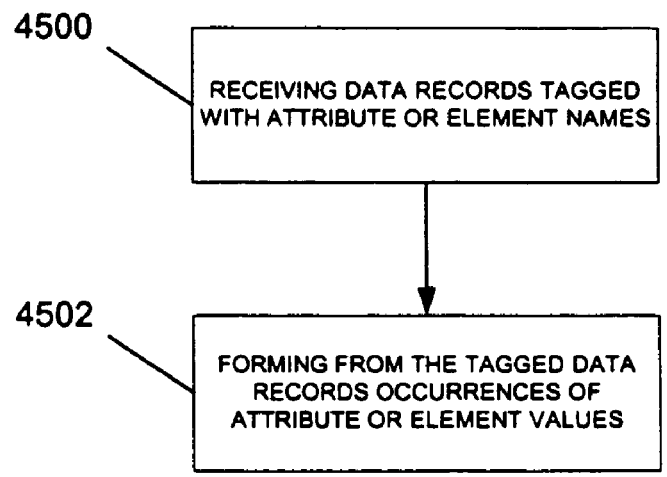
FIG. 45 is a flowchart of one embodiment of a method of forming occurrence tuples from tagged data objects according to the invention.

The occurrences of attribute or element values may also be formed using data records tagged with attribute or element names. An embodiment of such a method is illustrated in FIG. 45. As illustrated, this embodiment of the method comprises, in step 4500, receiving data records tagged with attribute or element names, and, in step 4502, forming from the tagged data records occurrences of attribute or element values. The embodiment of the method may also include forming inverted attribute indices from the occurrences.

These occurrences and/or inverted attribute indices may be used for a variety of purposes, including (1) validating the collection, (2) identifying knowledge to be added to the knowledge base of a knowledge-based persistent archive formed from the tagged data records, such as exceptional conditions, (3) confirming closure of attribute or element selection for a collection formed from the tagged data records, (4) obtaining useful information about a collection formed from the tagged data records, such as the degree of redundancy in the collection, (5) determining transformation procedures for a collection formed from the tagged data records, (6) checking the internal consistency of a collection formed or to be formed from the tagged data records, and (7) confirming that the attribute or element values fall within prescribed ranges, and/or that the attribute or element values follow prescribed rules and/or exceptions to the rules.

Furthermore, these occurrences and/or inverted attribute indices may be (1) transformed into tagged data records, (2) transformed into a form capable of being ingested into a persistent archive, and (3) transformed into a form capable of being instantiated onto a query-able mechanism.

Each of the foregoing methods may be tangibly embodied as a series of processor-executable instructions stored on a processor-readable medium. Again, for purposes of this disclosure, a "medium" is any processor accessible device capable of storing data, including without limitation RAM, ROM, EPROM, EEPROM, PROM, disk, floppy disk, hard disk, CD-ROM, DVD, flash memory, etc.

III. Third Embodiment

Figure 46:
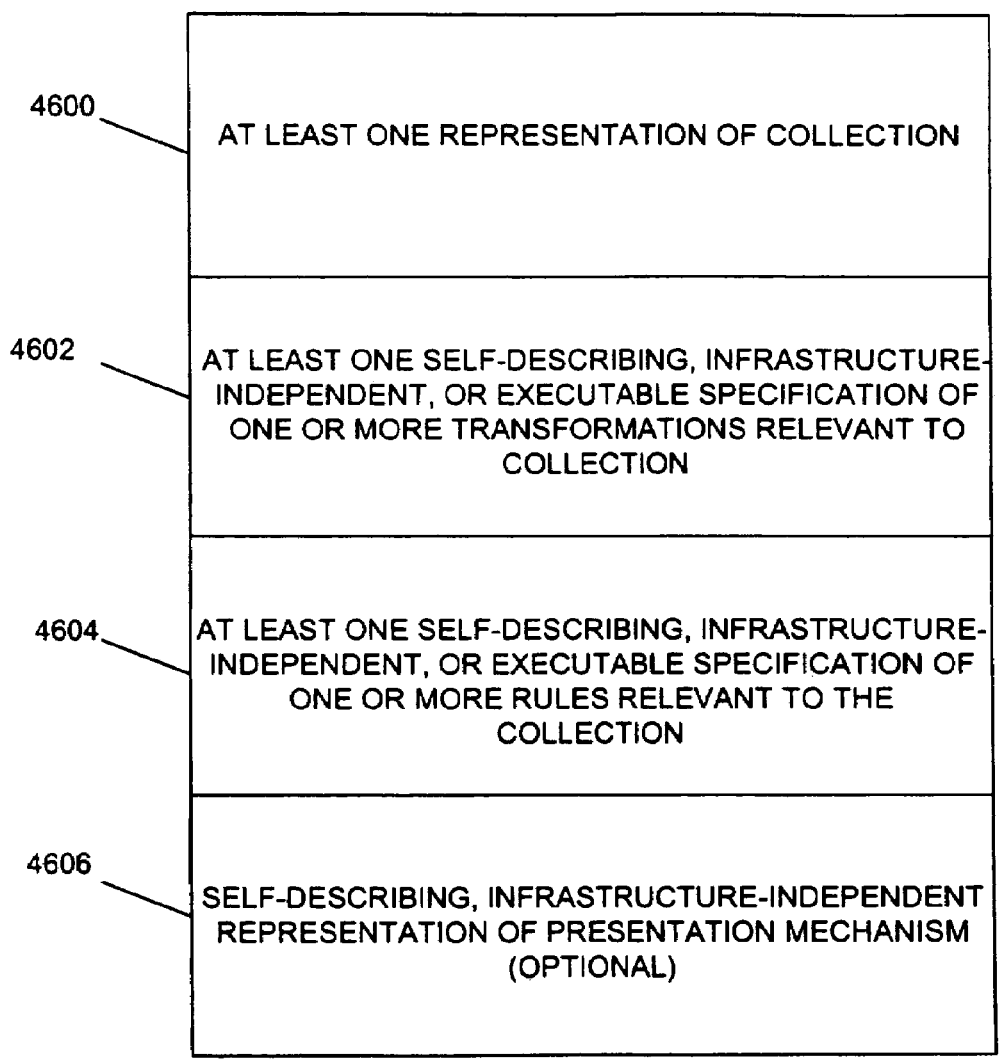
FIG. 46 illustrates one embodiment of a knowledge-based persistent archive including at least one executable specification according to the invention.

A. Knowledge-Based Persistent Archives with at Least One Self-Describing, Infrastructure-Independent or Executable Specification In a third embodiment of the invention, a knowledge-based persistent archive which includes at least one self-describing, infrastructure-independent or executable specification is provided. Referring to FIG. 46, in this embodiment, the archive comprises at least one representation of the collection of data objects, identified with numeral 4600; at least one self-describing, infrastructure-independent or executable specification of one or more transformations relating to the collection, identified with numeral 4602; and at least one self-describing, infrastructure-independent or executable specification of one or more rules encoding knowledge relevant to the collection, identified with numeral 4604. Optionally, the archive includes a self-describing, infrastructure-independent representation of a presentation mechanism for one or more of the data objects in the collection.

Figure 47:
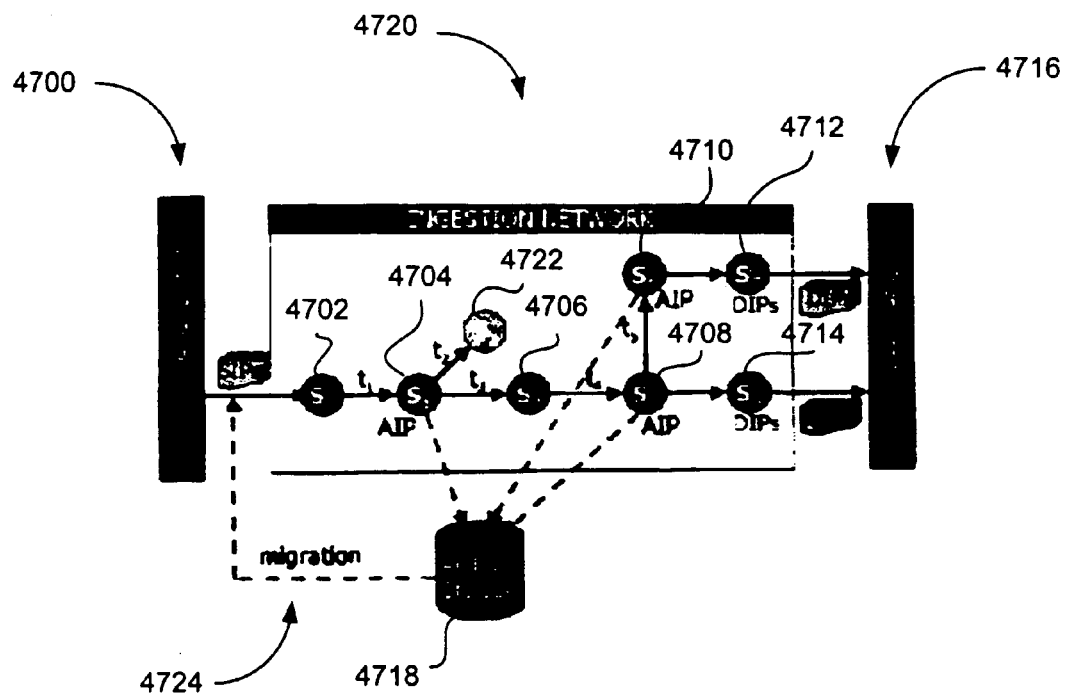
FIG. 47 illustrates one embodiment of an ingestion network according to the invention.

Referring to FIG. 47, an ingestion network 4720 is illustrated. This network represents all the possible states of the data objects as they are transformed from the form in which they were received from the producer 4700 of the data into a form suitable for ingestion into the archive 4718, into a form suitable for presentation to a consumer 4716, into a form suitable for instantiation onto a query-able mechanism, and into a form suitable for migration onto a new medium. The transitions between the states represent the transformations that the data objects undergo.

In this ingestion network, submission information packages (SIPs) are received from producer 4700 and form the initial representation of the collection in state $s_0$ which is identified by numeral 4702. Typically, this data is in the form of raw data records.

The data in state $s_0$ then undergoes a transformation $t_1$ to form the data in state $s_1$, identified by numeral 4704. In the example illustrated, the data in state $s_1$ is assumed to be in a form ready for archiving to archival storage 4718. Thus, this data may be referred to as an archival information package (AIP).

The transformation $t_2$ is assumed to result in data which is lossy, and therefore is unusable. That is why there are no transitions out of the state $s_2$ identified by numeral 4722.

The transformation $t_3$ transforms the data in state $s_1$ to state $s_3$, which is identified by numeral 4706. Similarly, the transformation $t_4$ transforms the data in state $s_3$ to state $s_4$, which is identified by numeral 4708. This data is assumed to be in a form ready for archiving to archival storage 4718, and thus may be referred to using the AIP nomenclature.

The transformation $t_5$ transforms the data in state $S_4$ to state $s_5$, which is identified by numeral 4710. This data as well is assumed to be in a form ready for archiving to archival storage 4718, and thus may also be referred to using the AIP nomenclature.

The data in state $s_4$ may also be transformed into a dissemination package (DIP) in state $s_6$, which is identified with numeral 4714. The DIP is in a form ready for dissemination to consumer 4716, either through presentation to the consumer, or by instantiating it onto a query-able mechanism, at which point it may be queried by the consumer.

Similarly, the data in state $s_5$ may be transformed into a dissemination package (DIP) in state $s_7$, which is identified by numeral 4712. Again, the DIP is in a form ready for dissemination to consumer 4716, either through presentation to the consumer, or by instantiating it onto a query-able mechanism, at which point it may be queried by the consumer.

The process of migrating the archived data to a new medium may also be represented in the ingestion network. More specifically, migration may be represented as the process of retrieving data from archival storage 4718 and inputting it to an ingestion network at state $s_0$. This step is identified by numeral 4724 in FIG. 47.

Turning back to FIG. 46, the representation of the collection 4600 may be any one of the representations of the collection within ingestion network 4720, including the data in any of the states $s_0$, $s_1$, $s_3$, $s_4$, $s_5$, $s_6$, and $s_7$. Moreover, there may be more than one of these representations present in the archive. Multiple representations of the collection introduces redundancy into the archive, and thus helps ensure that the content will be preserved.

For example, a representation may be the initial data provided by the producer 4700. Or, it may be a self-describing, infrastructure-independent form of this data, such as the initial data records after being tagged with attribute or element names. The representation may also be data in a form capable of presentation to the consumer, data in a form capable of being instantiated onto a query-able mechanism, or data in a form capable of being migrated onto a new medium. Or it can be occurrences of attribute or element values, or one or more inverted attribute indices, as described in the previous section. It can also be any representation of a knowledge base, such as a topic map. Or it can be any combination of the foregoing, such as a combination of the raw data records and the data records tagged with attribute or element names.

Referring again to FIG. 46, the one or more transformations 4602 included in the archive can be any of the transformations $t_1$, $t_3$, $t_4$, $t_5$, any of the transformations between ALPs and DIPs, i.e., between states 4708 and 4714, and between states 4710 and 4712, and any transformation required to place the archived data into a form for migration onto a new medium, as indicated by identifying numeral 4724. Moreover, there may be more than one transformation included in the archive. As with the representations of the collection, multiple transformations introduces redundancy, and thus helps ensure that the content will be preserved.

The one or more transformations 4602 may be content-preserving and therefore invertible. They may also be configured to produce (1) data objects in a form suitable for ingestion into the archive, (2) data objects in a form suitable for instantiation onto a query-able mechanism, (3) data objects in a form suitable for presentation, or (4) data objects in a form suitable for migration onto a new medium. They may also be configured to produce occurrences of attribute or element values, or one or more inverted attribute indices, as described previously. They may also be configured to produce a knowledge base, such as a topic map. Or they may include or comprise any combination of the foregoing.

The transformations are expressed in a (1) self-describing, infrastructure-independent, or (2) executable form. (These requirements are expressed in the disjunctive for the reasons stated in Section III.C.) In one example, the transformations are expressed in the form of Perl scripts. Also, a self-instantiating archive is possible in which the one or more transformations are configured, upon execution thereof by an appropriate processor, system or engine, to automatically transform one of the representations of the collection stored with the archive into a form ready for instantiation onto a query-able mechanism, or presentation to a consumer.

Furthermore, a representation 4600 of the collection may be a product of one of the transformations 4602, or may be an input to one of the transformations 4602. If multiple representations are included, one of the representations may be the input to a transformation, and another may be the product of the transformation.

Referring back to FIG. 46, the one or more rules 4604 may be rules (and any valid exceptions) useful for validating the collection at any time. The rules are expressed in a (1) self-describing, infrastructure-independent, or (2) executable form, such as Perl scripts, or F-logic. (Again, these requirements are expressed in the disjunctive for the reasons stated in Section III.C.) A self-validating archive is possible in which the one or more rules may be retrieved and, upon execution by an appropriate processor, system or engine, automatically validate the collection, i.e., determine that the one or more representations 4600 are consistent with the rules and valid exceptions.

The one or more rules may bear a relationship to a DTD discussed previously. A DTD may be viewed as an embodiment of rules and constraints between attributes and elements. These rules and constraints may simply be expressed in declarative form to become the one or more rules 4604 stored with the archive.

Several examples of a mapping between DTD statements and corresponding rules expressed in F-logic are illustrated in FIG. 48. Numeral 4800 refers to the rules used to implement the DTD statement <!ELEMENT X (Y,Z))>, which specifies a parent element X which has two and only two child elements Y and Z. As shown, this DTD statement implies the following rules which can be applied to determine if a tagged data object conforms to the DTD: (1) return false if the first child is not Y; (2) return false if the second child is not Z; (3) return false if there are no children; and (4) return false if there are other children besides Y and Z.

Numeral 4802 refers to the rules used to implement the DTD statement <!ELEMENT X (Y|Z)>, which specifies a parent element X which has one and only one child element which in turn may be either Y or Z. As shown, this DTD statement implies the following rules which can be applied to determine if a tagged data object conforms to the DTD: (1) return false if there is a first child other than Y or Z; (2) return false if there are no children; and (3) return false if there is a child other than a first child.

Numeral 4804 refers to the rules used to implement the DTD statement <!ELEMENT X (Y)*>, which specifies a parent element X which has zero or more instances of Y as child elements. As shown, this DTD statement implies the following rule which can be applied to determine if a tagged data object conforms to the DTD: return false if there is a child other than Y.

In one example, a self-validating, self-instantiating knowledge-based persistent archive is formed from the Senate Legislative Activities (SLA) collection described previously in Section II.A. To summarize, this collection represents the activities of Senators during the $106^{th}$ Congress. A legislative activity can be either a bill, amendment, or resolution (BAR). The files in the collection are organized by Senator, and each file sets forth the legislative activities for that Senator.

Figure 49:
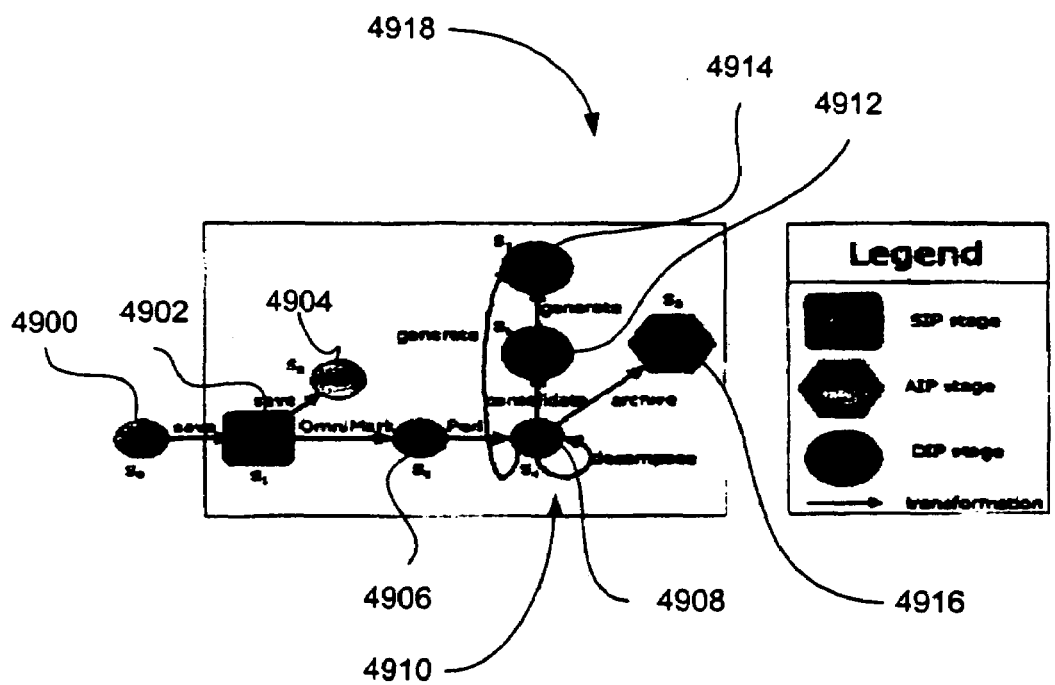
FIG. 49 illustrates an example of an ingestion network for an example collection involving Senate legislative activities for the 106$^{th}$ Congress.

An ingestion network 4918 for this example is illustrated in FIG. 49. A first transformation from state $s_0$ (numeral 4900) to state $s_1$ (numeral 4902) occurs outside the ingestion network. According to this transformation, SLA files in the form of Microsoft Word (file suffix .DOC) are transformed into Microsoft Rich Text Format (file type .RTF) files according to the accessioning policies of the producer.

The files are organized as follows: a Header section identifies Senator name (e.g., "Paul S. Sarbanes"), state (e.g., "Maryland"), reporting period (e.g., "Jan. 6, 1999 to Mar. 31, 2000"), and reporting entity ("Senate Computer Center Office of the Sergeant at Arms and Committee on Rules and Administration"); Section I sets forth Sponsored Measures; Section II, Cosponsored Measures; Section III, Sponsored Measures Organized by Committee Referral; Section IV, Cosponsored Measures Organized by Committee Referral; Section V, Sponsored Amendments; Section VI, Cosponsored Amendments; and Section VII, Subject Index to Sponsored and Cosponsored Measures and Amendments.

Sections III and IV contain the same BARs as Sections I and II, but grouped by committee referral (e.g., "Senate Armed Services" and "House Judiciary"). Section VII contains a list of subjects with references to corresponding BAR identifiers: "Zoning and zoning law→S 9, S.Con.Res.10, S.Res.41, S.J.Res.39". A measure can be any of the BAR types, i.e., a bill, amendment, or resolution. A resolution can be simple, joint, or concurrent. Initially, the following fourteen data field are identified for extraction and tagging: abstract, bar_id, committee, congressional_record, cosponsors, date_introduced, digest, latest_status, official_title, sponsor, statement of purpose, status_actions, submitted_by, submitted_for. The initial collection contains 99 files, representing the activities of 99 Senators.

Referring to FIG. 49, the .RTF files then enter the ingestion network 4918. A transformation is first attempted according to which the files are transformed into .HTML files at state $s_2$ (numeral 4904). However, this transformation drops Sections III and IV, and is not continued since it is lossy and clearly not content-preserving.

Next, the .RTF files are transformed into tagged XML files using an rtfxml module and OmniMark, a stream-oriented, rule-based data extraction and programming language. This transformation is represented in the figure as the transformation from state $s_1$ to $s_3$ (numeral 4906).

The transformation from $s_3$ to $s_4$ (numeral 4908) is the main wrapping step used to extract and tag the files with the fourteen initially defined data fields. In addition to tagging attributes, this step also tags occurrences of the attributes. To perform occurrence tagging, the Perl script of FIGS. 36A-36Z is used. The output of this transformation is a flat file of occurrences of the data field (=attribute) values. Each occurrence is expressed as an oav 3-tuple (occurrence, attribute, value) where an occurrence in turn is expressed in the form of the 2-tuple (filename (=senator_id), line number). Thus, assuming the attribute 'date_introduced' shows up in the file for Senator Paul Sarbanes (senator_id=106) at line 25 with a value 1/19/1999 and at line 55 with a value 3/15/2000, the following 3-tuples result: ((106, 25), 'date_introduced', '1/19/1999) and ((106,55), 'date_introduced', '3/15/2000').

An additional transformation occurs from state $s_4$ to $s_4$. This transformation is identified with numeral 4910. In this transformation, some of the initial candidate attributes may be decomposed further to capture all the relevant information content, or they may be redefined to ensure that all attributes are populated. For example, as a result of this process, the initial attribute 'list_of_sponsors' is further decomposed as follows: list_of_sponsors→(sponsor) and sponsor→(name, date). At the conclusion, of this process, closure of the attribute selection process may be declared (see FIG. 43 and related discussion).

As part of this process, the occurrences could be converted into a XML preservation format and queried using XMAS, XQL, or QUILT (an emerging XML standard). Or, they could be converted into a relational model, and queried using SQL queries. These queries may be used as part of the attribute closure process. For example, the attribute 'abstract' is determined to be empty, and thus a candidate for dropping.

The oav tuples can also be inverted to form inverted attribute indices. In one example, the oav tuples are inverted to form Prolog assertions which can be used for completeness checking. For example, the oav ((105,20), senator, 'RICHARD G. LUGAR of INDIANA') could be inverted to form the Prolog assertion senator(105,20,'RICHARD G. LUGAR of INDIANA').

The transformation from $s_4$ to $s_5$ (numeral 4916) builds the desired archival information packages (AIPs) in XML. The content and structure of the original SIPs is preserved by assembling data objects from subobjects using the oav tuples. The result of this process is a collection of XML tagged data objects which reflect the DTD illustrated in FIG. 37.

The transformation from $s_4$ to $s_6$ (numeral 4912) creates a consolidated version of the collection. The desirability of consolidation is apparent from an analysis of the oav tuples which reveals that there are 44,145 occurrences of BARs, yet there are only 5,632 distinct BARs. To perform this consolidation, the collection is reverse engineered to create a database of 5,632 BARs. The SLA collection may then be re-expressed as a particular view of this database in which the individual BARs are grouped by Senator.

As part of this consolidation transformation, integrity checks can be performed to ensure completeness of the collection. For example, through execution of the rules portion of the archive, the collection could be checked to ensure that there is file for each Senator appearing somewhere in the collection. The analysis reveals that there are three Senators for which corresponding files do not appear: John Chafee of Rhode Island, Phil Gramm of Texas, and Zell Miller of Georgia. To handle this condition, an exception is created to the rule indicating that each of the Senators appearing in the collection must have their own file. This exception specifies that individual files need not appear for the three Senators listed above. This exception then becomes a rule when it is added to the rules portion of the archive. This allows collection validation and integrity to be declared even when individual files for the three Senators are not present.

The transformation from $s_4$ to $s_7$ (numeral 4914) creates a topic map version of the collection. This topic map provides a map between concepts and attributes.

An example of a topic map expressed in XML for the SLA collection is illustrated in FIGS. 54A-54C. The format of the topic map conforms to an emerging Web-based standard under development by XTM, the standards body for the web-based standard. This standard has its genesis in the ISO topic map standard. For more information on the XTM web-based standard, the reader is referred to www.xtm.org.

The purpose of the topic map is to define the semantics of the collection. In the example of FIGS. 54A-54C, these semantics are defined in terms of topics and relationships between the topics. In addition, in the example illustrated, the semantics are defined in terms of links between topics and occurrences of these topics in the XML-tagged documents representing bills, amendments, and resolutions.

The first portion of the topic map is an embedded DTD defining the structure of the topic map. In this example, the topic map consists of topics and/or associations. A topic has a name and links to occurrences of that topic in the underlying tagged documents. A link has two attributes. The first is the role played by the topic in the occurrence. The second is a physical link to the occurrence of the topic.

Following the embedded DTD is an XML document with a listing of the occurrences of four topics which have been tagged: First, there is a listing of occurrences of the topic t1 (Apartment houses). The topic "Apartment houses" has an occurrence in the Senate bill S.463. The role "Discussed In" indicates that the topic is discussed in the bill S.463.

Second, there is a listing of the occurrences of the topic t2 (Children). This listing indicates that the topic "Children" is discussed in the following bills and resolutions: S.300, S.463, S.1638, S.1673, S.1709, S.Res.125, and S.Res.258.

Third, there is a listing of the occurrences of the topic t3 (Welfare). This listing indicates that the topic "Welfare" is discussed in the following bills and resolutions: S.463, S.1277, S.1709, S.Con.Res.28, S.Res.125, and S.Res.260.

Fourth, there is a listing of the occurrences of the topic t4 (Youth employment). This listing indicates that the topic "Youth employment" is discussed in the Senate bill S.463.

As indicated in the embedded DTD, an association has a type, and may have one or more rules (element "assocrl").

Each such rule has two attributes. The first is the role of the topic in the association, and the second is a link to one of the other topics or an occurrence of the topic in the tagged data objects.

Following the listings, there is a section which identifies associations relevant to the collection. In the particular example illustrated, two associations are identified.

The first is an association of topics which all appear together in one and only one bill. All four topics are identified in this association, since each appears together in one and only one bill: S.463. The second is an association of topics which all appear together in two or more bills. In this association, two topics are identified, t2 (Children) and t3 (Welfare), since both appear together in three bills and resolutions: S.463, S.1709, S.Res.125. In lay terms, the first association attempts to identify those topics that are only very loosely related, while the second attempts to identify those topics that are more closely related.

A topic map such as illustrated in FIGS. 54A-54C may serve a variety of purposes. First, it can express hidden information and relationships about the collection, which can be useful when the archive is re-instantiated. For example, this information may be helpful for purposes of understanding the collection or issuing queries against it. Second, it may be used to create different views of the archive for different audiences, e.g., a researcher vs. an archivist. Third, it may be helpful for purposes of identifying rules and constraints that may exist in relation to the topics and data objects. These rules and constraints provide additional context which may be helpful for purposes of understanding and validating the collection. For example, if a relationship is found to exist between topics A and B, then the topic map could specify constraints and rules that must be satisfied by topic A. These rules and constraints could be added to the topic map as well, and therefore, extend the knowledge base of the archive. Fourth, the topic map can embody the knowledge base of any of the persistent archives which are the subjects of Sections II or III of this disclosure.

Note that the dissemination information packages (DIPs) may be formed from the database resulting from the transition to state $s_6$ (numeral 4912) and the topic map resulting from the transition to state $s_7$ (numeral 4914). The database represents a form of the collection which may be instantiated onto a query-able mechanism such as a relational database, or an XML database such as TAMINO. The topic map represents a form of the collection which may be presented to a consumer.

At the conclusion of this process, one or more representations of the collection suitable for archiving can be declared. Any of the intermediary or final products referred to above could form a collection representation suitable for archiving. Candidates include the original .RTF files, the XML tagged files from state $s_5$ (numeral 4916) coupled with the occurrence tuples from state $s_4$ (numeral 4908), the BAR database from state $s_6$, and the topic map from state $s_7$ (numeral 4914).

In addition to one or more of the foregoing collection representations, the archive is formed from a self-describing, infrastructure-independent, or executable specification of one or more of the transformations used to create these various collection representations. One example of such a specification is the Perl script of FIGS. 36A-36Z.

The archive is also formed from a self-describing, infrastructure-independent, or executable specification of one or more rules relevant to the collection. One example is an executable specification of F-logic embodying the rules implied by the DTD of FIG. 37 augmented to include any additional rules and/or valid exceptions needed to declare validation of the collection. For example, the rule that a file must appear for each Senator mentioned in the collection coupled with the exception that an individual file need not appear for the three Senators Chafee, Gramm, and Miller could be added to this rules specification.

Figure 50:
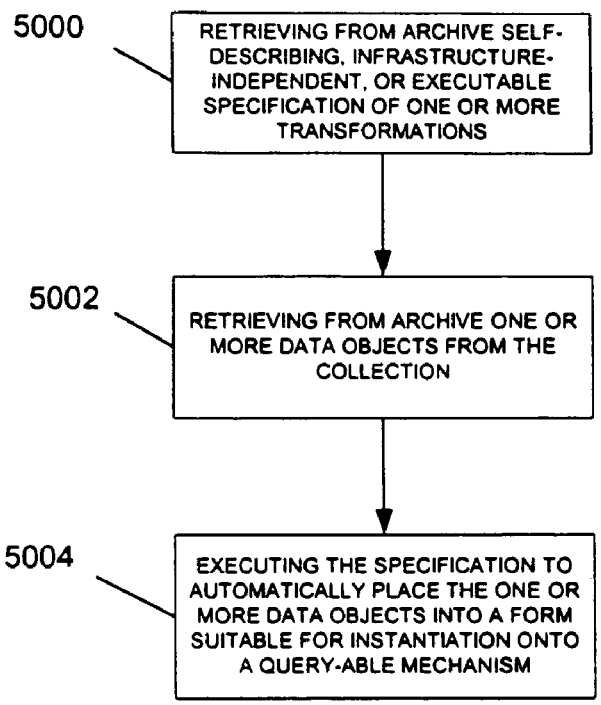
FIG. 50 is a flowchart illustrating one embodiment of a method of transforming data objects into a form suitable for instantiation onto a query-able mechanism according to the invention.

B. Methods Involving Knowledge-Based Persistent Archives with Executable Specifications A method of automatically placing one or more data objects from an archived collection into a form suitable for instantiation onto a query-able mechanism is also provided. Referring to FIG. 50, one embodiment of this method comprises, in step 5000, retrieving from the archive a self-describing, infrastructure-independent or executable specification of one or more transformations relevant to the collection; in step 5002, retrieving from the archive a representation of one or more data objects in the collection; and, in step 5004, executing the specification to automatically place the one or more data objects into a form suitable for instantiation onto the query-able mechanism.

Figure 51A:
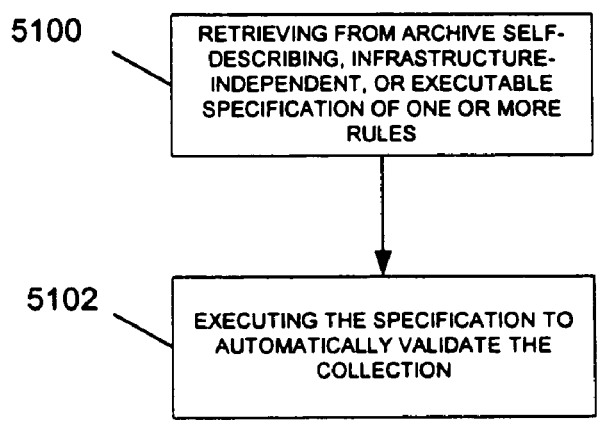
FIG. 51A is a flowchart illustrating one embodiment of a method of validating a collection according to the invention.
Figure 51B:
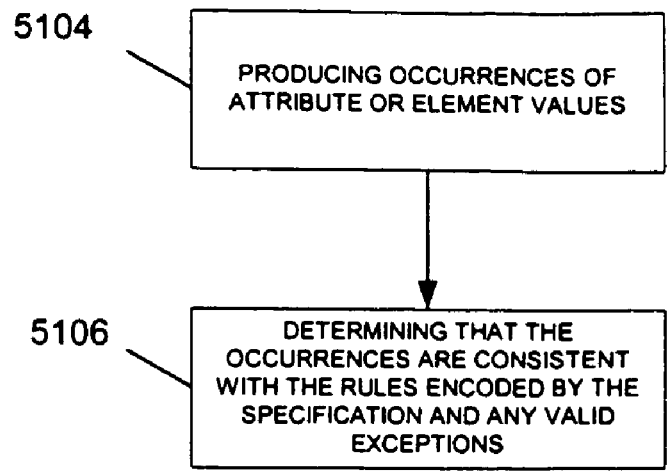
FIG. 51B is a flowchart illustrating one example implementation of the method of FIG. 51A.

Also provided is a method of automatically validating a collection of data objects within a persistent archive. Referring to FIG. 51A, one embodiment of this method comprises, in step 5100, retrieving from the archive a self-describing, infrastructure-independent or executable specification of one or more rules relevant to the collection; and, in step 5102, executing the specification to automatically validate the collection.

Referring to FIG. 511B, in the method of FIG. 51A, the step of validating the collection may be performed by, in substep 5104, producing occurrences of attribute or element values; and, in substep 5106, determining that the occurrences are consistent with the rules encoded by the specification and any valid exceptions.

Figure 52:
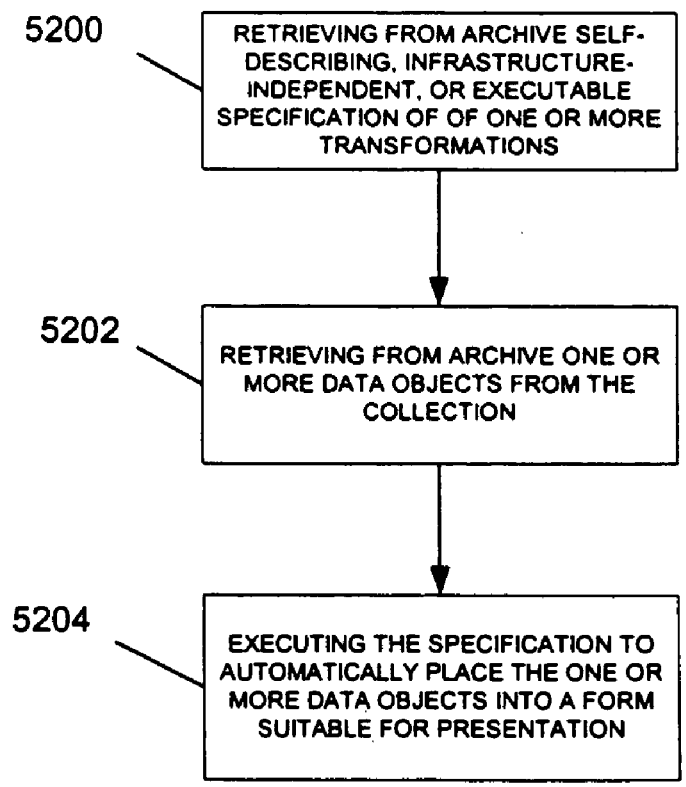
FIG. 52 is a flowchart illustrating one embodiment of a method of transforming data objects into a form suitable for presentation according to the invention.

Referring to FIG. 52, a method of automatically presenting one or more data objects from a persistent archive of a collection of data objects is also provided. One embodiment of this method comprises, in step 5200, retrieving from the archive a self-describing, infrastructure-independent or executable specification of one or more transformations relevant to the collection; in step 5202, retrieving from the archive a representation of one or more data objects in the collection; and, in step 5204, executing the specification to automatically place the one or more data objects from the collection in a form suitable for presentation.

Figure 53:
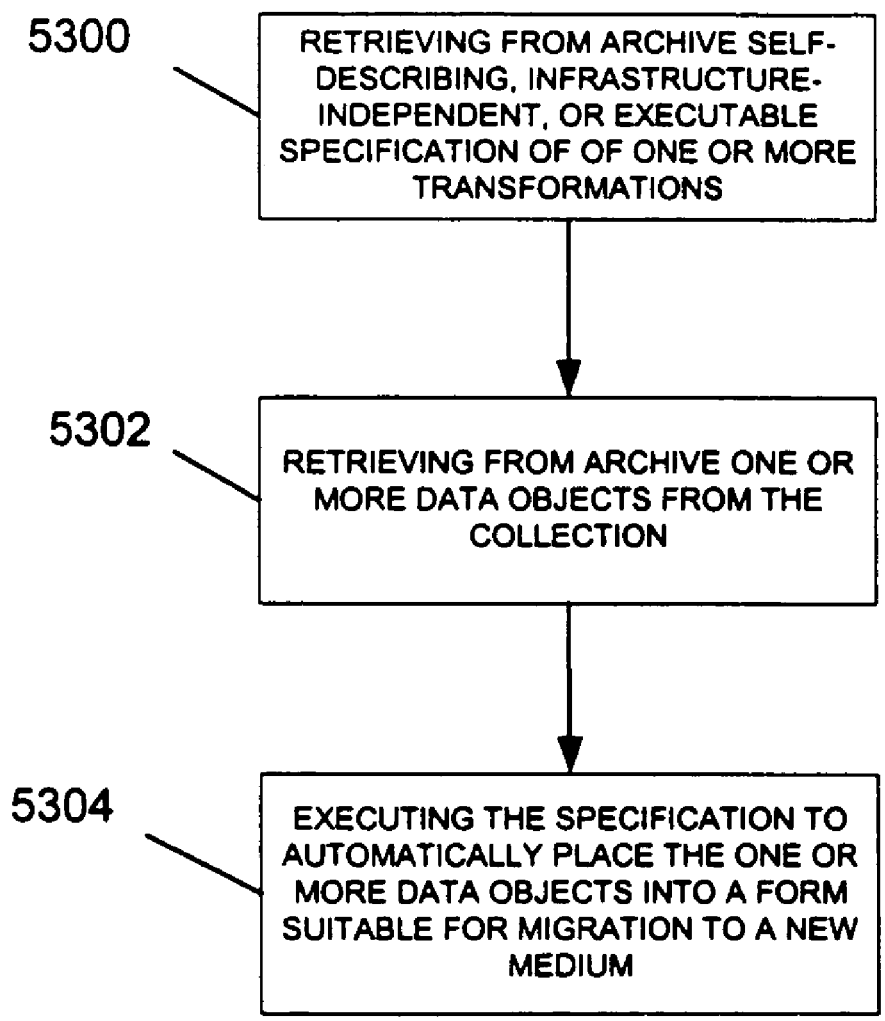
FIG. 53 is a flowchart illustrating one embodiment of a method of transforming data objects into a form suitable for migration to a new medium according to the invention.

A method of automatically placing an archived collection of data objects into a form suitable for migration to a new medium is also provided. Referring to FIG. 53, one embodiment of this method comprises, in step 5300, retrieving from the archive a self-describing, infrastructure-independent or executable specification of one or more transformations relevant to the collection; in step 5302, retrieving from the archive one or more data objects from the collection; and, in step 5304, executing the specification to automatically place the collection into a form suitable for migration to a new medium.

C. Systems Involving Knowledge-Based Persistent Archives with Executable Specifications A system is also provided which includes an engine for executing self-describing, infrastructure-independent, or executable specifications. This system may further include a validation subsystem for validating the collection by commanding the engine to execute at least one self-describing, infrastructure-independent or executable specification encoding one or more rules relevant to the collection. In one example implementation, the engine is part of a deductive database. In another, it is an XSLT engine. In a third example implementation, a single engine is provided that performs ingestion, instantiation, and validation by executing appropriate specifications. For purposes of this disclosure, the term "engine" refers to any mechanism, whether software, hardware, or a combination of hardware and software, that is capable of executing or being built or written to execute one or more of the specifications.

This system may further include a transformation subsystem for transforming one or more data objects in the collection by commanding the engine to execute at least one self-describing, infrastructure-independent, or executable specification of one or more transformations relevant to the collection.

At the time the transformation is to be performed, the one or more transformation specifications should either be (1) self-describing and infrastructure-independent, so that a suitable system or engine for executing the specification can be built or written or so that the specification can be put into a form which is executable by a pre-existing engine or system, or (2) executable, so that the specification may be executed by a pre-existing system or engine.

Similarly, at the time validation is to be performed, the one or more rule specifications should either be (1) self-describing and infrastructure-independent, so that a suitable system or engine for executing the specification can be built or written or so that the specification can be put into a form which is executable by a pre-existing system or engine, or (2) executable, so that the specification may be executed by a pre-existing engine or system.

In one embodiment, a single engine is capable of executing both the one or more transformation specifications, and the one or more rule specifications.

While various embodiments of the invention have been described, it will be apparent to those of ordinary skill in the art that many more embodiments and implementations are possible that are within the scope of this invention.

In particular, many alternatives to XML as a tagging language are possible, including SGML (Standard Generalized Markup Language). In general, any tagging format is possible as long as the tagging mechanism is reasonably apparent from the tagged data, and the language can be parsed. For example, the following tagged format in LISP syntax is possible:

(book (author "Jeff")
(title "All's Well That Ends Well")
. . . )

In addition, many alternatives to HTML as a presentation language are possible, including DHTML (Dynamic HTML), XHTML (Extensible HTML), RDF, PDF, etc. Moreover, many alternatives to XSLT as a presentation mechanism are possible. In general, the presentation mechanism should be able to map a representation of a collection or a data object (e.g., an XML DTD) into a presentation language such as HTML, and XSLT, as a scripting language, is a good choice. However, other candidates include scripting languages such as Perl, Python, etc., but any general purpose language could also do.

Also, many examples of query-able mechanisms are possible, including (1) relational databases such as DB2, Sybase, Informix, Illustra; (2) hierarchical databases such as Ariel; (3) XML-based databases such as TAMINO or Excelon; (4) mechanisms for querying tagged documents such as XQuey (the current W3C recommendation), Quilt, a UCSD/SCDS developed language known as XMAS (equivalent to MIX mediator), XPath, XQL, etc., and (5) file systems.

Moreover, many alternatives to DTD and SQL create table commands are possible for the purpose of representing the logical structure of a collection, including XML Schema, RELAX, RDF, RDF-Schema, SOGX, DSP, Schematron, XML-Data, DCB, and Xschema/DDML. In general, any schema language is possible provided it allows for expression of the constraints on the structure of conforming documents or data objects and allows one to distinguish between documents/data objects that conform to the schema, and those that do not.

There are also several possible ways to express topic maps other than through the ISO/IEC 13250 standard. Other examples include a XML Topic Map DTD, or XTM (XML Topic Maps).

There are also several possible ways of specifying a knowledge-base other than through KIF, Prolog, or XTM. Additional examples include DAML+OIL (see www.daml.org) and XOL (XML-Based Ontology Exchange Language). In general, any mode of expression is possible that allows one to express basic relationships, and/or that has an inference mechanism (e.g., Prolog rules) that allows one to derive new relationships from existing ones.

Accordingly, the invention is not to be restricted except in light of the attached claims and their equivalents.

What is claimed is:

1. A method of forming occurrences of attribute or element values comprising:

receiving a plurality of data records tagged with attribute or element names;

forming from the plurality of tagged data records a flat database comprising occurrences of attribute or element values that are sufficient to ensure completeness and consistency of the plurality of tagged data records; and using the occurrences to identify knowledge, comprising exceptional conditions, an exceptional condition comprising either the absence of an expected occurrence or the presence of an unexpected occurrence, to be added to or used in forming a knowledge base of a knowledge based persistent archive formed or to be formed from the tagged data records.

2. The method of claim 1 further comprising using the occurrences to confirm closure of attribute or element selection for a collection formed from the tagged data records.

3. The method of claim 1 further comprising using the occurrences to obtain useful information about a collection formed from the tagged data records.

4. The method of claim 3 further comprising using the occurrences to determine redundancy in a collection formed from the tagged data records.

5. The method of claim 1 further comprising using the occurrences to determine transformation procedures for a collection formed from the tagged data records.

6. The method of claim 1 further comprising using the occurrences to check the internal consistency of a collection formed or to be formed from the tagged data records.

7. The method of claim 1 further comprising transforming the occurrences into an inverted attribute index.

8. The method of claim 1 further comprising transforming the occurrences into tagged data records.

9. The method of claim 1 further comprising transforming the occurrences into a form capable of being ingested into a persistent archive.

10. The method of claim 1 further comprising transforming the occurrences into a form capable of being instantiated onto a query-able mechanism.

11. The methods of any of claims 1-10 tangibly embodied on a processor readable medium.

* * * * *